(12) United States Patent
Minato et al.

(10) Patent No.: US 11,815,836 B2
(45) Date of Patent: Nov. 14, 2023

(54) IMAGE FORMING APPARATUS USING TEST CHART IN TWO-SIDED PRINTING

(71) Applicant: CANON KABUSHIKI KAISHA, Tokyo (JP)

(72) Inventors: Yusuke Minato, Chiba (JP); Takenori Sueoka, Ibaraki (JP); Tatsuya Kohno, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/700,829

(22) Filed: Mar. 22, 2022

(65) Prior Publication Data

US 2022/0317608 A1 Oct. 6, 2022

(30) Foreign Application Priority Data

Mar. 31, 2021 (JP) .................................. 2021-059834

(51) Int. Cl.
  *G03G 15/00* (2006.01)
  *G03G 15/01* (2006.01)
  *G06K 15/02* (2006.01)
(52) U.S. Cl.
  CPC ............. *G03G 15/50* (2013.01); *G03G 15/01* (2013.01); *G06K 15/027* (2013.01)

(58) Field of Classification Search
  CPC ....................... G03G 15/5062; G03G 15/5041
  See application file for complete search history.

(56) References Cited

U.S. PATENT DOCUMENTS

| 2020/0242428 | A1* | 7/2020 | Omata | G06K 15/021 |
| 2020/0285176 | A1* | 9/2020 | Sueoka | G03G 15/5058 |
| 2020/0409299 | A1* | 12/2020 | Kohno | G03G 15/5054 |

FOREIGN PATENT DOCUMENTS

JP 2021-009346 A 1/2021

* cited by examiner

*Primary Examiner* — Walter L Lindsay, Jr.
*Assistant Examiner* — Andrew V Do
(74) *Attorney, Agent, or Firm* — Venable LLP

(57) ABSTRACT

An image forming apparatus includes an image bearing member, an image forming portion, transfer member, a power source, a current detecting portion, an acquiring portion, and a controller capable of executing an operation in an adjustment mode. In the operation in the adjustment mode, the controller selects test toner images for setting a transfer voltage for a second side of a recording material, on the basis of information on densities of the test toner images acquired by the acquiring portion, and then adjusts the transfer voltage for the second side of the recording material on the basis of a current detected by the current detecting portion when the selected test toner images are transferred onto the recording material.

5 Claims, 28 Drawing Sheets (a)

| FIRST SIDE | | WATER CONTENT (g/kg) | | | | |
|---|---|---|---|---|---|---|
| | | ≤0.9 | ... | 8.9 | ... | 21.5 ≤ |
| BASIS WEIGHT (g/m$^2$) | . | . | . | . | | . |
| | 76〜90 | 1000V | ... | 500V | ... | 200V |
| | 91〜105 | 1150V | ... | 600V | ... | 250V |
| | 106〜128 | 1300V | ... | 700V | ... | 300V |
| | . | . | . | . | | . |

(b)

| SECOND SIDE | | WATER CONTENT (g/kg) | | | | |
|---|---|---|---|---|---|---|
| | | ≤0.9 | ... | 8.9 | ... | 21.5 ≤ |
| BASIS WEIGHT (g/m$^2$) | . | . | . | . | | . |
| | 76〜90 | 1300V | ... | 700V | ... | 300V |
| | 91〜105 | 1450V | ... | 800V | ... | 350V |
| | 106〜128 | 1600V | ... | 900V | ... | 400V |
| | . | . | . | . | | . |

Fig. 5

△ N=1
1ST SIDE

| PRES VAL | | -20 | -19 | -18 | -17 | -16 | -15 | -14 | -13 | -12 | -11 |
|---|---|---|---|---|---|---|---|---|---|---|---|
| ADJST PTCH NO. n | 1 | -20 | -20 | -20 | -20 | -20 | -19 | -18 | -17 | -16 | -15 |
| | 2 | -19 | -19 | -19 | -19 | -19 | -18 | -17 | -16 | -15 | -14 |
| | 3 | -18 | -18 | -18 | -18 | -18 | -17 | -16 | -15 | -14 | -13 |
| | 4 | -17 | -17 | -17 | -17 | -17 | -16 | -15 | -14 | -13 | -12 |
| | 5 | -16 | -16 | -16 | -16 | -16 | -15 | -14 | -13 | -12 | -11 |
| | 6 | -15 | -15 | -15 | -15 | -15 | -14 | -13 | -12 | -11 | -10 |
| | 7 | -14 | -14 | -14 | -14 | -14 | -13 | -12 | -11 | -10 | -9 |
| | 8 | -13 | -13 | -13 | -13 | -13 | -12 | -11 | -10 | -9 | -8 |
| | 9 | -12 | -12 | -12 | -12 | -12 | -11 | -10 | -9 | -8 | -7 |
| | 10 | -11 | -11 | -11 | -11 | -11 | -10 | -9 | -8 | -7 | -6 |
| TRIG PTCH | | -16 | -16 | -16 | -16 | -16 | -15 | -14 | -13 | -12 | -11 |
| PRES VAL | | -10 | -9 | -8 | -7 | -6 | -5 | -4 | -3 | -2 | -1 |
| ADJST PTCH NO. n | 1 | -14 | -13 | -12 | -11 | -10 | -9 | -8 | -7 | -6 | -5 |
| | 2 | -13 | -12 | -11 | -10 | -9 | -8 | -7 | -6 | -5 | -4 |
| | 3 | -12 | -11 | -10 | -9 | -8 | -7 | -6 | -5 | -4 | -3 |
| | 4 | -11 | -10 | -9 | -8 | -7 | -6 | -5 | -4 | -3 | -2 |
| | 5 | -10 | -9 | -8 | -7 | -6 | -5 | -4 | -3 | -2 | -1 |
| | 6 | -9 | -8 | -7 | -6 | -5 | -4 | -3 | -2 | -1 | 0 |
| | 7 | -8 | -7 | -6 | -5 | -4 | -3 | -2 | -1 | 0 | 1 |
| | 8 | -7 | -6 | -5 | -4 | -3 | -2 | -1 | 0 | 1 | 2 |
| | 9 | -6 | -5 | -4 | -3 | -2 | -1 | 0 | 1 | 2 | 3 |
| | 10 | -5 | -4 | -3 | -2 | -1 | 0 | 1 | 2 | 3 | 4 |
| TRIG PTCH | | -10 | -9 | -8 | -7 | -6 | -5 | -4 | -3 | -2 | -1 |
| PRES VAL | | 0 | 1 | 2 | 3 | 4 | 5 | 6 | 7 | 8 | 9 |
| ADJST PTCH NO. n | 1 | -4 | -3 | -2 | -1 | 0 | 1 | 2 | 3 | 4 | 5 |
| | 2 | -3 | -2 | -1 | 0 | 1 | 2 | 3 | 4 | 5 | 6 |
| | 3 | -2 | -1 | 0 | 1 | 2 | 3 | 4 | 5 | 6 | 7 |
| | 4 | -1 | 0 | 1 | 2 | 3 | 4 | 5 | 6 | 7 | 8 |
| | 5 | 0 | 1 | 2 | 3 | 4 | 5 | 6 | 7 | 8 | 9 |
| | 6 | 1 | 2 | 3 | 4 | 5 | 6 | 7 | 8 | 9 | 10 |
| | 7 | 2 | 3 | 4 | 5 | 6 | 7 | 8 | 9 | 10 | 11 |
| | 8 | 3 | 4 | 5 | 6 | 7 | 8 | 9 | 10 | 11 | 12 |
| | 9 | 4 | 5 | 6 | 7 | 8 | 9 | 10 | 11 | 12 | 13 |
| | 10 | 5 | 6 | 7 | 8 | 9 | 10 | 11 | 12 | 13 | 14 |
| TRIG PTCH | | 0 | 1 | 2 | 3 | 4 | 5 | 6 | 7 | 8 | 9 |
| PRES VAL | | 10 | 11 | 12 | 13 | 14 | 15 | 16 | 17 | 18 | 19 | 20 |
| ADJST PTCH NO. n | 1 | 6 | 7 | 8 | 9 | 10 | 11 | 11 | 11 | 11 | 11 | 11 |
| | 2 | 7 | 8 | 9 | 10 | 11 | 12 | 12 | 12 | 12 | 12 | 12 |
| | 3 | 8 | 9 | 10 | 11 | 12 | 13 | 13 | 13 | 13 | 13 | 13 |
| | 4 | 9 | 10 | 11 | 12 | 13 | 14 | 14 | 14 | 14 | 14 | 14 |
| | 5 | 10 | 11 | 12 | 13 | 14 | 15 | 15 | 15 | 15 | 15 | 15 |
| | 6 | 11 | 12 | 13 | 14 | 15 | 16 | 16 | 16 | 16 | 16 | 16 |
| | 7 | 12 | 13 | 14 | 15 | 16 | 17 | 17 | 17 | 17 | 17 | 17 |
| | 8 | 13 | 14 | 15 | 16 | 17 | 18 | 18 | 18 | 18 | 18 | 18 |
| | 9 | 14 | 15 | 16 | 17 | 18 | 19 | 19 | 19 | 19 | 19 | 19 |
| | 10 | 15 | 16 | 17 | 18 | 19 | 20 | 20 | 20 | 20 | 20 | 20 |
| TRIG PTCH | | 10 | 11 | 12 | 13 | 14 | 15 | 15 | 15 | 15 | 15 | 15 |

Fig. 13

⊿N=1
2ND SIDE

| | PRES VAL | -20 | -19 | -18 | -17 | -16 | -15 | -14 | -13 | -12 | -11 |
|---|---|---|---|---|---|---|---|---|---|---|---|
| ADJST PTCH NO. n | 1 | -16 | -16 | -16 | -16 | -16 | -15 | -14 | -13 | -12 | -11 |
| | 2 | -20 | -20 | -20 | -20 | -20 | -19 | -18 | -17 | -16 | -15 |
| | 3 | -19 | -19 | -19 | -19 | -19 | -18 | -17 | -16 | -15 | -14 |
| | 4 | -18 | -18 | -18 | -18 | -18 | -17 | -16 | -15 | -14 | -13 |
| | 5 | -17 | -17 | -17 | -17 | -17 | -16 | -15 | -14 | -13 | -12 |
| | 6 | -16 | -16 | -16 | -16 | -16 | -15 | -14 | -13 | -12 | -11 |
| | 7 | -15 | -15 | -15 | -15 | -15 | -14 | -13 | -12 | -11 | -10 |
| | 8 | -14 | -14 | -14 | -14 | -14 | -13 | -12 | -11 | -10 | -9 |
| | 9 | -13 | -13 | -13 | -13 | -13 | -12 | -11 | -10 | -9 | -8 |
| | 10 | -12 | -12 | -12 | -12 | -12 | -11 | -10 | -9 | -8 | -7 |
| TRIG PTCH | | -11 | -11 | -11 | -11 | -11 | -10 | -9 | -8 | -7 | -6 |

| | PRES VAL | -10 | -9 | -8 | -7 | -6 | -5 | -4 | -3 | -2 | -1 |
|---|---|---|---|---|---|---|---|---|---|---|---|
| ADJST PTCH NO. n | 1 | -10 | -9 | -8 | -7 | -6 | -5 | -4 | -3 | -2 | -1 |
| | 2 | -14 | -13 | -12 | -11 | -10 | -9 | -8 | -7 | -6 | -5 |
| | 3 | -13 | -12 | -11 | -10 | -9 | -8 | -7 | -6 | -5 | -4 |
| | 4 | -12 | -11 | -10 | -9 | -8 | -7 | -6 | -5 | -4 | -3 |
| | 5 | -11 | -10 | -9 | -8 | -7 | -6 | -5 | -4 | -3 | -2 |
| | 6 | -10 | -9 | -8 | -7 | -6 | -5 | -4 | -3 | -2 | -1 |
| | 7 | -9 | -8 | -7 | -6 | -5 | -4 | -3 | -2 | -1 | 0 |
| | 8 | -8 | -7 | -6 | -5 | -4 | -3 | -2 | -1 | 0 | 1 |
| | 9 | -7 | -6 | -5 | -4 | -3 | -2 | -1 | 0 | 1 | 2 |
| | 10 | -6 | -5 | -4 | -3 | -2 | -1 | 0 | 1 | 2 | 3 |
| TRIG PTCH | | -5 | -4 | -3 | -2 | -1 | 0 | 1 | 2 | 3 | 4 |

| | PRES VAL | 0 | 1 | 2 | 3 | 4 | 5 | 6 | 7 | 8 | 9 |
|---|---|---|---|---|---|---|---|---|---|---|---|
| ADJST PTCH NO. n | 1 | 0 | 1 | 2 | 3 | 4 | 5 | 6 | 7 | 8 | 9 |
| | 2 | -4 | -3 | -2 | -1 | 0 | 1 | 2 | 3 | 4 | 5 |
| | 3 | -3 | -2 | -1 | 0 | 1 | 2 | 3 | 4 | 5 | 6 |
| | 4 | -2 | -1 | 0 | 1 | 2 | 3 | 4 | 5 | 6 | 7 |
| | 5 | -1 | 0 | 1 | 2 | 3 | 4 | 5 | 6 | 7 | 8 |
| | 6 | 0 | 1 | 2 | 3 | 4 | 5 | 6 | 7 | 8 | 9 |
| | 7 | 1 | 2 | 3 | 4 | 5 | 6 | 7 | 8 | 9 | 10 |
| | 8 | 2 | 3 | 4 | 5 | 6 | 7 | 8 | 9 | 10 | 11 |
| | 9 | 3 | 4 | 5 | 6 | 7 | 8 | 9 | 10 | 11 | 12 |
| | 10 | 4 | 5 | 6 | 7 | 8 | 9 | 10 | 11 | 12 | 13 |
| TRIG PTCH | | 5 | 6 | 7 | 8 | 9 | 10 | 11 | 12 | 13 | 14 |

| | PRES VAL | 10 | 11 | 12 | 13 | 14 | 15 | 16 | 17 | 18 | 19 | 20 |
|---|---|---|---|---|---|---|---|---|---|---|---|---|
| ADJST PTCH NO. n | 1 | 10 | 11 | 12 | 13 | 14 | 15 | 15 | 15 | 15 | 15 | 15 |
| | 2 | 6 | 7 | 8 | 9 | 10 | 11 | 11 | 11 | 11 | 11 | 11 |
| | 3 | 7 | 8 | 9 | 10 | 11 | 12 | 12 | 12 | 12 | 12 | 12 |
| | 4 | 8 | 9 | 10 | 11 | 12 | 13 | 13 | 13 | 13 | 13 | 13 |
| | 5 | 9 | 10 | 11 | 12 | 13 | 14 | 14 | 14 | 14 | 14 | 14 |
| | 6 | 10 | 11 | 12 | 13 | 14 | 15 | 15 | 15 | 15 | 15 | 15 |
| | 7 | 11 | 12 | 13 | 14 | 15 | 16 | 16 | 16 | 16 | 16 | 16 |
| | 8 | 12 | 13 | 14 | 15 | 16 | 17 | 17 | 17 | 17 | 17 | 17 |
| | 9 | 13 | 14 | 15 | 16 | 17 | 18 | 18 | 18 | 18 | 18 | 18 |
| | 10 | 14 | 15 | 16 | 17 | 18 | 19 | 19 | 19 | 19 | 19 | 19 |
| TRIG PTCH | | 15 | 16 | 17 | 18 | 19 | 20 | 20 | 20 | 20 | 20 | 20 |

Fig. 14

△N=2
1ST SIDE

| PRES VAL | | -20 | -19 | -18 | -17 | -16 | -15 | -14 | -13 | -12 | -11 |
|---|---|---|---|---|---|---|---|---|---|---|---|
| ADJST PTCH NO. n | 1 | -20 | -19 | -20 | -19 | -20 | -19 | -20 | -19 | -20 | -19 |
| | 2 | -18 | -17 | -18 | -17 | -18 | -17 | -18 | -17 | -18 | -17 |
| | 3 | -16 | -15 | -16 | -15 | -16 | -15 | -16 | -15 | -16 | -15 |
| | 4 | -14 | -13 | -14 | -13 | -14 | -13 | -14 | -13 | -14 | -13 |
| | 5 | -12 | -11 | -12 | -11 | -12 | -11 | -12 | -11 | -12 | -11 |
| | 6 | -10 | -9 | -10 | -9 | -10 | -9 | -10 | -9 | -10 | -9 |
| | 7 | -8 | -7 | -8 | -7 | -8 | -7 | -8 | -7 | -8 | -7 |
| | 8 | -6 | -5 | -6 | -5 | -6 | -5 | -6 | -5 | -6 | -5 |
| | 9 | -4 | -3 | -4 | -3 | -4 | -3 | -4 | -3 | -4 | -3 |
| | 10 | -2 | -1 | -2 | -1 | -2 | -1 | -2 | -1 | -2 | -1 |
| TRIG PTCH | | -12 | -11 | -12 | -11 | -12 | -11 | -12 | -11 | -12 | -11 |

| PRES VAL | | -10 | -9 | -8 | -7 | -6 | -5 | -4 | -3 | -2 | -1 |
|---|---|---|---|---|---|---|---|---|---|---|---|
| ADJST PTCH NO. n | 1 | -18 | -17 | -16 | -15 | -14 | -13 | -12 | -11 | -10 | -9 |
| | 2 | -16 | -15 | -14 | -13 | -12 | -11 | -10 | -9 | -8 | -7 |
| | 3 | -14 | -13 | -12 | -11 | -10 | -9 | -8 | -7 | -6 | -5 |
| | 4 | -12 | -11 | -10 | -9 | -8 | -7 | -6 | -5 | -4 | -3 |
| | 5 | -10 | -9 | -8 | -7 | -6 | -5 | -4 | -3 | -2 | -1 |
| | 6 | -8 | -7 | -6 | -5 | -4 | -3 | -2 | -1 | 0 | 1 |
| | 7 | -6 | -5 | -4 | -3 | -2 | -1 | 0 | 1 | 2 | 3 |
| | 8 | -4 | -3 | -2 | -1 | 0 | 1 | 2 | 3 | 4 | 5 |
| | 9 | -2 | -1 | 0 | 1 | 2 | 3 | 4 | 5 | 6 | 7 |
| | 10 | 0 | 1 | 2 | 3 | 4 | 5 | 6 | 7 | 8 | 9 |
| TRIG PTCH | | -10 | -9 | -8 | -7 | -6 | -5 | -4 | -3 | -2 | -1 |

| PRES VAL | | 0 | 1 | 2 | 3 | 4 | 5 | 6 | 7 | 8 | 9 |
|---|---|---|---|---|---|---|---|---|---|---|---|
| ADJST PTCH NO. n | 1 | -8 | -7 | -6 | -5 | -4 | -3 | -2 | -1 | 0 | 1 |
| | 2 | -6 | -5 | -4 | -3 | -2 | -1 | 0 | 1 | 2 | 3 |
| | 3 | -4 | -3 | -2 | -1 | 0 | 1 | 2 | 3 | 4 | 5 |
| | 4 | -2 | -1 | 0 | 1 | 2 | 3 | 4 | 5 | 6 | 7 |
| | 5 | 0 | 1 | 2 | 3 | 4 | 5 | 6 | 7 | 8 | 9 |
| | 6 | 2 | 3 | 4 | 5 | 6 | 7 | 8 | 9 | 10 | 11 |
| | 7 | 4 | 5 | 6 | 7 | 8 | 9 | 10 | 11 | 12 | 13 |
| | 8 | 6 | 7 | 8 | 9 | 10 | 11 | 12 | 13 | 14 | 15 |
| | 9 | 8 | 9 | 10 | 11 | 12 | 13 | 14 | 15 | 16 | 17 |
| | 10 | 10 | 11 | 12 | 13 | 14 | 15 | 16 | 17 | 18 | 19 |
| TRIG PTCH | | 0 | 1 | 2 | 3 | 4 | 5 | 6 | 7 | 8 | 9 |

| PRES VAL | | 10 | 11 | 12 | 13 | 14 | 15 | 16 | 17 | 18 | 19 | 20 |
|---|---|---|---|---|---|---|---|---|---|---|---|---|
| ADJST PTCH NO. n | 1 | 2 | 1 | 2 | 1 | 2 | 1 | 2 | 1 | 2 | 1 | 2 |
| | 2 | 4 | 3 | 4 | 3 | 4 | 3 | 4 | 3 | 4 | 3 | 4 |
| | 3 | 6 | 5 | 6 | 5 | 6 | 5 | 6 | 5 | 6 | 5 | 6 |
| | 4 | 8 | 7 | 8 | 7 | 8 | 7 | 8 | 7 | 8 | 7 | 8 |
| | 5 | 10 | 9 | 10 | 9 | 10 | 9 | 10 | 9 | 10 | 9 | 10 |
| | 6 | 12 | 11 | 12 | 11 | 12 | 11 | 12 | 11 | 12 | 11 | 12 |
| | 7 | 14 | 13 | 14 | 13 | 14 | 13 | 14 | 13 | 14 | 13 | 14 |
| | 8 | 16 | 15 | 16 | 15 | 16 | 15 | 16 | 15 | 16 | 15 | 16 |
| | 9 | 18 | 17 | 18 | 17 | 18 | 17 | 18 | 17 | 18 | 17 | 18 |
| | 10 | 20 | 19 | 20 | 19 | 20 | 19 | 20 | 19 | 20 | 19 | 20 |
| TRIG PTCH | | 10 | 9 | 10 | 9 | 10 | 9 | 10 | 9 | 10 | 9 | 10 |

Fig. 15

∠N=2
2ND SIDE

| PRES VAL | | -20 | -19 | -18 | -17 | -16 | -15 | -14 | -13 | -12 | -11 |
|---|---|---|---|---|---|---|---|---|---|---|---|
| ADJST PTCH NO. n | 1 | -20 | -19 | -20 | -19 | -20 | -19 | -20 | -19 | -20 | -19 |
| | 2 | -18 | -17 | -18 | -17 | -18 | -17 | -18 | -17 | -18 | -17 |
| | 3 | -16 | -15 | -16 | -15 | -16 | -15 | -16 | -15 | -16 | -15 |
| | 4 | -14 | -13 | -14 | -13 | -14 | -13 | -14 | -13 | -14 | -13 |
| | 5 | -12 | -11 | -12 | -11 | -12 | -11 | -12 | -11 | -12 | -11 |
| | 6 | -10 | -9 | -10 | -9 | -10 | -9 | -10 | -9 | -10 | -9 |
| | 7 | -8 | -7 | -8 | -7 | -8 | -7 | -8 | -7 | -8 | -7 |
| | 8 | -6 | -5 | -6 | -5 | -6 | -5 | -6 | -5 | -6 | -5 |
| | 9 | -4 | -3 | -4 | -3 | -4 | -3 | -4 | -3 | -4 | -3 |
| | 10 | -2 | -1 | -2 | -1 | -2 | -1 | -2 | -1 | -2 | -1 |
| TRIG PTCH | | -12 | -11 | -12 | -11 | -12 | -11 | -12 | -11 | -12 | -11 |

| PRES VAL | | -10 | -9 | -8 | -7 | -6 | -5 | -4 | -3 | -2 | -1 |
|---|---|---|---|---|---|---|---|---|---|---|---|
| ADJST PTCH NO. n | 1 | -18 | -17 | -16 | -15 | -14 | -13 | -12 | -11 | -10 | -9 |
| | 2 | -16 | -15 | -14 | -13 | -12 | -11 | -10 | -9 | -8 | -7 |
| | 3 | -14 | -13 | -12 | -11 | -10 | -9 | -8 | -7 | -6 | -5 |
| | 4 | -12 | -11 | -10 | -9 | -8 | -7 | -6 | -5 | -4 | -3 |
| | 5 | -10 | -9 | -8 | -7 | -6 | -5 | -4 | -3 | -2 | -1 |
| | 6 | -8 | -7 | -6 | -5 | -4 | -3 | -2 | -1 | 0 | 1 |
| | 7 | -6 | -5 | -4 | -3 | -2 | -1 | 0 | 1 | 2 | 3 |
| | 8 | -4 | -3 | -2 | -1 | 0 | 1 | 2 | 3 | 4 | 5 |
| | 9 | -2 | -1 | 0 | 1 | 2 | 3 | 4 | 5 | 6 | 7 |
| | 10 | 0 | 1 | 2 | 3 | 4 | 5 | 6 | 7 | 8 | 9 |
| TRIG PTCH | | -10 | -9 | -8 | -7 | -6 | -5 | -4 | -3 | -2 | -1 |

| PRES VAL | | 0 | 1 | 2 | 3 | 4 | 5 | 6 | 7 | 8 | 9 |
|---|---|---|---|---|---|---|---|---|---|---|---|
| ADJST PTCH NO. n | 1 | -8 | -7 | -6 | -5 | -4 | -3 | -2 | -1 | 0 | 1 |
| | 2 | -6 | -5 | -4 | -3 | -2 | -1 | 0 | 1 | 2 | 3 |
| | 3 | -4 | -3 | -2 | -1 | 0 | 1 | 2 | 3 | 4 | 5 |
| | 4 | -2 | -1 | 0 | 1 | 2 | 3 | 4 | 5 | 6 | 7 |
| | 5 | 0 | 1 | 2 | 3 | 4 | 5 | 6 | 7 | 8 | 9 |
| | 6 | 2 | 3 | 4 | 5 | 6 | 7 | 8 | 9 | 10 | 11 |
| | 7 | 4 | 5 | 6 | 7 | 8 | 9 | 10 | 11 | 12 | 13 |
| | 8 | 6 | 7 | 8 | 9 | 10 | 11 | 12 | 13 | 14 | 15 |
| | 9 | 8 | 9 | 10 | 11 | 12 | 13 | 14 | 15 | 16 | 17 |
| | 10 | 10 | 11 | 12 | 13 | 14 | 15 | 16 | 17 | 18 | 19 |
| TRIG PTCH | | 0 | 1 | 2 | 3 | 4 | 5 | 6 | 7 | 8 | 9 |

| PRES VAL | | 10 | 11 | 12 | 13 | 14 | 15 | 16 | 17 | 18 | 19 | 20 |
|---|---|---|---|---|---|---|---|---|---|---|---|---|
| ADJST PTCH NO. n | 1 | 2 | 1 | 2 | 1 | 2 | 1 | 2 | 1 | 2 | 1 | 2 |
| | 2 | 4 | 3 | 4 | 3 | 4 | 3 | 4 | 3 | 4 | 3 | 4 |
| | 3 | 6 | 5 | 6 | 5 | 6 | 5 | 6 | 5 | 6 | 5 | 6 |
| | 4 | 8 | 7 | 8 | 7 | 8 | 7 | 8 | 7 | 8 | 7 | 8 |
| | 5 | 10 | 9 | 10 | 9 | 10 | 9 | 10 | 9 | 10 | 9 | 10 |
| | 6 | 12 | 11 | 12 | 11 | 12 | 11 | 12 | 11 | 12 | 11 | 12 |
| | 7 | 14 | 13 | 14 | 13 | 14 | 13 | 14 | 13 | 14 | 13 | 14 |
| | 8 | 16 | 15 | 16 | 15 | 16 | 15 | 16 | 15 | 16 | 15 | 16 |
| | 9 | 18 | 17 | 18 | 17 | 18 | 17 | 18 | 17 | 18 | 17 | 18 |
| | 10 | 20 | 19 | 20 | 19 | 20 | 19 | 20 | 19 | 20 | 19 | 20 |
| TRIG PTCH | | 10 | 9 | 10 | 9 | 10 | 9 | 10 | 9 | 10 | 9 | 10 |

Fig. 16

△ N=3
1ST SIDE

| PRES VAL | | -20 | -19 | -18 | -17 | -16 | -15 | -14 | -13 | -12 | -11 |
|---|---|---|---|---|---|---|---|---|---|---|---|
| ADJST PTCH NO. n | 1 | -20 | -19 | -18 | -20 | -19 | -18 | -20 | -19 | -18 | -20 |
| | 2 | -17 | -16 | -15 | -17 | -16 | -15 | -17 | -16 | -15 | -17 |
| | 3 | -14 | -13 | -12 | -14 | -13 | -12 | -14 | -13 | -12 | -14 |
| | 4 | -11 | -10 | -9 | -11 | -10 | -9 | -11 | -10 | -9 | -11 |
| | 5 | -8 | -7 | -6 | -8 | -7 | -6 | -8 | -7 | -6 | -8 |
| | 6 | -5 | -4 | -3 | -5 | -4 | -3 | -5 | -4 | -3 | -5 |
| | 7 | -2 | -1 | 0 | -2 | -1 | 0 | -2 | -1 | 0 | -2 |
| | 8 | 1 | 2 | 3 | 1 | 2 | 3 | 1 | 2 | 3 | 1 |
| | 9 | 4 | 5 | 6 | 4 | 5 | 6 | 4 | 5 | 6 | 4 |
| | 10 | 7 | 8 | 9 | 7 | 8 | 9 | 7 | 8 | 9 | 7 |
| TRIG PTCH | | -8 | -7 | -6 | -8 | -7 | -6 | -8 | -7 | -6 | -8 |

| PRES VAL | | -10 | -9 | -8 | -7 | -6 | -5 | -4 | -3 | -2 | -1 |
|---|---|---|---|---|---|---|---|---|---|---|---|
| ADJST PTCH NO. n | 1 | -19 | -18 | -20 | -19 | -18 | -17 | -16 | -15 | -14 | -13 |
| | 2 | -16 | -15 | -17 | -16 | -15 | -14 | -13 | -12 | -11 | -10 |
| | 3 | -13 | -12 | -14 | -13 | -12 | -11 | -10 | -9 | -8 | -7 |
| | 4 | -10 | -9 | -11 | -10 | -9 | -8 | -7 | -6 | -5 | -4 |
| | 5 | -7 | -6 | -8 | -7 | -6 | -5 | -4 | -3 | -2 | -1 |
| | 6 | -4 | -3 | -5 | -4 | -3 | -2 | -1 | 0 | 1 | 2 |
| | 7 | -1 | 0 | -2 | -1 | 0 | 1 | 2 | 3 | 4 | 5 |
| | 8 | 2 | 3 | 1 | 2 | 3 | 4 | 5 | 6 | 7 | 8 |
| | 9 | 5 | 6 | 4 | 5 | 6 | 7 | 8 | 9 | 10 | 11 |
| | 10 | 8 | 9 | 7 | 8 | 9 | 10 | 11 | 12 | 13 | 14 |
| TRIG PTCH | | -7 | -6 | -8 | -7 | -6 | -5 | -4 | -3 | -2 | -1 |

| PRES VAL | | 0 | 1 | 2 | 3 | 4 | 5 | 6 | 7 | 8 | 9 |
|---|---|---|---|---|---|---|---|---|---|---|---|
| ADJST PTCH NO. n | 1 | -12 | -11 | -10 | -9 | -8 | -7 | -9 | -8 | -7 | -9 |
| | 2 | -9 | -8 | -7 | -6 | -5 | -4 | -6 | -5 | -4 | -6 |
| | 3 | -6 | -5 | -4 | -3 | -2 | -1 | -3 | -2 | -1 | -3 |
| | 4 | -3 | -2 | -1 | 0 | 1 | 2 | 0 | 1 | 2 | 0 |
| | 5 | 0 | 1 | 2 | 3 | 4 | 5 | 3 | 4 | 5 | 3 |
| | 6 | 3 | 4 | 5 | 6 | 7 | 8 | 6 | 7 | 8 | 6 |
| | 7 | 6 | 7 | 8 | 9 | 10 | 11 | 9 | 10 | 11 | 9 |
| | 8 | 9 | 10 | 11 | 12 | 13 | 14 | 12 | 13 | 14 | 12 |
| | 9 | 12 | 13 | 14 | 15 | 16 | 17 | 15 | 16 | 17 | 15 |
| | 10 | 15 | 16 | 17 | 18 | 19 | 20 | 18 | 19 | 20 | 18 |
| TRIG PTCH | | 0 | 1 | 2 | 3 | 4 | 5 | 3 | 4 | 5 | 3 |

| PRES VAL | | 10 | 11 | 12 | 13 | 14 | 15 | 16 | 17 | 18 | 19 | 20 |
|---|---|---|---|---|---|---|---|---|---|---|---|---|
| ADJST PTCH NO. n | 1 | -8 | -7 | -9 | -8 | -7 | -9 | -8 | -7 | -9 | -8 | -7 |
| | 2 | -5 | -4 | -6 | -5 | -4 | -6 | -5 | -4 | -6 | -5 | -4 |
| | 3 | -2 | -1 | -3 | -2 | -1 | -3 | -2 | -1 | -3 | -2 | -1 |
| | 4 | 1 | 2 | 0 | 1 | 2 | 0 | 1 | 2 | 0 | 1 | 2 |
| | 5 | 4 | 5 | 3 | 4 | 5 | 3 | 4 | 5 | 3 | 4 | 5 |
| | 6 | 7 | 8 | 6 | 7 | 8 | 6 | 7 | 8 | 6 | 7 | 8 |
| | 7 | 10 | 11 | 9 | 10 | 11 | 9 | 10 | 11 | 9 | 10 | 11 |
| | 8 | 13 | 14 | 12 | 13 | 14 | 12 | 13 | 14 | 12 | 13 | 14 |
| | 9 | 16 | 17 | 15 | 16 | 17 | 15 | 16 | 17 | 15 | 16 | 17 |
| | 10 | 19 | 20 | 18 | 19 | 20 | 18 | 19 | 20 | 18 | 19 | 20 |
| TRIG PTCH | | 4 | 5 | 3 | 4 | 5 | 3 | 4 | 5 | 3 | 4 | 5 |

Fig. 17

ΔN=3
2ND SIDE

| PRES VAL | | -20 | -19 | -18 | -17 | -16 | -15 | -14 | -13 | -12 | -11 |
|---|---|---|---|---|---|---|---|---|---|---|---|
| ADJST PTCH NO. n | 1 | -20 | -19 | -18 | -20 | -19 | -18 | -20 | -19 | -18 | -20 |
| | 2 | -17 | -16 | -15 | -17 | -16 | -15 | -17 | -16 | -15 | -17 |
| | 3 | -14 | -13 | -12 | -14 | -13 | -12 | -14 | -13 | -12 | -14 |
| | 4 | -11 | -10 | -9 | -11 | -10 | -9 | -11 | -10 | -9 | -11 |
| | 5 | -8 | -7 | -6 | -8 | -7 | -6 | -8 | -7 | -6 | -8 |
| | 6 | -5 | -4 | -3 | -5 | -4 | -3 | -5 | -4 | -3 | -5 |
| | 7 | -2 | -1 | 0 | -2 | -1 | 0 | -2 | -1 | 0 | -2 |
| | 8 | 1 | 2 | 3 | 1 | 2 | 3 | 1 | 2 | 3 | 1 |
| | 9 | 4 | 5 | 6 | 4 | 5 | 6 | 4 | 5 | 6 | 4 |
| | 10 | 7 | 8 | 9 | 7 | 8 | 9 | 7 | 8 | 9 | 7 |
| TRIG PTCH | | -8 | -7 | -6 | -8 | -7 | -6 | -8 | -7 | -6 | -8 |

| PRES VAL | | -10 | -9 | -8 | -7 | -6 | -5 | -4 | -3 | -2 | -1 |
|---|---|---|---|---|---|---|---|---|---|---|---|
| ADJST PTCH NO. n | 1 | -19 | -18 | -20 | -19 | -18 | -17 | -16 | -15 | -14 | -13 |
| | 2 | -16 | -15 | -17 | -16 | -15 | -14 | -13 | -12 | -11 | -10 |
| | 3 | -13 | -12 | -14 | -13 | -12 | -11 | -10 | -9 | -8 | -7 |
| | 4 | -10 | -9 | -11 | -10 | -9 | -8 | -7 | -6 | -5 | -4 |
| | 5 | -7 | -6 | -8 | -7 | -6 | -5 | -4 | -3 | -2 | -1 |
| | 6 | -4 | -3 | -5 | -4 | -3 | -2 | -1 | 0 | 1 | 2 |
| | 7 | -1 | 0 | -2 | -1 | 0 | 1 | 2 | 3 | 4 | 5 |
| | 8 | 2 | 3 | 1 | 2 | 3 | 4 | 5 | 6 | 7 | 8 |
| | 9 | 5 | 6 | 4 | 5 | 6 | 7 | 8 | 9 | 10 | 11 |
| | 10 | 8 | 9 | 7 | 8 | 9 | 10 | 11 | 12 | 13 | 14 |
| TRIG PTCH | | -7 | -6 | -8 | -7 | -6 | -5 | -4 | -3 | -2 | -1 |

| PRES VAL | | 0 | 1 | 2 | 3 | 4 | 5 | 6 | 7 | 8 | 9 |
|---|---|---|---|---|---|---|---|---|---|---|---|
| ADJST PTCH NO. n | 1 | -12 | -11 | -10 | -9 | -8 | -7 | -9 | -8 | -7 | -9 |
| | 2 | -9 | -8 | -7 | -6 | -5 | -4 | -6 | -5 | -4 | -6 |
| | 3 | -6 | -5 | -4 | -3 | -2 | -1 | -3 | -2 | -1 | -3 |
| | 4 | -3 | -2 | -1 | 0 | 1 | 2 | 0 | 1 | 2 | 0 |
| | 5 | 0 | 1 | 2 | 3 | 4 | 5 | 3 | 4 | 5 | 3 |
| | 6 | 3 | 4 | 5 | 6 | 7 | 8 | 6 | 7 | 8 | 6 |
| | 7 | 6 | 7 | 8 | 9 | 10 | 11 | 9 | 10 | 11 | 9 |
| | 8 | 9 | 10 | 11 | 12 | 13 | 14 | 12 | 13 | 14 | 12 |
| | 9 | 12 | 13 | 14 | 15 | 16 | 17 | 15 | 16 | 17 | 15 |
| | 10 | 15 | 16 | 17 | 18 | 19 | 20 | 18 | 19 | 20 | 18 |
| TRIG PTCH | | 0 | 1 | 2 | 3 | 4 | 5 | 3 | 4 | 5 | 3 |

| PRES VAL | | 10 | 11 | 12 | 13 | 14 | 15 | 16 | 17 | 18 | 19 | 20 |
|---|---|---|---|---|---|---|---|---|---|---|---|---|
| ADJST PTCH NO. n | 1 | -8 | -7 | -9 | -8 | -7 | -9 | -8 | -7 | -9 | -8 | -7 |
| | 2 | -5 | -4 | -6 | -5 | -4 | -6 | -5 | -4 | -6 | -5 | -4 |
| | 3 | -2 | -1 | -3 | -2 | -1 | -3 | -2 | -1 | -3 | -2 | -1 |
| | 4 | 1 | 2 | 0 | 1 | 2 | 0 | 1 | 2 | 0 | 1 | 2 |
| | 5 | 4 | 5 | 3 | 4 | 5 | 3 | 4 | 5 | 3 | 4 | 5 |
| | 6 | 7 | 8 | 6 | 7 | 8 | 6 | 7 | 8 | 6 | 7 | 8 |
| | 7 | 10 | 11 | 9 | 10 | 11 | 9 | 10 | 11 | 9 | 10 | 11 |
| | 8 | 13 | 14 | 12 | 13 | 14 | 12 | 13 | 14 | 12 | 13 | 14 |
| | 9 | 16 | 17 | 15 | 16 | 17 | 15 | 16 | 17 | 15 | 16 | 17 |
| | 10 | 19 | 20 | 18 | 19 | 20 | 18 | 19 | 20 | 18 | 19 | 20 |
| TRIG PTCH | | 4 | 5 | 3 | 4 | 5 | 3 | 4 | 5 | 3 | 4 | 5 |

Fig. 18

IMAGE FORMING APPARATUS USING TEST CHART IN TWO-SIDED PRINTING

FIELD OF THE INVENTION AND RELATED ART

The present invention relates to an image forming apparatus, such as a printer, a copying machine, a facsimile machine, or a multi-function machine, of an electrophotographic type.

In an image forming apparatus, such as the printer, the copying machine, the facsimile machine, or the multi-function machine, of an electrophotographic type, a toner image formed on an image bearing member such as a photosensitive member or an intermediary transfer member is transferred onto a recording material. The transfer of the toner image from an image bearing member to the recording material is performed by applying a transfer voltage to a transfer member such as a transfer roller which contacts the image bearing member to form a transfer portion (transfer nip). The transfer voltage can be determined based on a transfer portion part voltage corresponding to the electrical resistance of the transfer portion detected during the pre-rotation process before image formation, and a recording material part voltage depending on a kind of the recording material. By doing so, an appropriate transfer voltage can be set according to the environmental fluctuations, the transfer member usage history, the recording material kind, and the like.

However, there are various types and conditions of recording materials used in the image formation, and therefore, the preset recording material part voltage may be higher or lower than the appropriate transfer voltage. Under the circumstances, an image forming apparatus operable in an adjustment mode in which set voltage (value) of a secondary transfer voltage is adjusted depending on the recording material actually used in the image formation is proposed, although typically in the case of an intermediary transfer type including an intermediary transfer belt as an image bearing member (Japanese Laid-open Patent Application No. 2021-9346). In the operation in the adjustment mode, a plurality of test toner images which are called patches are formed on a single recording material while switching the secondary transfer voltage. The recording material on which the plurality of patches are formed is called an adjusting chart. Then, the recording material part voltage is changed on the basis of an average image density acquired from densities of the respective patches formed on the adjusting chart, whereby the secondary transfer voltage set during image formation is adjusted.

However, conventionally, there was a case that depending on an image actually transferred on the recording material, proper transfer cannot be made in some instances at a secondary transfer voltage adjusted for transfer for the image on a second side (select) on the basis of the above-described adjusting chart. For example, such case is the case where a solid secondary color image is transferred on a first side (select) and a second side (select), i.e., on both sides (selects) of the recording material. In this case, a first-side image transferred in advance is a high duty image, so that the image formed on the first side (specifically, toner) constitutes a resistance during the transfer of the image on the second side. For that reason, conventionally, the secondary transfer voltage becomes excessively low, and thus the transfer is not sufficiently carried out, with the result that a density lowering can occur in the image on the second side.

SUMMARY OF THE INVENTION

In view of the above-described problem, a principal object of the present invention is to provide an image forming apparatus capable of adjusting a transfer voltage to a transfer voltage at which an "image density lowering" is suppressed when an image is transferred onto a second side of a recording material in the case of a constitution in which an occurrence in an adjustment mode in which the transfer voltage set for image formation on the basis of an adjusting chart is adjusted.

According to an aspect of the present invention, there is provided an image forming apparatus comprising an image bearing member configured to bear a toner image; an image forming portion configured to form the toner image on the image bearing member; a transfer member configured to transfer the toner image from the image bearing member onto a recording material having a first side and a second side; a power source configured to apply a transfer voltage, to the transfer member, for transferring the toner image from the image bearing member onto the recording material; a current detecting portion configured to detect a current outputted from the power source; an acquiring portion configured to acquire information on a density of an image transferred on the recording material; and a controller capable of executing an operation in an adjustment mode in which a test chart is outputted by transferring a plurality of test toner images onto the second side of the recording material under application of a plurality of different test voltages by the power source, and then on the basis of information on densities of the test toner images transferred on the test chart, the transfer voltage set for transfer of the toner image from the image bearing member onto the second side of the recording material is adjusted, wherein in the operation in the adjustment mode, the controller selects the test toner images for setting the transfer voltage for the second side of the recording material, on the basis of the information on the densities of the test toner images acquired by the acquiring portion, and then adjusts the transfer voltage for the second side of the recording material on the basis of the current detected by the current detecting portion when the selected test toner images are transferred onto the recording material.

Further features of the present invention will become apparent from the following description of exemplary embodiments with reference to the attached drawings.

Parts (a) and (b) of FIG. 5 are tables each showing table data of a recording material part voltage, in which part (a) shows the table on a first side of a recording material, and part (b) shows the table on a second side of the recording material.

Figure 6:
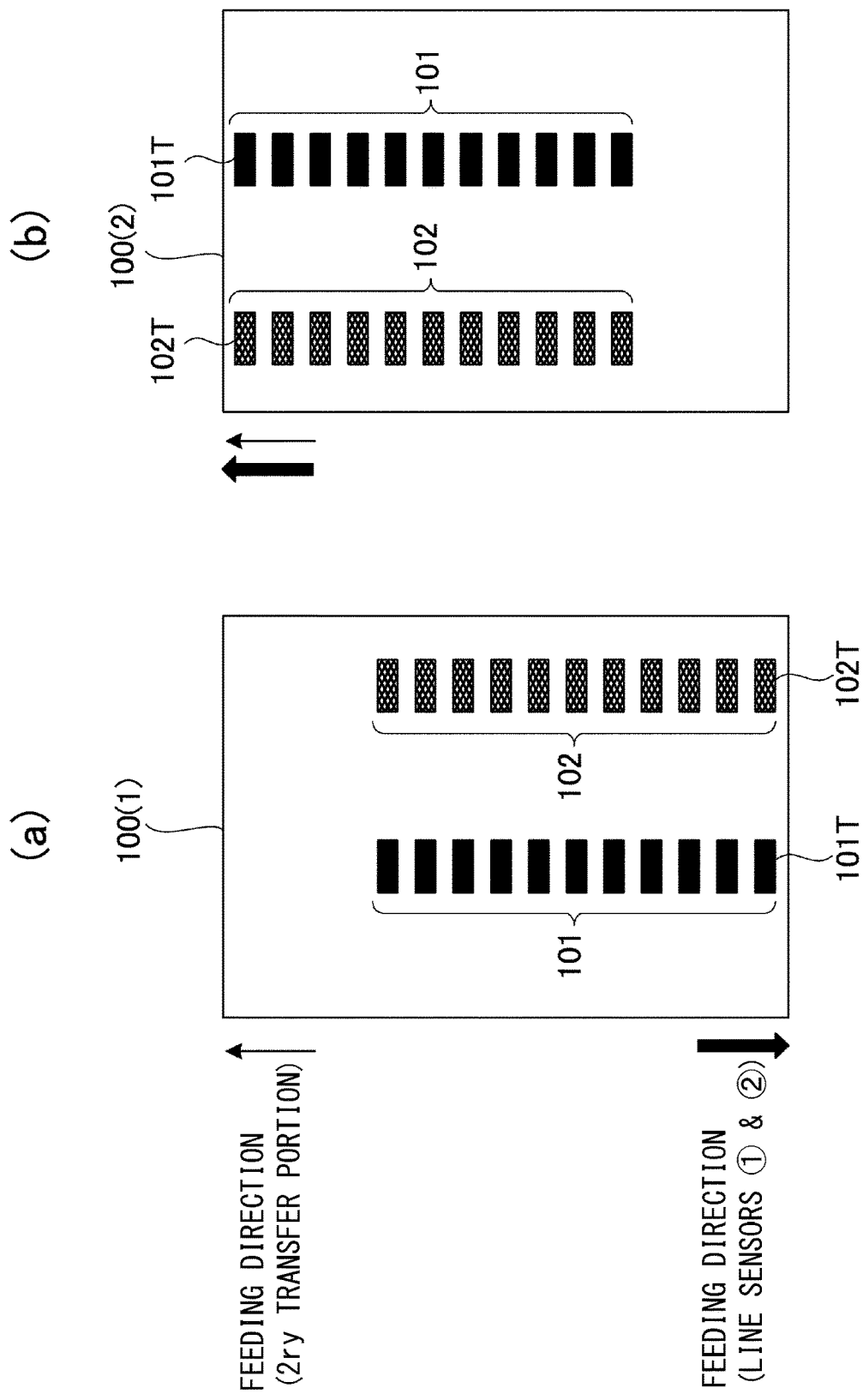

Parts (a) and (b) of FIG. 6 are schematic illustrations of a large chart on the first side and a large chart on the second side, respectively.

Figure 7:
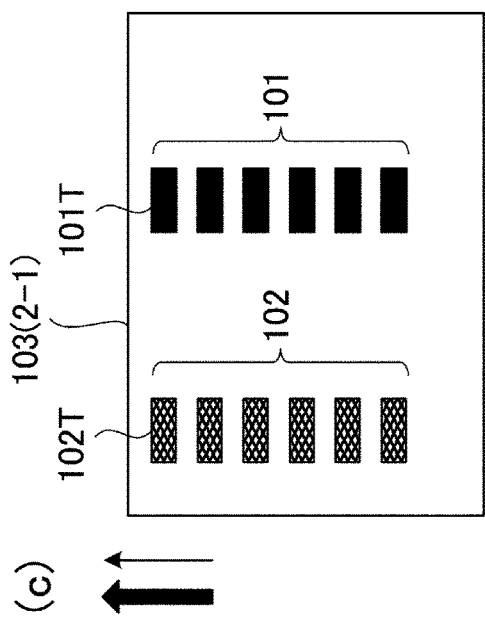
Figure 7:
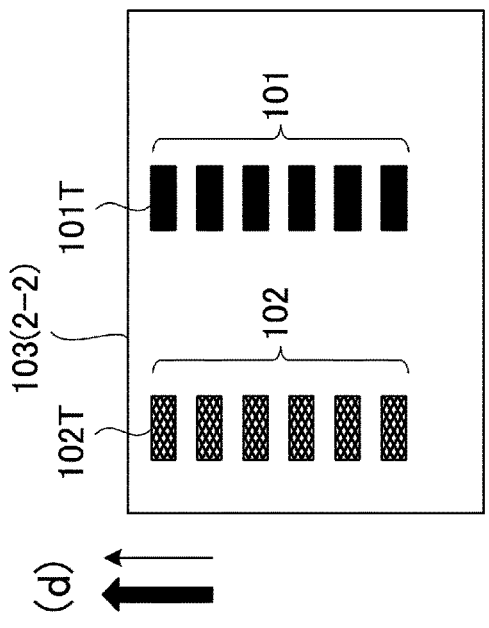
Figure 7:
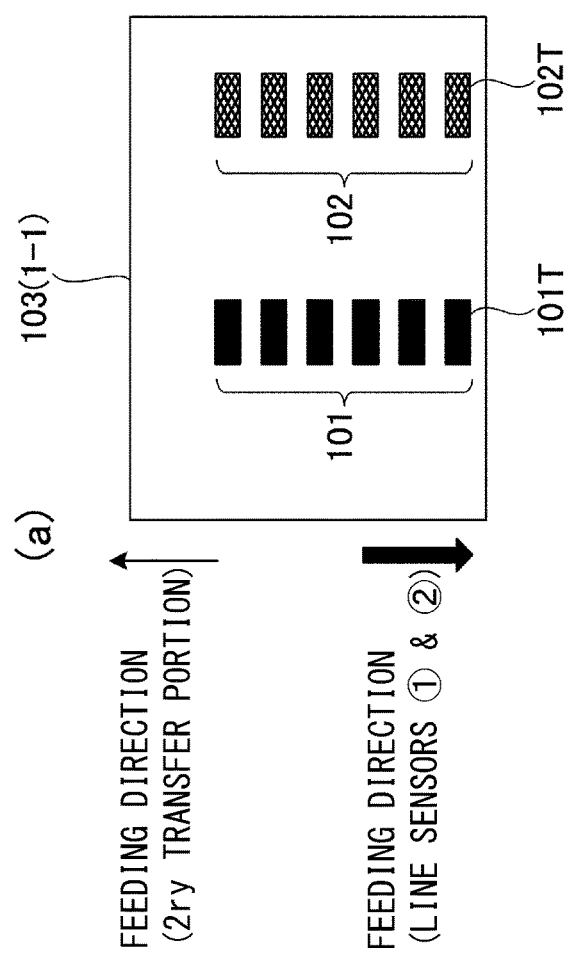
Figure 7:
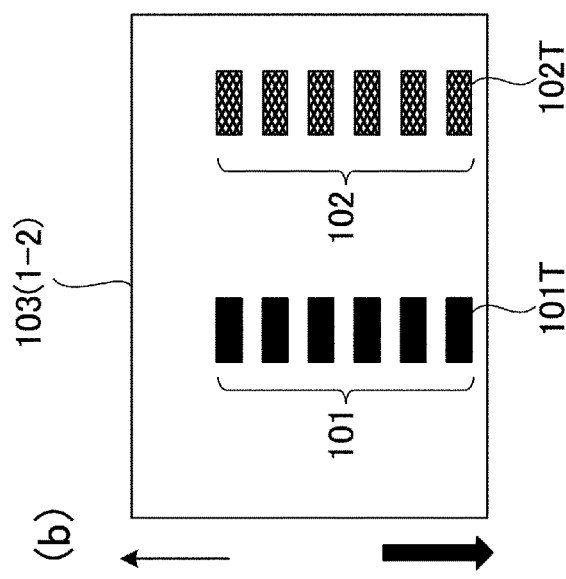

Parts (a) to (d) of FIG. 7 are schematic illustrations of small charts, in which part (a) shows the small chart on a first side of a first sheet, part (b) shows the small chart on a second side of the first sheet, part (c) shows the small chart on a first side of a second sheet, and part (d) shows the small chart on a second side of the second sheet.

Figure 8:
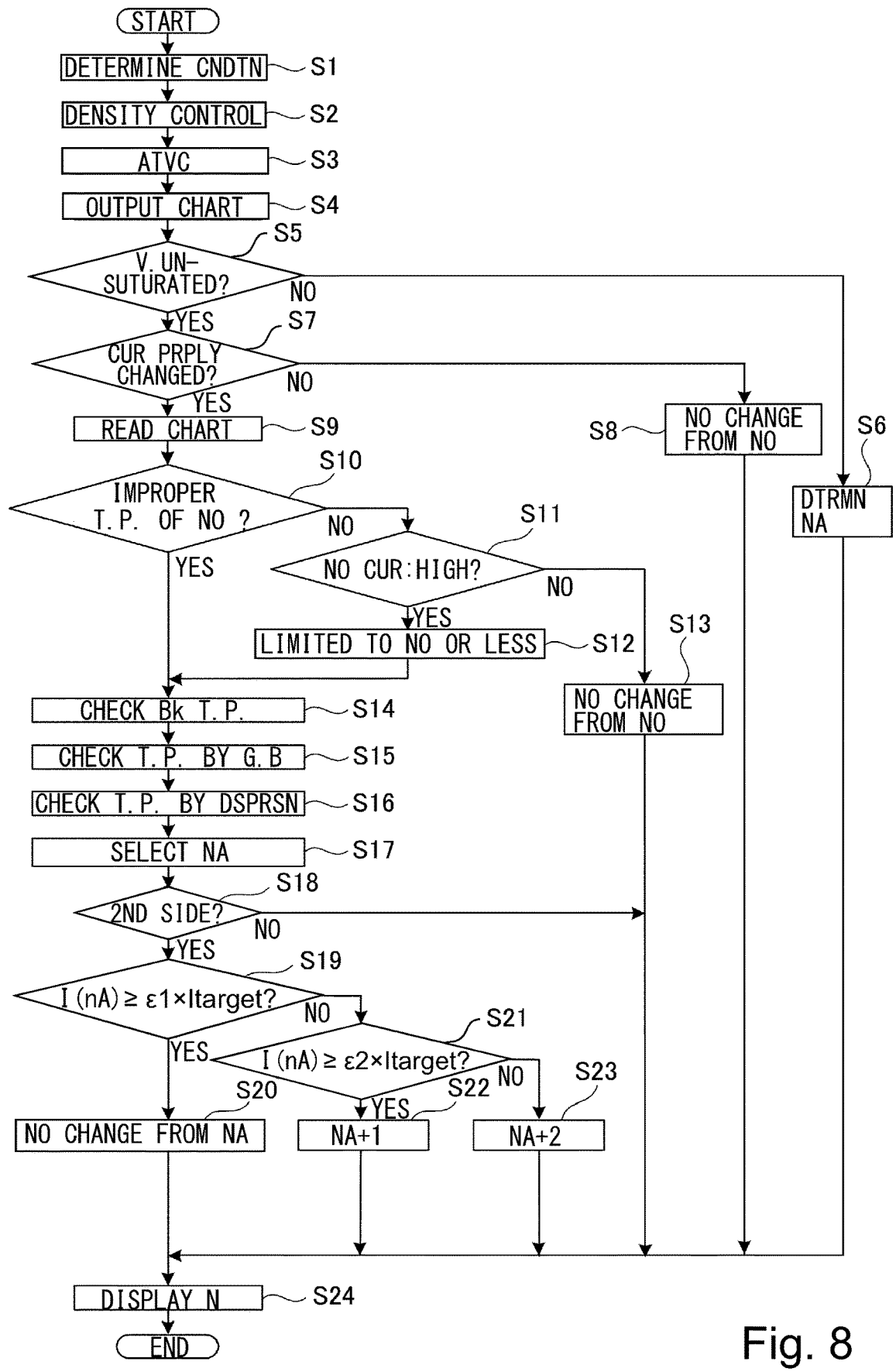

FIG. 8 is a flowchart showing an operation in an adjustment mode in the first embodiment.

Figure 9:
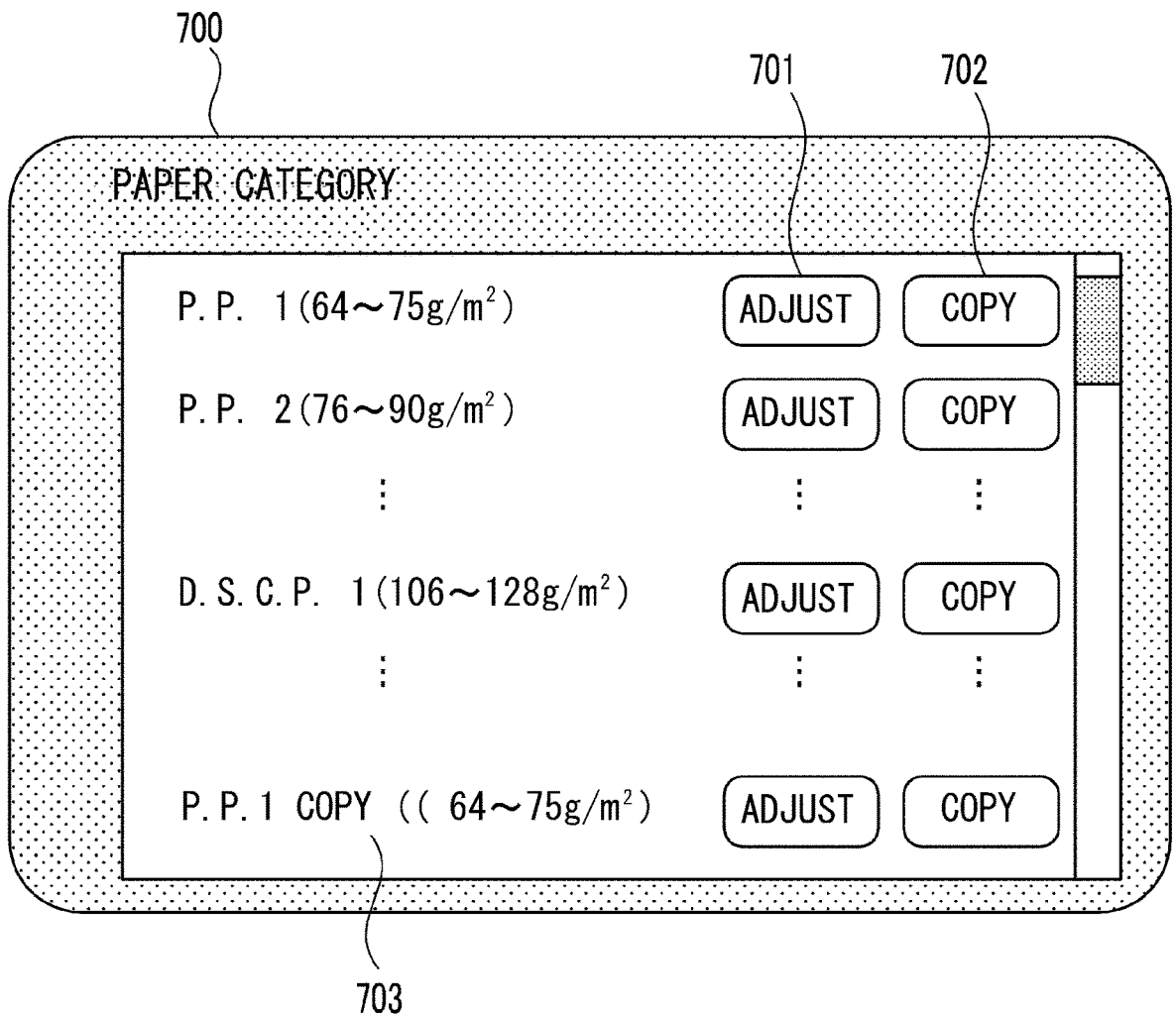

FIG. 9 is a schematic illustration showing a setting screen for selecting a paper kind category.

Figure 10:
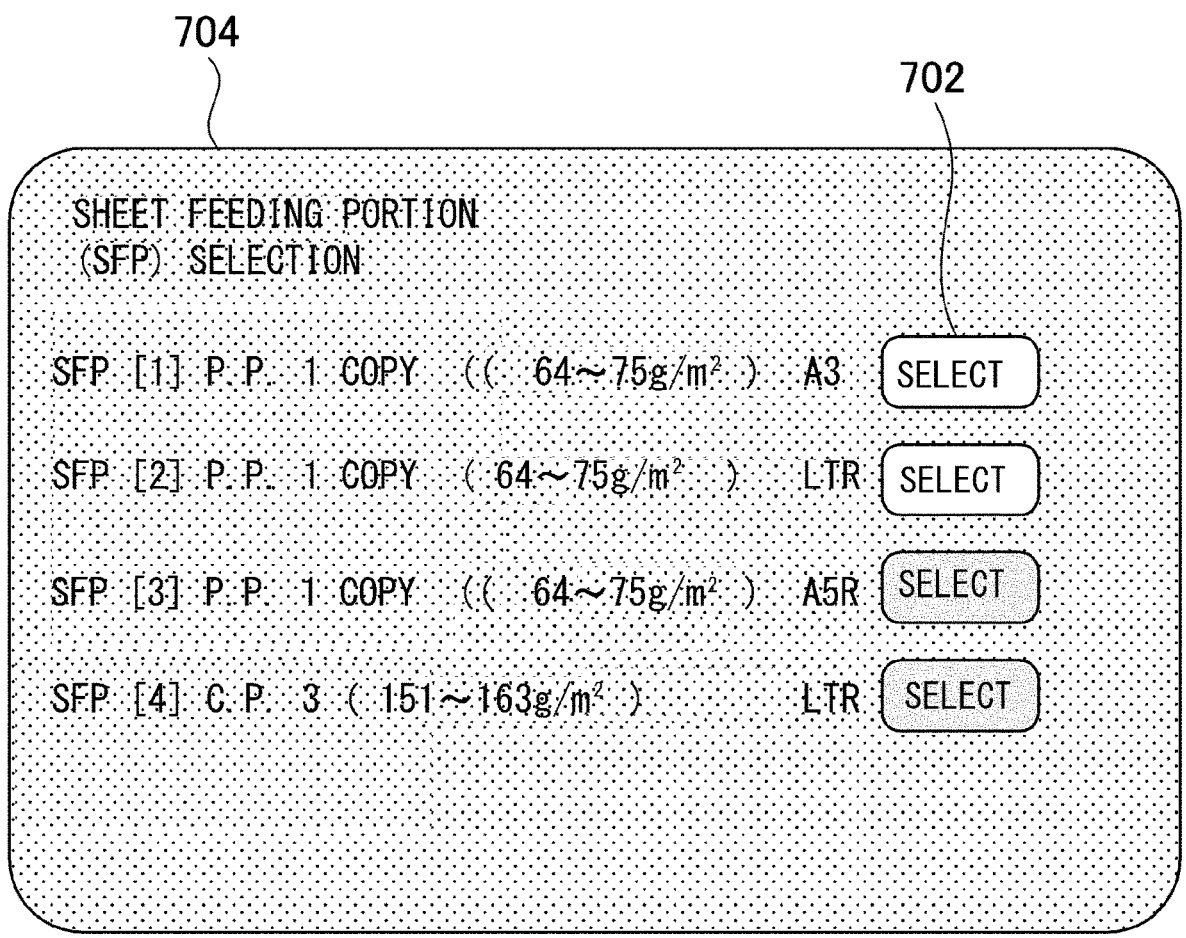

FIG. 10 is a schematic illustration showing a setting screen for selecting the recording material.

Figure 11:
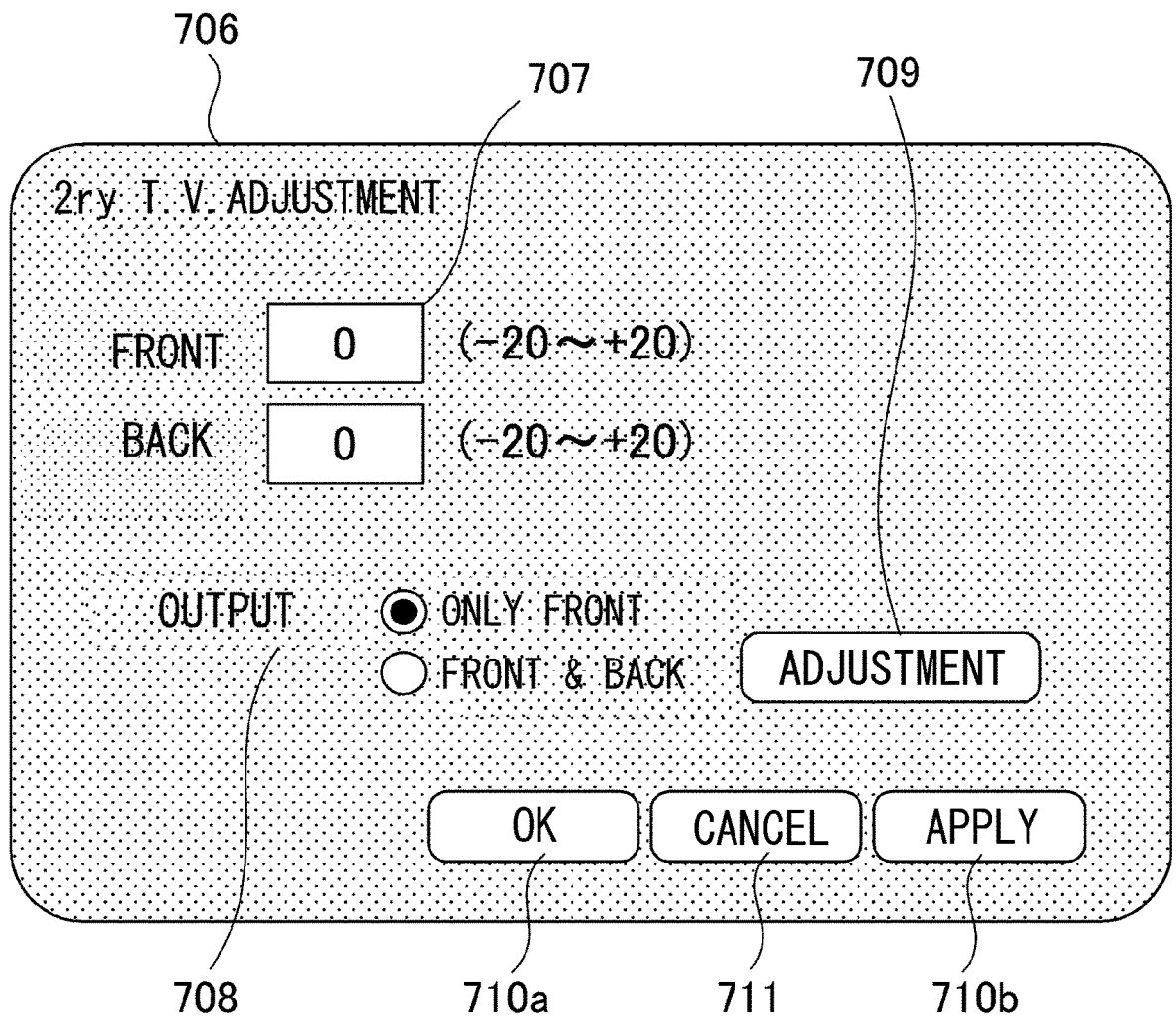

FIG. 11 is a schematic illustration showing a setting screen of the secondary transfer voltage.

Figure 12:
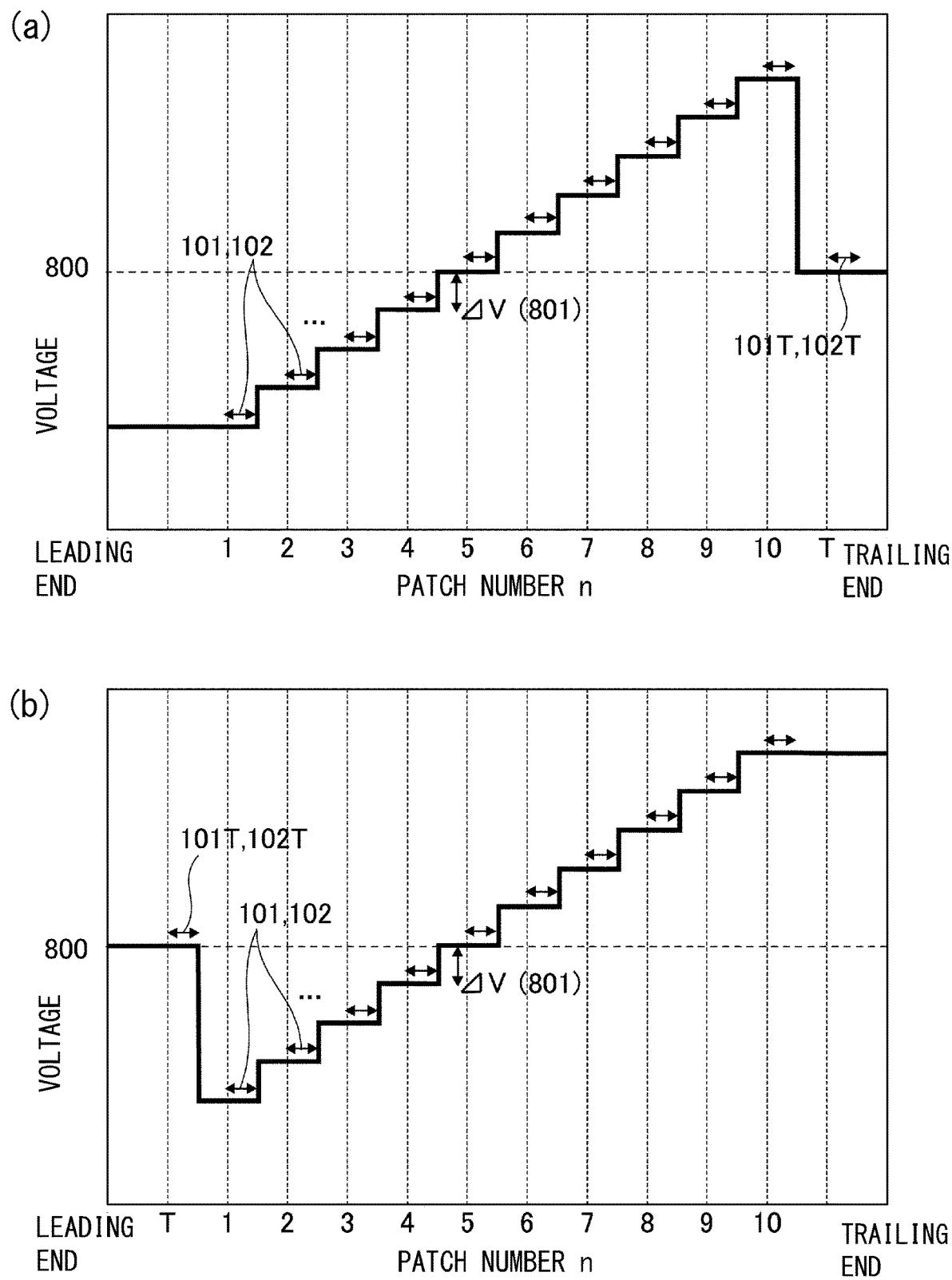

Parts (a) and (b) of FIG. 12 are graphs each showing a secondary transfer voltage during preparation of a large chart, in which part (a) shows the graph for the first side, and part (b) shows the graph for the second side.

FIG. 13 is a table showing adjusting values corresponding to patch numbers in the case of an adjusting value change $\Delta N=1$ and the first side.

FIG. 14 is a table showing adjusting values corresponding to patch numbers in the case of the adjusting value change $\Delta N=1$ and the second side.

FIG. 15 is a table showing adjusting values corresponding to patch numbers in the case of an adjusting value change $\Delta N=2$ and the first side.

FIG. 16 is a table showing adjusting values corresponding to patch numbers in the case of the adjusting value change $\Delta N=2$ and the second side.

FIG. 17 is a table showing adjusting values corresponding to patch numbers in the case of an adjusting value change $\Delta N=3$ and the first side.

FIG. 18 is a table showing adjusting values corresponding to patch numbers in the case of the adjusting value change $\Delta N=3$ and the second side.

Figure 19:
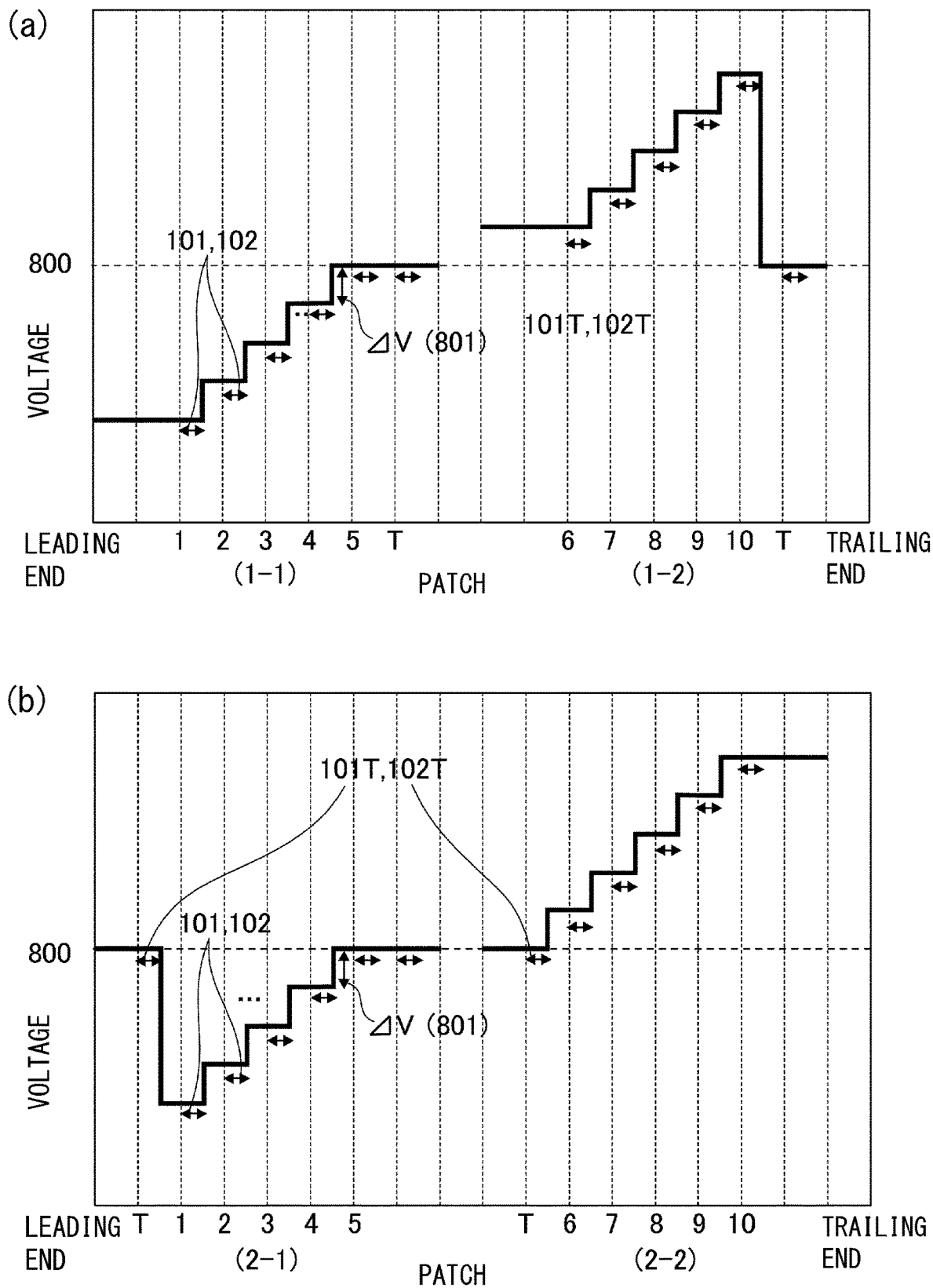

Parts (a) and (b) of FIG. 19 are graphs each showing a secondary transfer voltage during preparation of a small chart, in which part (a) shows the graph for the first side, and part (b) shows the graph for the second side.

Figure 20:
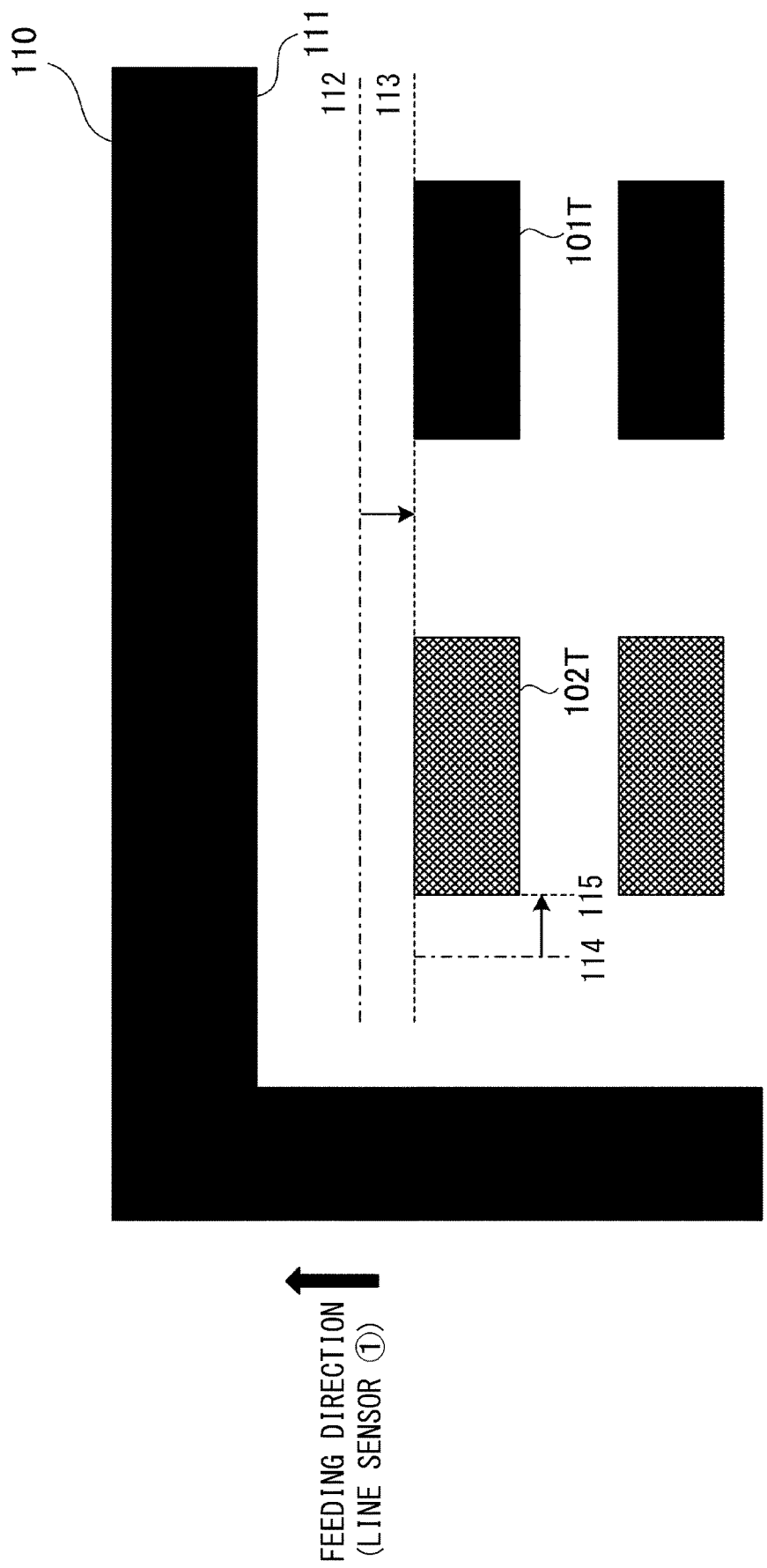

FIG. 20 is a schematic view for illustrating a method for detecting a position of a trigger patch.

Figure 21:
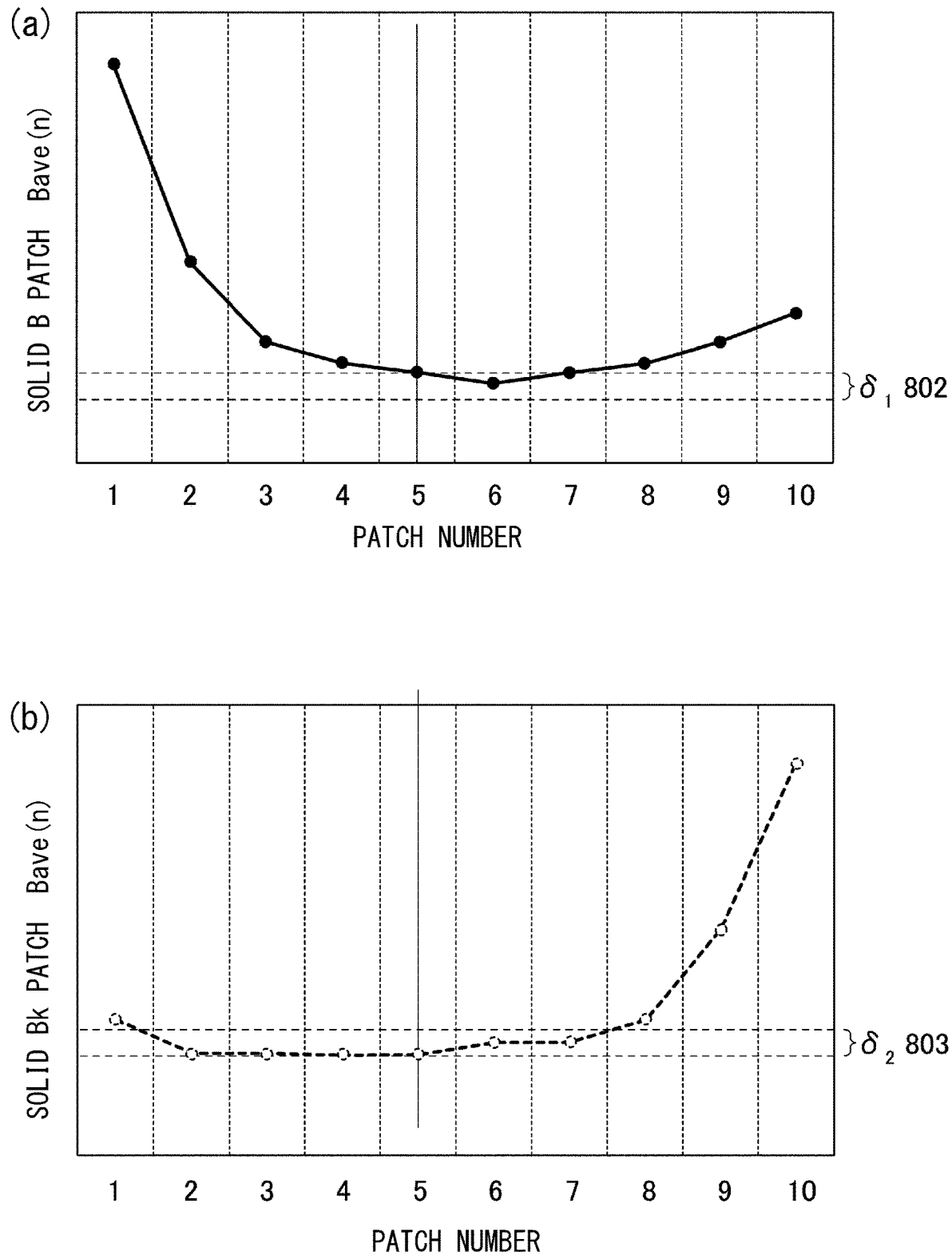

Parts (a) and (b) of FIG. 21 are graphs each for illustrating a discriminating method of a transfer property at a present adjusting value, in which part (a) shows an average brightness value of a solid blue patches, and part (b) shows an average brightness value of solid black patches.

Figure 22:
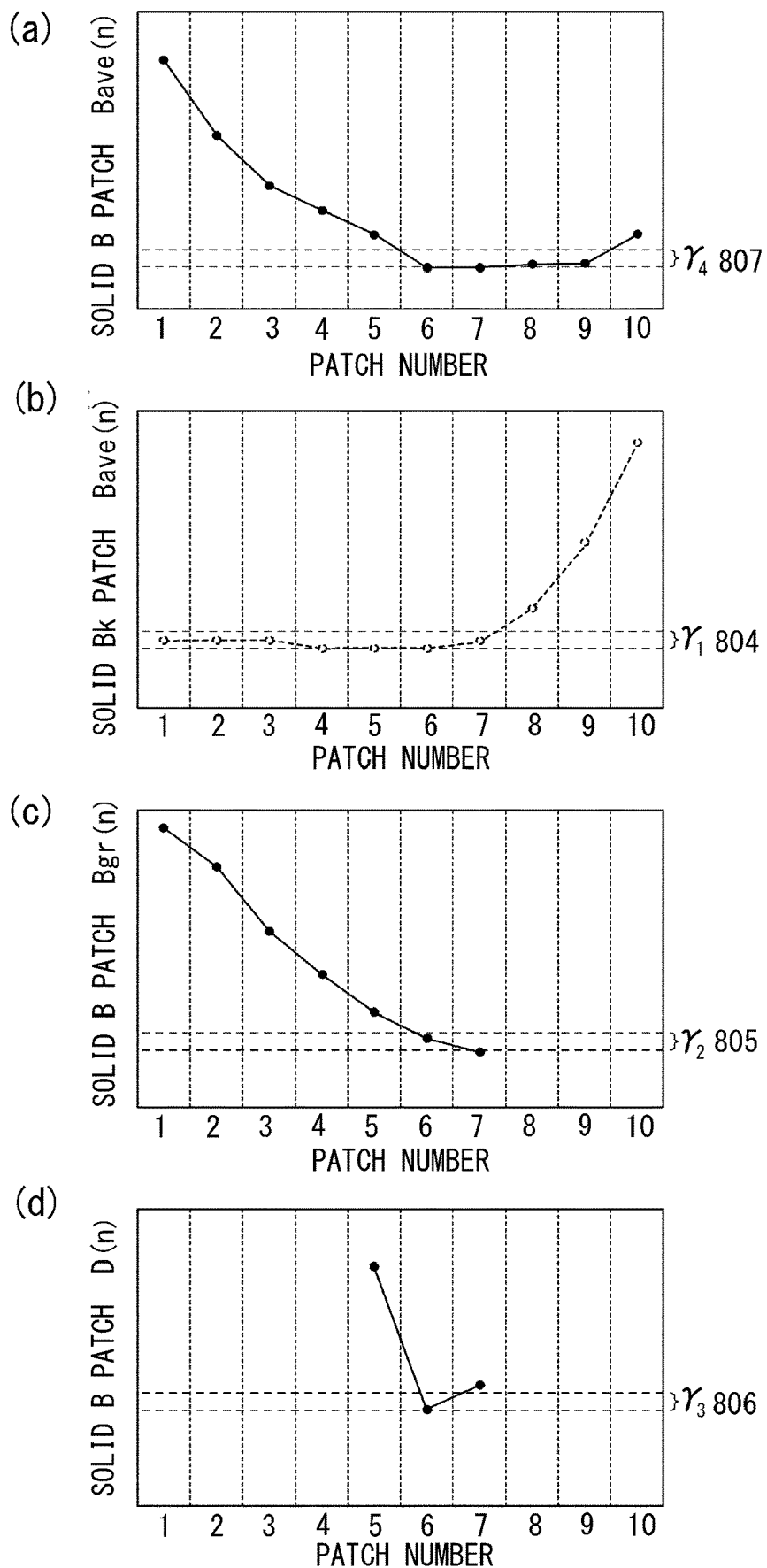

Parts (a) to (d) of FIG. 22 are graphs each for illustrating a selecting method of a patch with a good transfer property, in which part (a) shows an average brightness value of solid blue patches, part (b) shows an average brightness value of solid black patches, part (c) shows an average brightness value of grouped solid blue patches, and part (d) shows a brightness dispersion value of the solid blue patches.

Figure 23:
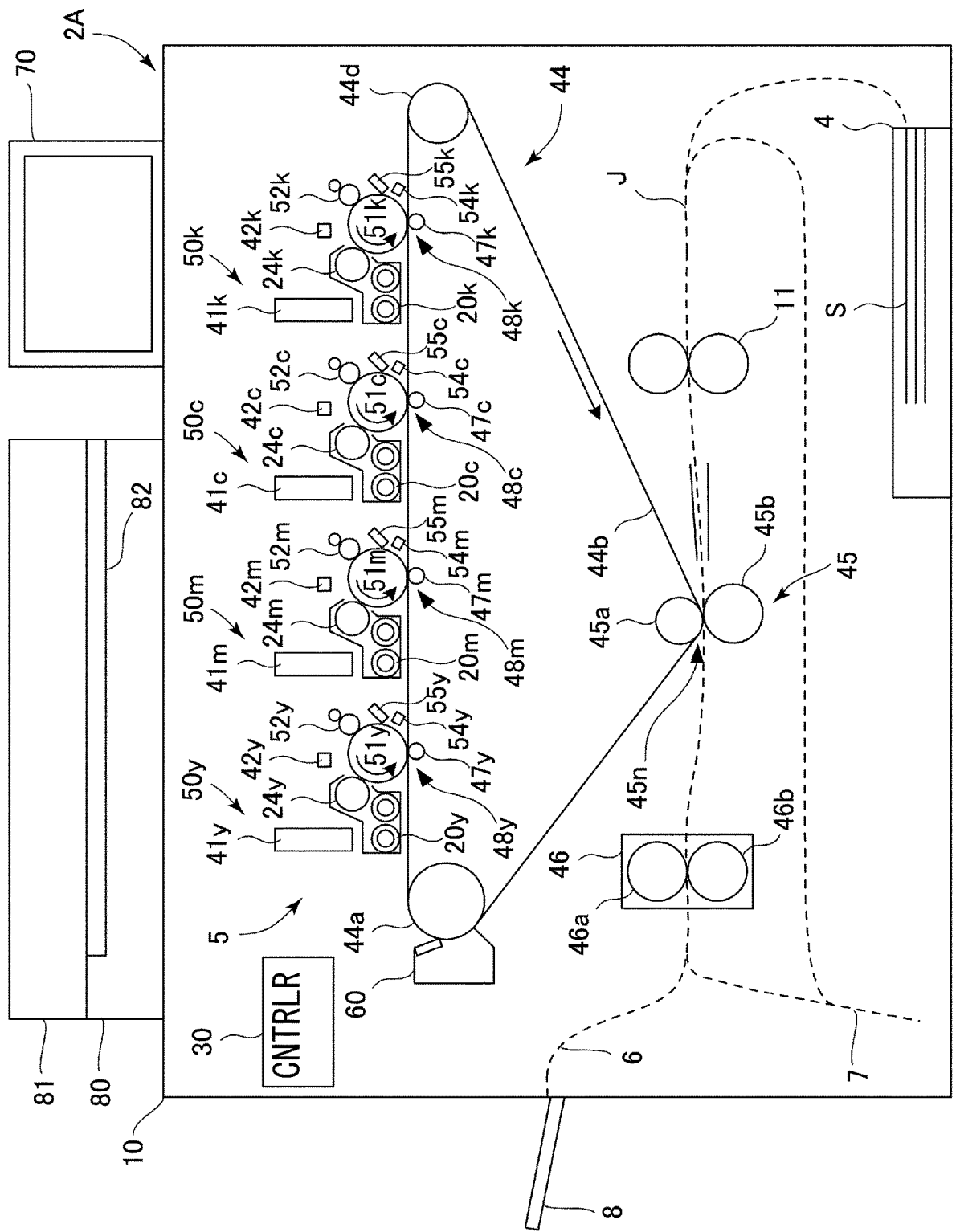

FIG. 23 is a schematic view showing an image forming apparatus of a second embodiment.

Figure 24:
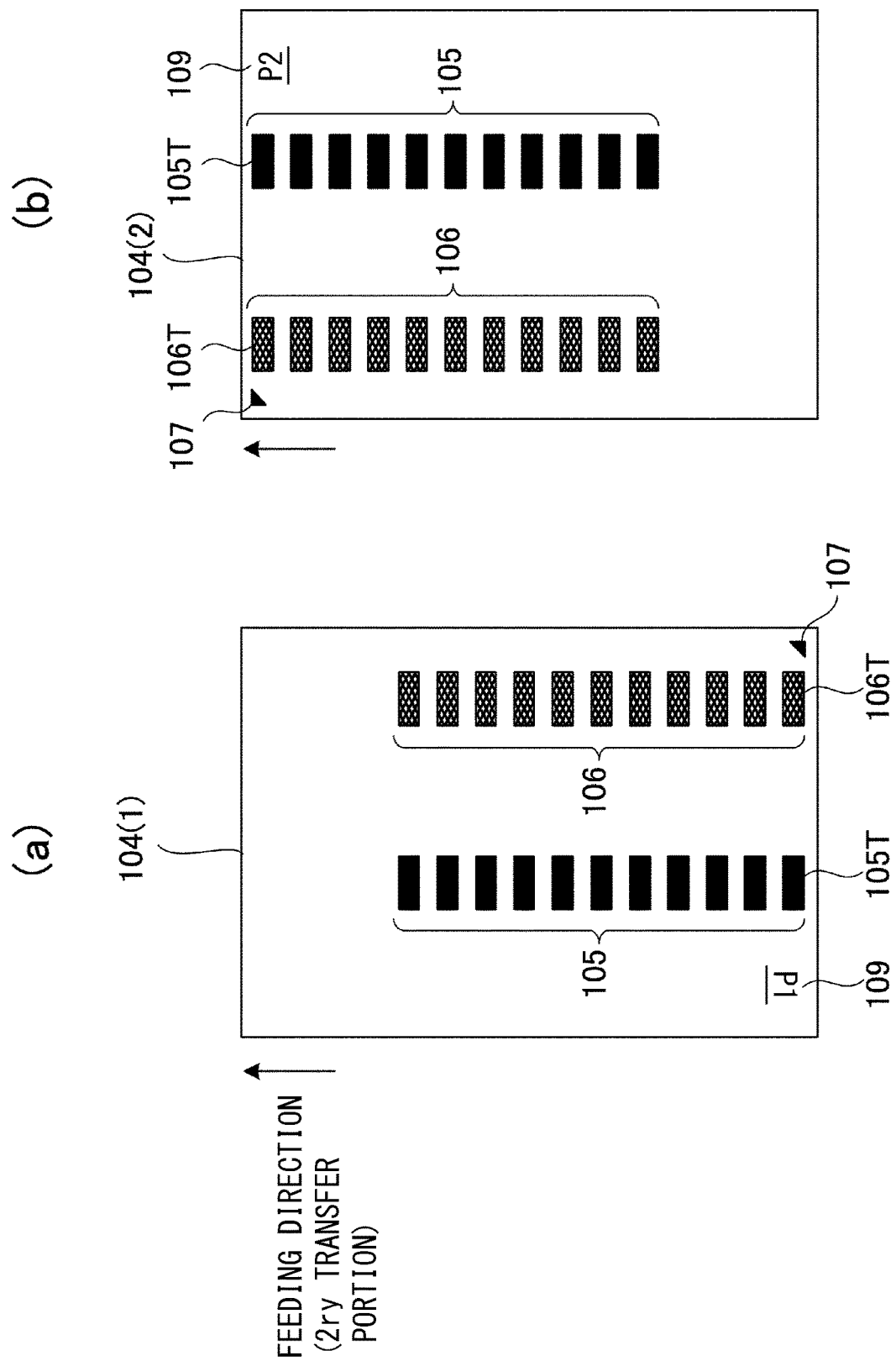

Parts (a) and (b) of FIG. 24 are schematic illustrations each showing a large chart in the second embodiment, in which part (a) shows the case of the first side, and part (b) shows the case of the second side.

Figure 25:
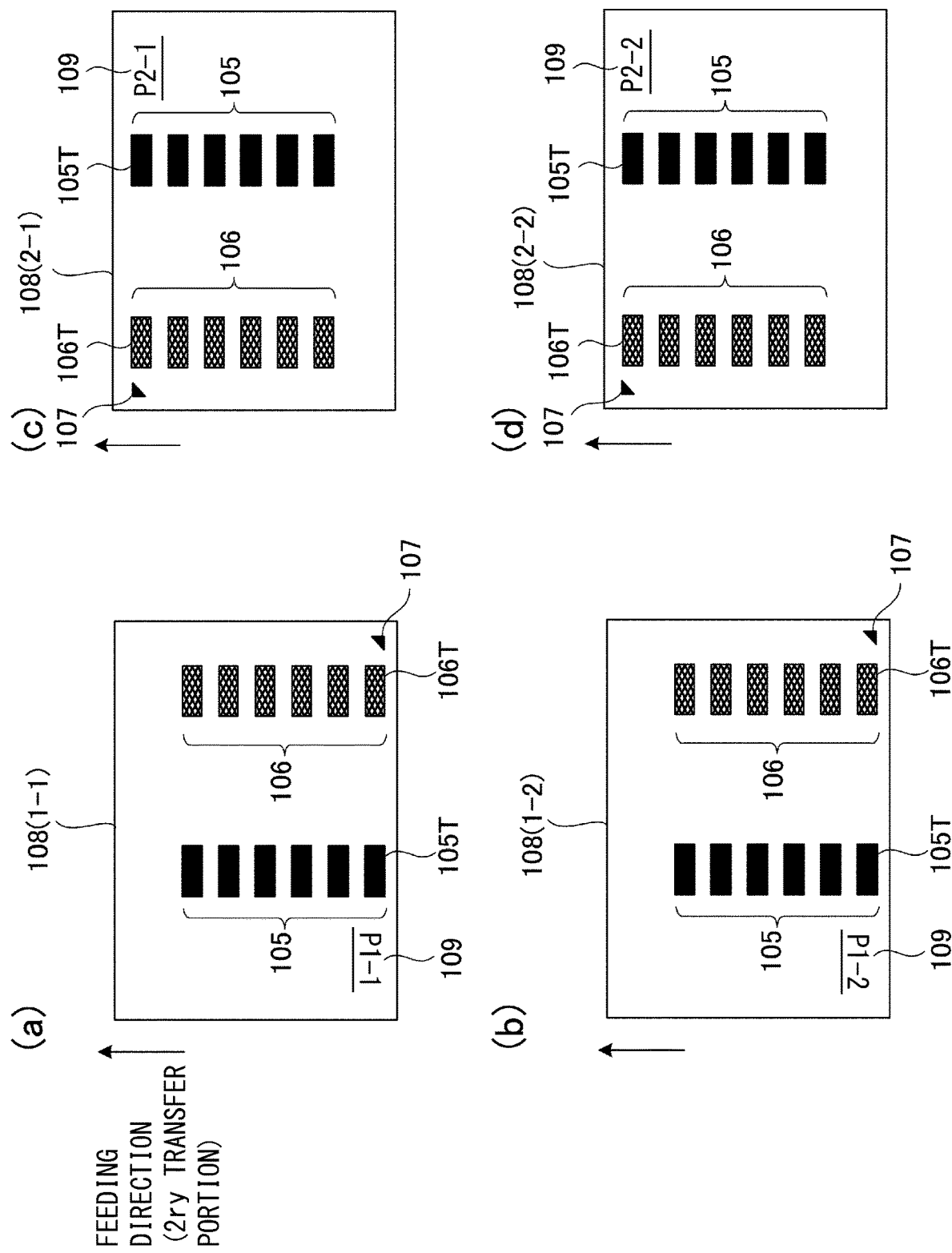

Parts (a) to (d) of FIG. 25 are schematic illustrations each showing a small chart in the second embodiment, in which part (a) shows the case of a first side of a first sheet, part (b) shows the case of a first side of a second sheet, part (c) shows the case of a second side of the first sheet, and (d) shows the case of a second side of the second sheet.

Figure 26:
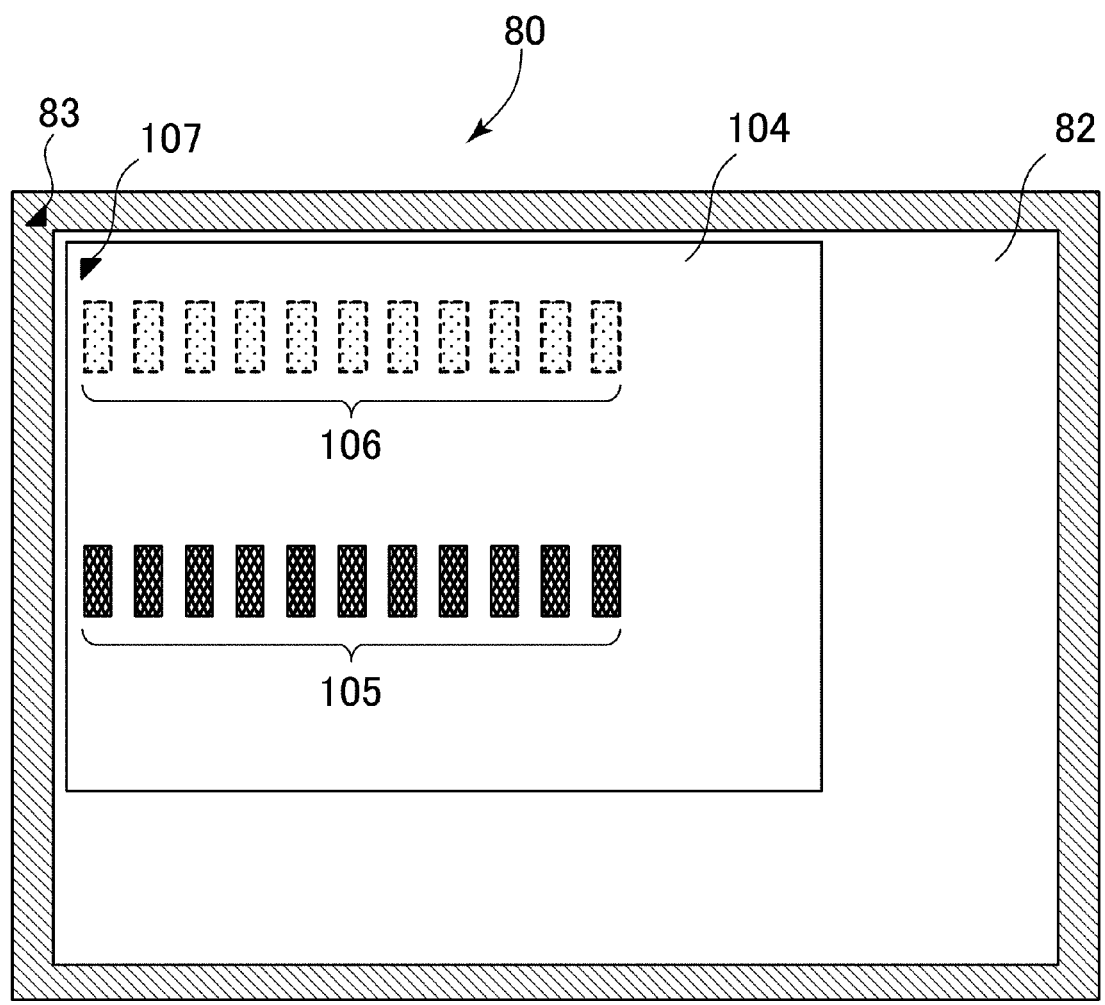

FIG. 26 is a schematic view for illustrating a manner of placing an adjusting chart in an image reading portion.

Figure 27:
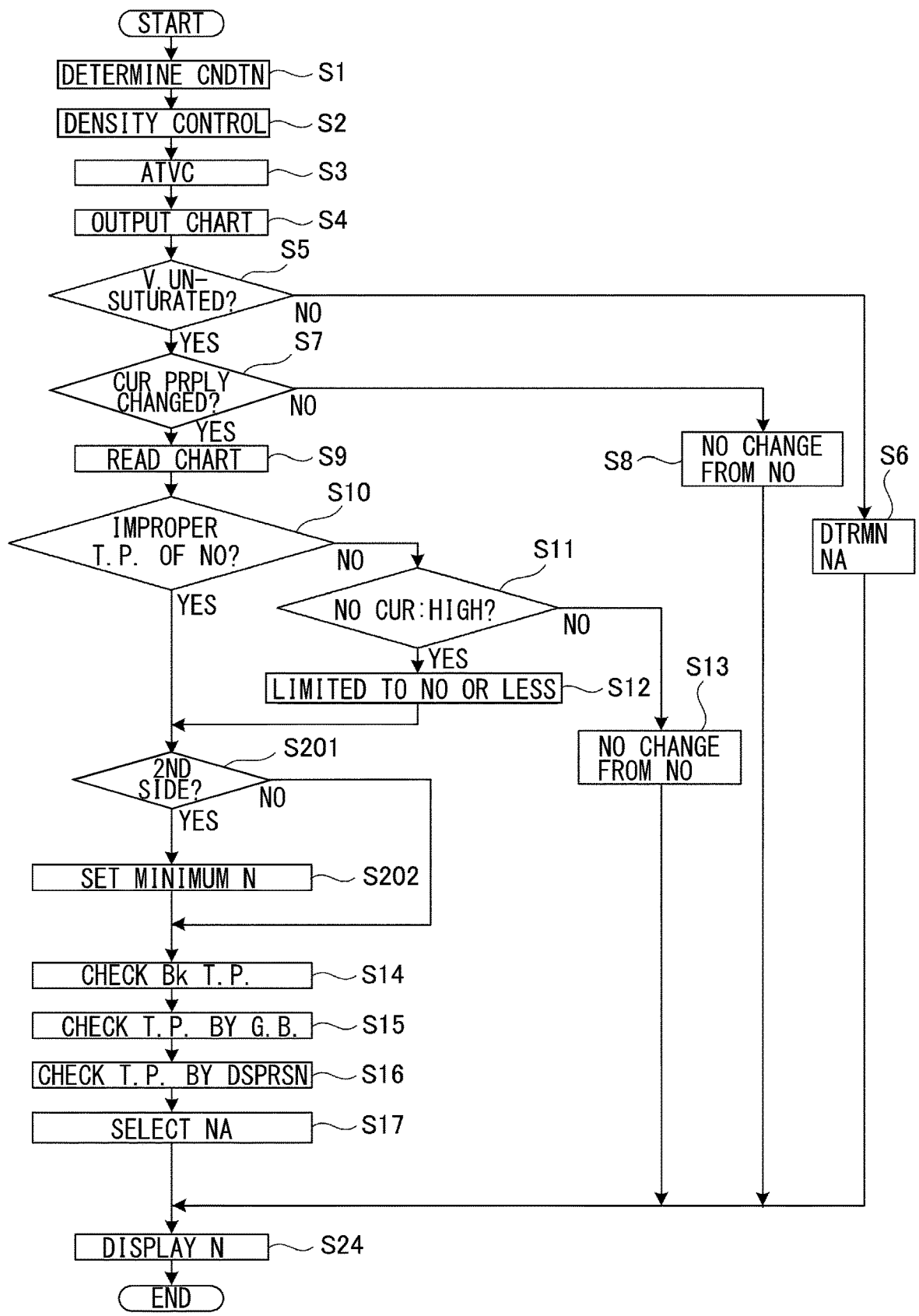

FIG. 27 is a flowchart showing an operation in an adjustment mode in the second embodiment.

Figure 28:
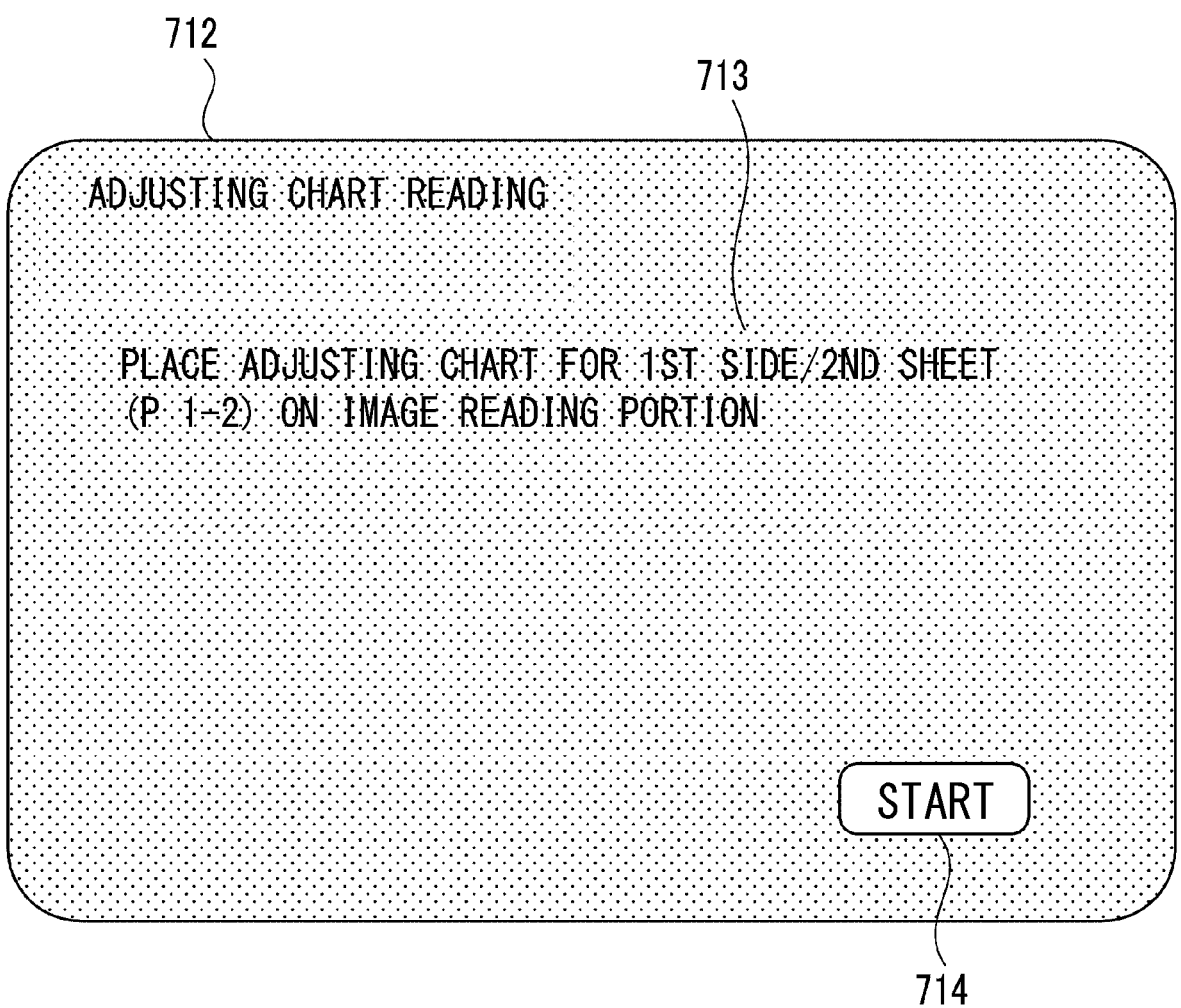

FIG. 28 is a schematic illustration showing a reading instruction screen of the adjusting chart.

DESCRIPTION OF EMBODIMENTS

First Embodiment

<Image Forming Apparatus>

In the following, an image forming apparatus according to a first embodiment will be described with reference to the drawings.

Figure 1:
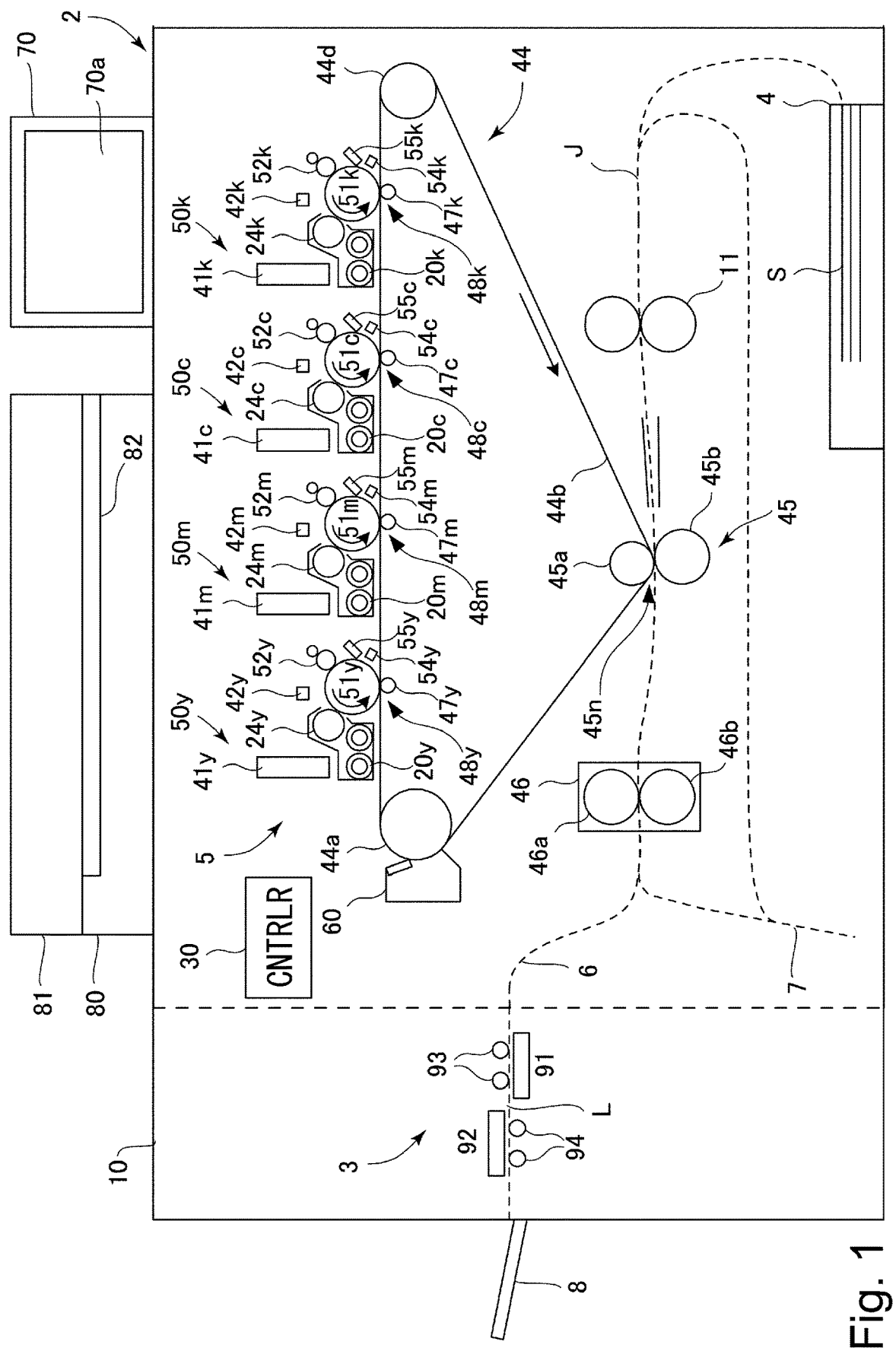
FIG. 1 is a schematic sectional view of an image forming apparatus of a first embodiment.

FIG. 1 is a schematic cross-sectional view of an image forming apparatus 2 of this embodiment. The image forming apparatus 2 of this embodiment is a tandem type full-color printer capable of forming a full-color image by using an electrophotographic type process and employing an intermediary transfer type system. However, the image forming apparatus 2 of the present invention is not limited to a tandem type image forming apparatus, and may be an image forming apparatus of another type. In addition, the image forming apparatus 2 is not limited to an image forming apparatus capable of forming the full-color image, and may be an image forming apparatus capable of forming only a monochromatic (white/black or single color) image. Further, the image forming apparatus 2 may also be from among various-purpose image forming apparatuses such as printers, various printing machines, copying machines, facsimile machines and multi-function machines.

Figure 2:
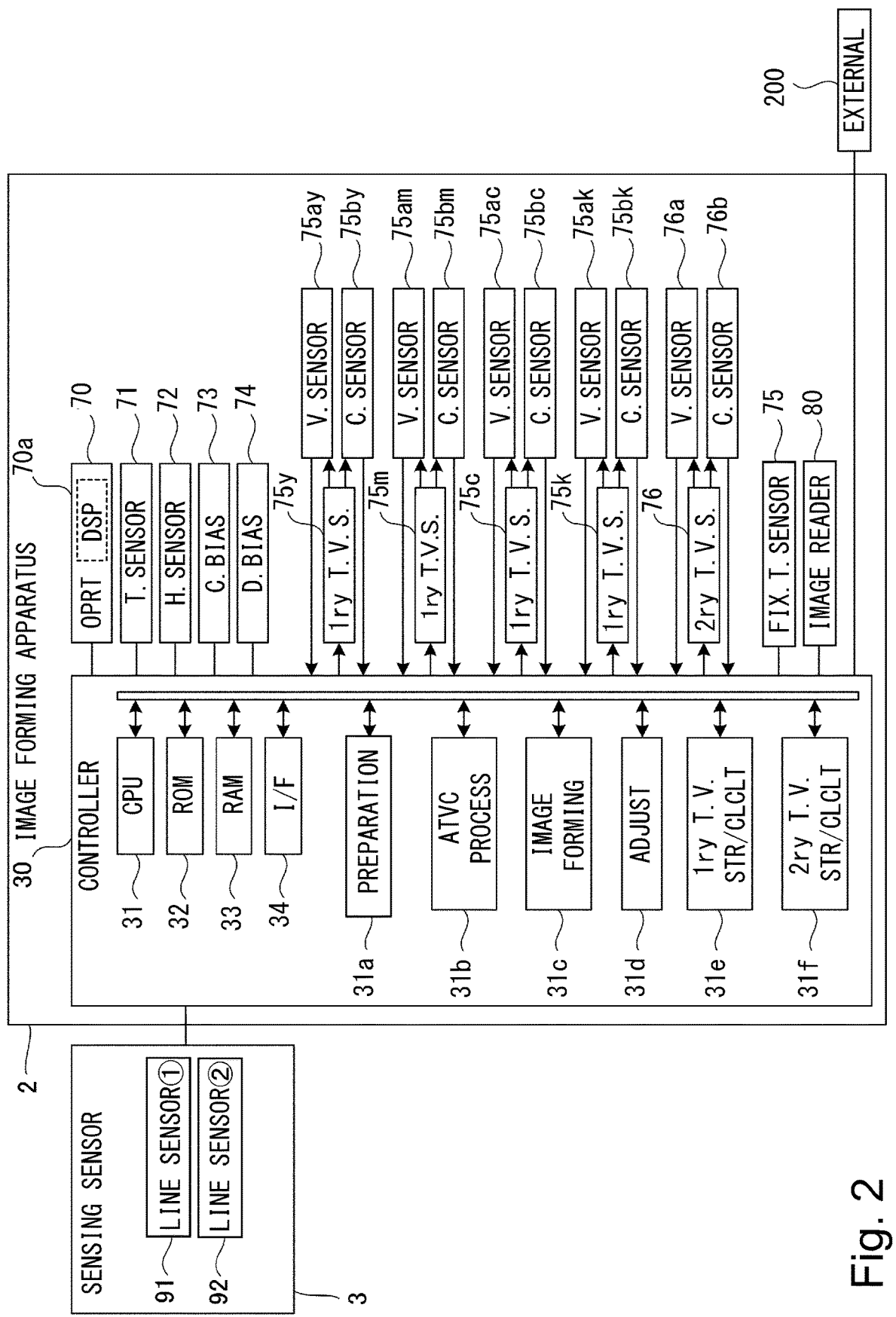
FIG. 2 is a block diagram showing a schematic structure of a control system of the image forming apparatus.

As shown in FIG. 1, the image forming apparatus 2 includes a sensing unit 3, a feeding portion 4, an image forming portion 5, a controller 30, and an operating portion 70. In FIG. 1, the single feeding portion 4 is provided, but a plurality of feeding portions 4 may also be provided. Inside the apparatus, a temperature sensor 71 capable of detecting the temperature inside the apparatus and a humidity sensor 72 capable of detecting the humidity inside the apparatus are provided (see FIG. 2). The image forming apparatus 2 can form a 4-color-based full-color image on a recording material S (sheet, transfer-receiving material), in accordance with image information (image signals) supplied from an image reading portion 80 or from an external device (see FIG. 2). As the external device 200, it is possible to cite a host device, such as a personal computer, a digital camera or a smart phone. Here, the recording material S is a material on which a toner image is formed, and specific examples thereof include plain paper, synthetic resin sheets which are substitutes for plain paper, thick paper, and overhead projector sheets.

The image forming portion 5 can form the image on the recording material S fed from the feeding portion 4 and moved through an inside of a feeding path J, on the basis of the image information. The image forming portion 5 includes image forming units 50y, 50m, 50c, 50k, toner bottles 41y, 41m, 41c, 41k, exposure devices 42y, 42m, 42c, 42k, an intermediary transfer unit 44, a secondary transfer device 45, and a fixing portion 46. The image forming units 50y, 50m, 50c, and 50k form yellow (y), magenta (m), cyan (c), and black (k) images, respectively. Elements having the same or corresponding functions or structures provided for these four image forming units 50y, 50m, 50c, and 50k are collectively described in some instances by omitting suffixes y, m, c and k of reference numerals or symbols representing the elements for associated colors. Here, the image forming apparatus 2 can also form a single-color or multi-color image by using an image forming unit 50 for a desired single color or some of the four colors, such as a monochromatic black image.

The image forming unit 50 includes the following means. First, a photosensitive drum 51 which is a drum-type (cylindrical) photosensitive member (electrophotographic photosensitive member) is provided. In addition, a charging roller 52 which is a roller-type charging member is provided. In addition, a developing device 20 is provided. In addition, a pre-exposure device 54 is provided. In addition, a cleaning blade 55 is provided. The image forming unit 50 forms a toner image on the intermediary transfer belt 44b which will be described hereinafter. The image forming unit 50 is integrally assembled into a unit as a process cartridge and can be mounted to and dismounted from an apparatus main assembly 10.

The photosensitive drum 51 is movable (rotatable) while carrying an electrostatic image (electrostatic latent image) or a toner image. In this embodiment, the photosensitive drum 51 is a negatively chargeable organic photosensitive member (organic photoconductor: OPC) having an outer diameter of 30 mm. The photosensitive drum 51 has an aluminum cylinder as a base material and a surface layer formed on the surface of the base material. In this embodiment, the surface layer comprises three layers of an undercoat layer, a photo charge generation layer, and a charge transportation layer, which are applied and laminated on the substrate in the order named. When an image forming operation is started, the photosensitive drum 51 is driven to rotate in a direction indicated by an arrow (counterclockwise) in the figure at a predetermined process speed (circumferential speed) by a motor (not shown).

The surface of the rotating photosensitive drum 51 is uniformly charged by the charging roller 52. In this embodiment, the charging roller 52 is a rubber roller which contacts the surface of the photosensitive drum 51 and which is rotated by the rotation of the photosensitive drum 51. The charging roller 52 is connected with a charging bias power source (voltage) 73 (see FIG. 2). The charging bias power (voltage) source 73 applies a charging bias (charging voltage) to the charging roller 52 during the charging process.

The surface of the charged photosensitive drum 51 is scanned and exposed by the exposure device 42 in accordance with the image information, so that an electrostatic image is formed on the photosensitive drum 51. The exposure device 42 includes a laser scanner in this embodiment. The exposure device 42 emits laser beam in accordance with the separated color image information outputted from the controller 30, and scans and exposes the surface (outer peripheral surface) of the photosensitive drum 51.

The electrostatic image formed on the photosensitive drum 51 is developed (visualized) by supplying the developer toner thereto by the developing device 20, so that a toner image is formed on the photosensitive drum 51. In this embodiment, the developing device 20 contains a two-component developer (also simply referred to as "developer") comprising non-magnetic toner particles (toner) and magnetic carrier particles (carrier). The toner is supplied from the toner bottle 41 to the developing device 20. The developing device 20 includes a developing sleeve 24. The developing sleeve 24 is made of a nonmagnetic material such as aluminum or nonmagnetic stainless steel (aluminum in this embodiment). Inside the developing sleeve 24, a magnet roller, which is a roller-shaped magnet, is fixed and arranged so as not to rotate relative to the main body (developing container) of the developing device 20. The developing sleeve 24 carries a developer and conveys it to a developing zone facing the photosensitive drum 51. A developing bias power source 74 (see FIG. 2) is connected to the developing sleeve 24. The developing bias power source 74 applies a developing bias (developing voltage) to the developing sleeve 24 during the developing process operation. In this embodiment, the normal charging polarity of the toner, which is the charging polarity of the toner during development, is negative.

An intermediary transfer unit 44 is arranged so as to face the four photosensitive drums 51y, 51m, 51c, 51k. The intermediary transfer unit 44 includes an intermediary transfer belt 44b, constituted by an endless belt, as a second image bearing member. The intermediary transfer belt 44b is wound around a plurality of rollers such as a driving roller 44a, a driven roller 44d, primary transfer rollers 47y, 47m, 47c, 47k, and an inner secondary transfer roller 45a. The intermediary transfer belt 44b is movable (rotatable) carrying the toner image. The driving roller 44a is rotationally driven by a motor (not shown) as driving means, and rotates (circulates) the intermediary transfer belt 44b. The driven roller 44d is a tension roller which controls the tension of the intermediary transfer belt 44b to be constant. The driven roller 44d is subjected to a force which pushes the intermediary transfer belt 44b toward the outer peripheral surface by the urging force of a spring (not shown), and by this force, a tension of about 2 to 5 kg is applied in a process advance direction of the intermediary transfer belt 44b. The inner secondary transfer roller 45a constitutes the secondary transfer device 45 as will be described hereinafter. The driving force is transmitted to the intermediary transfer belt 44b by the driving roller 44a, and the intermediary transfer belt 44b is rotationally driven in the arrow direction (clockwise) in the drawing at a predetermined peripheral speed corresponding to the peripheral speed of the photosensitive drum 51. In addition, the intermediary transfer unit 44 is provided with a belt cleaning device 60 as intermediary transfer member cleaning means.

The primary transfer rollers 47y, 47m, 47c, 47k are arranged to face the photosensitive drums 51y, 51m, 51c, 51k, respectively. The primary transfer roller 47 holds the intermediary transfer belt 44b between the photosensitive drum 51 and the primary transfer roller 47. By this, the intermediary transfer belt 44b contacts the photosensitive drum 51 to form a primary transfer portion (primary transfer nip portion) 48 with the photosensitive drum 51.

The toner image formed on the photosensitive drum 51 is primarily transferred onto the intermediary transfer belt 44b by the action of the primary transfer roller 47 in the primary transfer portion 48. That is, in this embodiment, by applying a positive primary transfer voltage to the primary transfer roller 47, a negative toner image on the photosensitive drum 51 is primarily transferred onto the intermediary transfer belt 44b. For example, when forming a full-color image, the yellow, magenta, cyan, and black toner images formed on the photosensitive drums 51y, 51m, 51c, and 51k are transferred so as to be sequentially superimposed on the intermediary transfer belt 44b. A primary transfer power source 75 (see FIG. 2) is connected to the primary transfer roller 47. The primary transfer power supply 75 applies a DC voltage having a polarity opposite to the normal charging polarity of the toner (positive polarity in this embodiment) as a primary transfer bias (primary transfer voltage) to the primary transfer roller 47 during the primary transfer process operation. The primary transfer power supply 75 is connected to a voltage detection sensor 75a which detects the output voltage and a current detection sensor 75b which detects the output current (see FIG. 2). In this embodiment, the primary transfer power sources 75y, 75m, 75c, and 75k are provided for the primary transfer rollers 47y, 47m, 47c, and 47k, respectively, and the primary transfer voltages applied to the primary transfer rollers 47y, 47m, 47c and 47k can be individually controlled.

The primary transfer roller 47 has an elastic layer of ion conductive foam rubber (NBR rubber) and a cored bar. The outer diameter of the primary transfer roller 47 is, for example, 15 to 20 mm. In addition, as the primary transfer roller 47, a roller having an electric resistance value of $1\times10^5$ to $1\times10^8 \Omega$(N/N (23° C., 50% RH) condition, 2 kV applied) can be preferably used.

The intermediary transfer belt 44b is an endless belt having a two-layer structure including a base layer and a surface layer in the order named from the inner peripheral surface side. As the resin material constituting the base layer, a resin such as polyimide or polycarbonate, or a material containing an appropriate amount of carbon black as an antistatic agent in various rubbers can be suitably used. The thickness of the base layer is, for example, 0.05 to 0.15 [mm]. As a material constituting the surface layer, a resin such as a fluororesin can be suitably used. The surface layer has small adhesive force of the toner to the surface of the intermediary transfer belt 44b and makes it easier to transfer the toner onto the recording material S at a secondary transfer portion 45n. The thickness of the surface layer is, for example, 0.0002 to 0.020 [mm]. In this embodiment, for the surface layer, one kind of resin material such as polyurethane, polyester, epoxy resin, or two or more kinds of elastic materials such as elastic material rubber, elastomer, butyl rubber, for example, are used as a base material. And, as a material for reducing the surface energy and improving the lubricity of this base material, powder or particles such as fluororesin, for example, with one kind or two kinds or different particle diameters are dispersed, so that a surface layer is formed. In this embodiment, the intermediary transfer belt 44b has a volume resistivity of $5\times10^8$ to $1\times10^{14}$ [$\Omega\cdot$cm] (23° C., 50% RH) and a static friction coefficient of the intermediary transfer belt 44b is 0.15 to 0.6 (23° C., 50% RH, type 94i manufactured by HEIDON). In this embodiment, the two-layer structure was employed, but a single-layer structure of a material corresponding to the material of the base layer may also be employed.

On the outer peripheral surface side of the intermediary transfer belt 44b, an outer secondary transfer roller 45b which constitutes the secondary transfer device 45 in cooperation with the inner secondary transfer roller 45a is disposed. The outer secondary transfer roller 45b contacts the intermediary transfer belt 44b contacting the inner secondary transfer roller 45a and forms the secondary transfer portion (secondary transfer nip portion) 45n between the intermediary transfer belt 44b. The toner image formed on the intermediary transfer belt 44b is secondarily transferred onto the recording material S by the action of the secondary transfer device 45 in the secondary transfer portion 45n. In this embodiment, a positive secondary transfer voltage is applied to the outer secondary transfer roller 45b so that the negative toner image on the intermediary transfer belt 44b is secondarily transferred onto the recording material S which is nipped and fed between the intermediary transfer belt 44b and the outer secondary transfer roller 45b. The recording material S is fed from the feeding portion 4 in parallel with the above-described toner image forming operation, and the toner image on the intermediary transfer belt 44b is fed by a registration roller pair 11 provided in the feeding path J at the timing adjusted. The sheet is then fed to the secondary transfer portion N.

As described above, the secondary transfer device 45 is constituted by including an inner secondary transfer roller 45a and an outer secondary transfer roller 45b as a transfer member. The inner secondary transfer roller 45a is disposed opposite to the outer secondary transfer roller 45b with the intermediary transfer belt 44b interposed therebetween. To the outer secondary transfer roller 45b, a secondary transfer power supply 76 (see FIG. 2) is connected. During the secondary transfer process, the secondary transfer power source 76 applies a DC voltage having a polarity opposite to the normal charging polarity of the toner (positive in this embodiment) to the outer secondary transfer roller 45b as secondary transfer bias (secondary transfer voltage). The secondary transfer power source 76 is connected to a voltage detection sensor 76a for detecting the output voltage and a current detection sensor 76b as a current detecting portion for detecting the output current (see FIG. 2). The core of the inner secondary transfer roller 45a is connected to the ground potential. And, when the recording material S is supplied to the secondary transfer portion 45n, a secondary transfer voltage with constant-voltage-control having a polarity opposite to the normal charging polarity of the toner is applied to the outer secondary transfer roller 45b. In this embodiment, a secondary transfer voltage of 1 to 6.5 kV is applied, a current of about 50 to 100 μA, for example is applied, and the toner image on the intermediary transfer belt 44b is secondarily transferred onto the recording material S. Here, in this embodiment, the inner secondary transfer roller 45a is connected to the ground potential, and a voltage is applied from the secondary transfer power source 76 to the outer secondary transfer roller 45b. On the other hand, a voltage from the secondary transfer power source 76 is applied to the inner secondary transfer roller 45a, and the outer secondary transfer roller 45b may also be connected to the ground potential. In such a case, a DC voltage having the same polarity as the normal charging polarity of the toner is applied to the inner secondary transfer roller 45a.

In this embodiment, the outer secondary transfer roller 45b has an elastic layer of ion conductive foam rubber (NBR rubber) and a core metal. The outer diameter of the outer secondary transfer roller 45b is, for example, 20 to 25 mm. In addition, as the outer secondary transfer roller 45b, a roller having an electric resistance value of $1\times10^5$ to $1\times10^8 \Omega$ (measured at N/N (23° C., 50% RH), 2 kV applied) can be preferably used.

The recording material S onto which the toner image has been transferred is fed to a fixing portion 46. The fixing portion 46 includes a fixing roller 46a and a pressure roller 46b. The fixing roller 46a includes therein a heater. The recording material S carrying the unfixed toner image is heated and pressed by being sandwiched and fed between the fixing roller 46a and the pressing roller 46b. By this, the toner image is fixed (melted and fixed) on the recording material S. Here, the temperature of the fixing roller 46a (fixing temperature) is detected by a fixing temperature sensor 77 (see FIG. 2).

In the case where image formation is carried out by one-side printing, the recording material S on which the toner image is fixed is fed through a discharge path and the sensing unit 3 and then is discharged through a discharge opening, and then is stacked on a discharge tray 8 provided outside the apparatus main assembly 10. On the other hand, in the case where the formation of the image on the recording material S is carried out by double (both)-side printing, the recording material S on which the toner image is fixed is fed to a reverse feeding path 7. The reverse feeding path 7 as a feeding portion turns upside down the recording material S on which the toner image is fixed on a first side and is capable of feeding again the recording material S to the secondary transfer portion 45n. Then, the recording material S passes through the reverse feeding path 7 and is fed to the secondary transfer portion 45n again, so that the toner image is transferred onto a second side and is fixed on the recording material S. Thereafter, the recording material S is fed along the discharge portion 6 and the sensing unit 3 and then is stacked on the discharge tray 8. As described above, the image forming apparatus 2 of this embodiment is capable of executing automatic double-side printing which forms images on both sides of a single recording material S.

The surface of the photosensitive drum 51 after the primary transfer is electrically discharged by the pre-exposure device 54. In addition, the toner remaining on the photosensitive drum 51 without being transferred onto the intermediary transfer belt 44b during the primary transfer process (primary untransferred residual toner) is removed from the surface of the photosensitive drum 51 by the cleaning blade 55 and is collected in a collection container (not shown). The cleaning blade 55 is a plate-like member which is in contact with the photosensitive drum 51 with a predetermined pressing force. The cleaning blade 55 is in contact with the surface of the photosensitive drum 51 in a counter direction in which the outer end portion of the free end portion faces the upstream side in the rotational direction of the photosensitive drum 51. In addition, toner remaining on the intermediary transfer belt 44b without being transferred onto the recording material S during the secondary transfer process (secondary untransferred residual toner) or adhering matter such as paper dust is removed and collected from the surface of the intermediary transfer belt 44b by the belt cleaning device 60.

At an upper portion of the apparatus main assembly 10, an automatic original feeding device 81 and an image reading portion 80 are provided. The automatic original feeding device 81 automatically feeds, toward the image reading portion 80, a sheet (for example, an adjusting chart described later) such as an original or the recording material S on which the image is formed. The image reading portion 80 reads the image on the sheet fed by the automatic original feeding device 81. The image reading portion 80 illuminates the sheet placed on a plating glass 82 with light from a light source (not shown) and is constituted so as to read the image on the sheet, in terms of a dot density determined in advance, by an image reading element (not shown). That is, the image reading portion 80 optically reads the image on the sheet and converts the read image into an electric signal.

<Controller>

As shown in FIG. 1, the image forming apparatus 1 of this embodiment includes the controller 30, and operations of respective portions are controlled by the controller 30. The controller 30 will be described using FIG. 2 while making reference to FIG. 1. The controller 30 is constituted by a computer, and includes, for example, a CPU (Central Processing Unit) 31, a ROM (Read Only Memory) 32, a RAM (Random Access Memory) 33, and an input/output circuit (I/F) 34 for inputting/outputting signals to and from the outside. The CPU 31 is a microprocessor which controls the entire image forming apparatus 2 and is a main part of the system controller. The CPU 31 is connected to the feeding portion 4, the image forming portion 5, and the operating portion 70 and the like via the input/output circuit (I/F) 34, and exchanges signals with these portions, and controls the operation of each of these portions. The ROM 32 stores an image formation control sequence (program) for forming an image on the recording material S. The controller 30 is connected to a charging bias power source 73, a developing bias power source 74, a primary transfer power source 75, and a secondary transfer power source 76, which are controlled by signals from the controller 30, respectively. In addition, the controller 30 is connected to a temperature sensor 71, a humidity sensor 72, a voltage detection sensor 75a and a current detection sensor 75b of the primary transfer power supply 75, a voltage detection sensor 76a and a current detection sensor 76b of the secondary transfer power supply 76, and a fixing temperature sensor 77. Signals detected by the respective sensors are inputted to the controller 30. Further, in the case of this embodiment, to the controller 30, the sensing unit 3 (specifically described later) is connected, so that the controller 30 is capable of receiving image brightness information (information on image density) from the sensing unit 3.

The operating portion 70 as an input portion includes an unshown operation button, and a display portion 70a including a liquid crystal panel. In the case of this embodiment, the display portion 70a is constituted as a touch panel, and also has a function as the input portion. The operators such as a user or a service person can execute a job (a series of operations to form and output an image or images on one or more recording materials S in response to one start instruction) and can input various pieces of information by operating the operation portion 70. The controller 30 receives the signal from the operating portion 70 and operates various devices of the image forming apparatus 2. The image forming apparatus 2 can also execute the job on the basis of an image forming signal (image data, control command) supplied from the external device 200 such as the personal computer.

The controller 30 includes an image formation pre-preparation process portion 31a, an ATVC process portion 31b, an image formation process portion 31c, and an adjustment process portion 31d. In addition, the controller 30 includes a primary transfer voltage storage/operation portion 31e and a secondary transfer voltage storage/operation portion 31f. Here, each of these process portions and storage/operation portions may be provided as a portion or portions of the CPU 31 or the RAM 33. For example, the controller 30 (specifically the image formation process portion 31c) can execute a print job as described above. In addition, the controller 30 (specifically the ATVC process portion 31b) can execute ATVC (setting mode) for the primary transfer portion and the secondary transfer portion. The ATVC will be described hereinafter. In addition, the controller 30 (specifically the adjustment process portion 31d) can execute an operation in an adjustment mode for adjusting a set value of the secondary transfer voltage. The operation in the adjustment mode will be described hereinafter.

Here, the image forming apparatus 2 executes the job (image output operation, print job) which is series of operations to form and output an image or images on a single or a plurality of recording materials S started by one start instruction. The job includes an image forming step, a pre-rotation step, a sheet (paper) interval step in the case where the images are formed on the plurality of recording materials S, and a post-rotation step, in general. The image forming step is performed in a period in which formation of an electrostatic image for the image actually formed and outputted on the recording material S, formation of the toner image, primary transfer of the toner image and secondary transfer of the toner image are carried out, in general, and during image formation (image forming period) refers to this period. Specifically, timing during the image formation is different among positions where the respective steps of the formation of the electrostatic image, the toner image formation, the primary transfer of the toner image and the secondary transfer of the toner image are performed. The pre-rotation step is performed in a period of a preparatory operation, before the image forming step, from an input of the start instruction until the image is started to be actually formed. The sheet interval step is performed in a period corresponding to an interval between a recording material S and a subsequent recording material S when the images are continuously formed on a plurality of recording materials S (continuous image formation). The post-rotation step is performed in a period in which a post-operation (preparatory operation) after the image forming step is performed. During non-image formation (non-image formation period) is a period other than the period of the image formation (during image formation) and includes the periods of the pre-rotation step, the sheet interval step, the post-rotation step and further includes a period of a pre-multi-rotation step which is a preparatory operation during turning-on of a main switch (power source) of the image forming apparatus 1 or during restoration from a sleep state.

<Sensing Unit>

In the case of this embodiment, the sensing unit 3 is an acquiring portion for reading the adjusting chart for secondary transfer voltage adjustment. The sensing unit 3 may also be provided as an external device or the like so as to be connectable to the apparatus main assembly 10. As shown in FIG. 1, inside the sensing unit 3, a feeding path L along which the recording material S passes is provided, and line sensors 91 and 92 are provided at positions deviated from each other with respect to a feeding direction of the recording material S while sandwiching the feeding path L therebetween. The line sensors 91 and 92 may only be required so as to be capable of reading test toner images formed on a test chart at about 300 dpi, and for example, a CIS or the like is used.

In the case where images are formed on double (both) sides of the recording material S, the recording material S is fed along the feeding path L so that an upper side in FIG. 1 is a second side and a lower side in FIG. 1 is a first side. That is, in the sensing unit 3, the line sensor 91 opposes the first side, and the line sensor 92 opposes the second side, so that the sensing unit 3 is capable of reading the images on both sides by single passing of the recording material S. At positions opposing the line sensors 91 and 92, paper pressing rollers 93 and 94 are provided, respectively, so that the paper pressing rollers 93 and 94 stabilize an attitude of the recording material S subjected to image reading in order to properly read the images. The recording material S discriminated through the sensing unit 3 is discharged to the discharge tray 8. When the sensing unit 3 reads the images, the sensing unit 3 outputs brightness values, as brightness information, of "0 to 255" for each of RGB.

Further, the sensing unit 3 is connected to the controller 30 (see FIG. 2), and therefore, the controller 30 is capable of receiving the brightness information of the image read from each of the line sensors 91 and 92 of the sensing unit 3.

<Control of Secondary Voltage>

Figure 3:
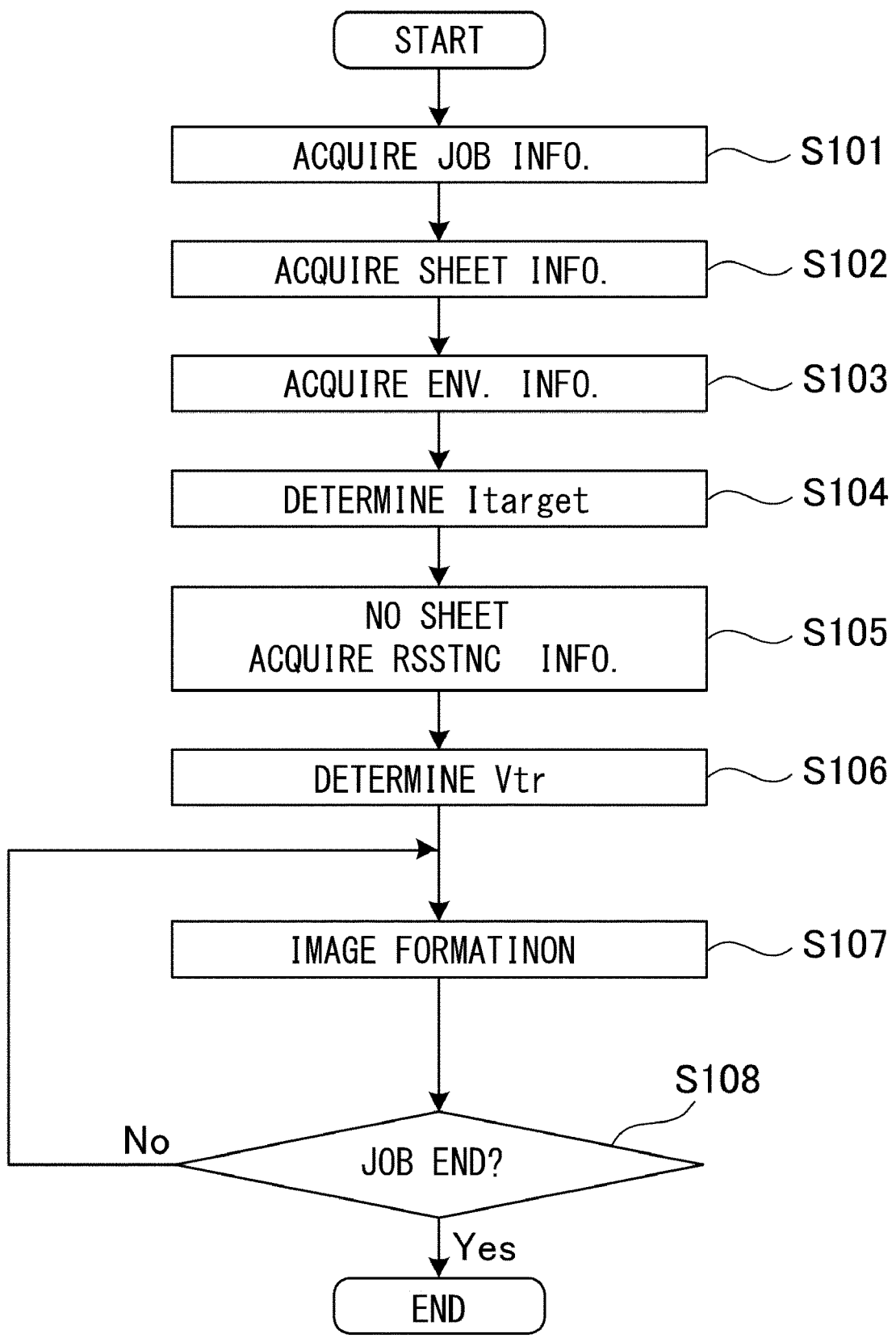
FIG. 3 is a flowchart showing control of a secondary transfer voltage.

Next, control of the secondary transfer voltage will be described. FIG. 3 is a flow chart showing an outline of a procedure relating to the control of the secondary transfer voltage in this embodiment. Generally, the control of the secondary transfer voltage includes constant-voltage control and constant-current control, and in this embodiment, the constant-voltage control is used.

First, the controller 30 (image formation pre-preparation process portion 31a) causes the image forming portion to start an operation of a job when it acquires information on the job from the operation portion 70 or the external device 200 (S101). In the information on this job, image information designated by the operator and information on the recording material S are included. The information on the recording material S includes information on a size of the recording material S and information on a kind (category of paper kind) of the recording material S such as "thin paper, plain paper, thick paper, . . . ". Incidentally, the kind of the recording material S includes natures based on general characteristics such as plain paper, thick paper, thin paper, glossy paper, coated paper, and any distinguishable information on the recording material S, such as brand, product number, basis weight, and thickness. The controller 30 writes this job information in the RAM 33 (S102).

Next, the controller 30 (image formation pre-preparation process portion 31a) acquires environment information detected by the temperature sensor 71 and the humidity sensor 72 (S103). In the ROM 32, information showing correction between the environment information and a target current Itarget for transferring the toner image from the intermediary transfer belt 44b onto the recording material S is stored. The controller 30 (secondary transfer voltage storage/operation portion 31f) acquires the target current Itarget corresponding to the environment from the information showing the correlation between the environment information and the target current Itarget, on the basis of the environment information read in S103. Then, the controller 30 writes this target current Itarget in the RAM 33 (or the secondary transfer voltage storage/operation portion 31f) (S104). Incidentally, why the target current Itarget is changed depending on the environment information is that the toner charge amount varies depending on the environment. The target current Itarget in this embodiment has been acquired for every environment in advance by a study on a secondary transfer current value at which a toner image (a secondary-color whole suppress image in this embodiment) with a maximum toner application amount can be transferred onto the recording material S by the image forming apparatus.

Figure 4:
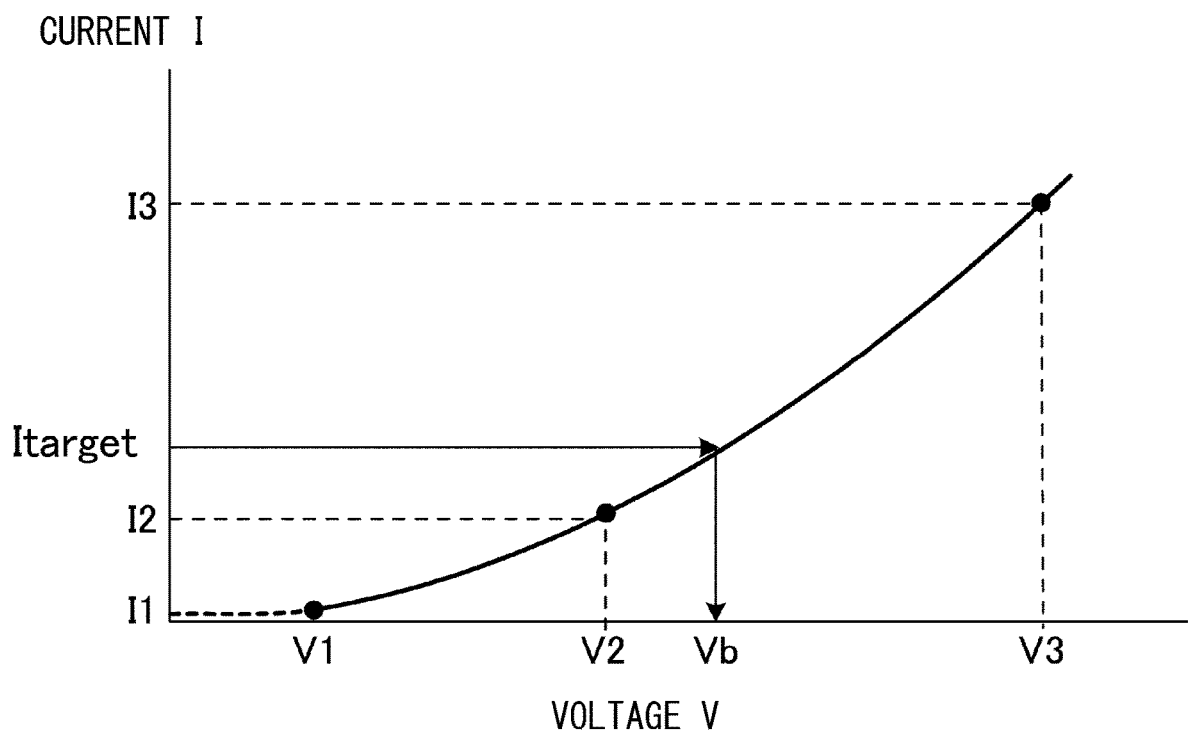
FIG. 4 is a graph showing a voltage-current characteristic acquired in the control of the secondary transfer voltage.

Next, the controller 30 (ATVC process portion 31b) acquires information on an electric resistance of the secondary transfer portion 45n by the ATVC (Active Transfer Voltage Control) before the toner image on the intermediary transfer belt 44b and the recording material S onto which the toner image is transferred reach the secondary transfer portion 45n (S105). That is, in a state in which the outer secondary transfer roller 45b and the intermediary transfer belt 44b are contacted to each other, predetermined voltages of a plurality of levels are applied (supplied) from the secondary transfer power source 76 to the outer secondary transfer roller 45b. Then, current values when the predetermined voltages are applied are detected by the current detecting sensor 76b, so that a relationship between the voltage and the current (voltage-current characteristic) as shown in FIG. 4 is acquired. The controller 30 writes information on this relationship between the voltage and the current in the RAM 33. This relationship between the voltage and the current changes depending on the electric resistance of the secondary transfer portion 45n. In the constitution of this embodiment, the relationship between the voltage and the current is not such that the current changes linearly relative to the voltage (i.e., is linearly proportional to the voltage), but is such that the current changes so as to be represented by a polynomial expression consisting of two or more terms of the voltage. For that reason, in this embodiment, in order that the relationship between the voltage and the current can be represented by the polynomial expression, the number of predetermined voltages or currents supplied when the information on the electric resistance of the secondary transfer portion 45n is acquired is three or more (levels).

Then, the controller 30 (secondary transfer voltage storage/operation portion 31f) acquires a voltage value to be applied from the secondary transfer power source 76 to the outer secondary transfer roller 45b (S106). That is, on the basis of the target current Itarget written in the RAM 33 in S104 and the relationship between the voltage and the current acquired in S105, the controller 30 acquires a voltage value Vb necessary to cause the target current Itarget to flow in a state in which the recording material S is absent in the secondary transfer portion 45n. This voltage value Vb corresponds to a secondary transfer portion part voltage (transfer voltage corresponding to the electric resistance of the secondary transfer portion 45n). Further, in the ROM 32, pieces of information for acquiring a recording material part voltage (transfer voltage corresponding to the electric resistance of the recording material S) Vp as shown in parts (a) and (b) of FIG. 5 are stored. The information is set as table data between ambient water content and the recording material part voltage Vp for each of sections (corresponding to paper kind categories) of basis weights of recording materials S. The table data for acquiring these recording material part voltages Vp are acquired in advance by an experiment or the like. Further, the recording material S once passed through the fixing portion 46 increases in resistance by a lowering in water content of an external environment, and therefore, in the case of this embodiment in which the double-side printing can be carried out, separate table data are prepared for the first side and the second side. Incidentally, the controller 30 (image formation pre-preparation process portion 31a) is capable of acquiring water content in an external environment (which may include the inside of the apparatus main assembly) on the basis of environment information (temperature, humidity) detected by the temperature sensor 71 and the humidity sensor 72.

On the basis of the information on the job acquired in S101 and the environment information acquired in S103, the controller 30 acquires the recording material part voltage Vp from the above-described table data. Further, in the case where the adjusting value is set by the operation in the adjustment mode, described later, for setting the set voltage of the secondary transfer voltage, an adjusting value ΔV is determined depending on the adjusting value. As described later, this adjusting value ΔV is stored in the RAM 33 (or the secondary transfer voltage storage/operation portion 31f) in the case where the adjusting value is set by the operation in the adjustment mode. The controller 30 acquires Vb+Vp+ΔV which is the sum of the above-described voltage values Vb, Vp and ΔV, as a secondary transfer voltage Vtr applied from the secondary transfer power source 76 to the outer secondary transfer roller 45b when the recording material S passes through the secondary transfer portion N2. Then, the controller 30 writes this Vtr (=Vb+Vp+ΔV) in the RAM 33 (or the secondary transfer voltage storage/operation portion 31f).

Here, the recording material part voltage Vp also changes depending on a surface property of the recording material S other than the information (thickness, basis weight or the like) relating to the resistance of the recording material S in some instances. For that reason, the table data may also be set so that the recording material part voltage Vp changes also depending on the information relating to the surface property of the recording material S. Further, in this embodiment, the information relating to the resistance of the recording material S (and in addition, the information relating to the surface property of the recording material S) are included in the job information acquired in S101. However, a measuring means for detecting the thickness of the recording material S and the surface property of the recording material S is provided in the image forming apparatus 2, and the recording material part voltage Vp may also be acquired on the basis of information acquired by this measuring means.

Next, the controller 30 (the image formation process portion 31c) causes the image forming portion to form the image and to send the recording material S to the secondary transfer portion 45n and causes the secondary transfer device to perform the secondary transfer by applying the secondary transfer voltage Vtr determined as described above (S107). Thereafter, the controller 30 (the image formation process portion 31c) repeats the processing of S107 until all the images in the job are transferred and completely outputted on the recording material S (S108).

Incidentally, also as regards the primary transfer portion 48, the ATVC similar to the above-described ATVC is carried out in a period from a start of the job until the toner image is fed to the primary transfer portion 48, but detailed description thereof will be omitted in this embodiment.

<Outline of Adjustment Mode>

Next, an operation in a simple adjustment mode (hereinafter simply referred to as an "adjustment mode) for setting the set voltage of the secondary transfer voltage will be described. Depending on the type and condition of the recording material S used in image formation, the water (moisture) content and electrical resistance value of the recording material S may differ greatly from the standard recording material S. In this case, optimal transfer may not be performed with the set voltage of the secondary transfer voltage using the default recording material part voltage Vp set in advance as described above.

First, when the secondary transfer voltage is insufficient, the toner on the intermediary transfer belt 44b cannot be sufficiently transferred onto the recording material S, so that the image density lowers. For example, the case where a resistance value of the recording material S is higher than a value (corresponding to the recording material part voltage Vp) assumed for each paper kind category, the case where the recording material S lowers in water content (dries) depending on a storage condition and thus a resistance value increases, and the like case would be considered. In such a case, it is desirable to increase the set voltage of the secondary transfer voltage by increasing the recording material part voltage Vp.

On the other hand, when the secondary transfer voltage is higher than necessary, abnormal (electric) discharge occurs and image defect is caused to occur, or electric charge of the toner is reversed by the influence of the discharge in the secondary transfer portion 45n, and thus the transfer property lowers in some instances. For example, the case where the resistance value of the recording material S is lower than the value (corresponding to the recording material part voltage Vp) assumed for each paper kind category, the case where the recording material S absorbs moisture and increases in water content depending on the storage condition and thus the resistance value increases, and the like case would be considered. In this case, it is desirable to increase the set voltage of the secondary transfer voltage by reducing the recording material part voltage Vp.

Therefore, it is desired that the operator such as a user or a service person adjusts (changes) the recording material part voltage Vp depending on the recording material S actually used for image formation, for example, to optimize the setting voltage of the secondary transfer voltage during the execution of the job (during the image formation). In other words, it is only required that an optimum "recording material part voltage Vp+Vb (adjusting amount)" depending on the recording material S actually used for image formation is selected. This adjustment may be performed by the following method. For example, the operator outputs the images while switching the secondary transfer voltage for each recording material S, and confirms the presence or absence of an image defect occurring in the output image to obtain an optimal secondary transfer voltage, on the basis of which setting voltage (specifically, (recording material part voltage) Vp+(adjusting amount) ΔV) of the optimum secondary transfer voltage is determined. However, in this method, since the outputting operation of the image and the adjustment of the setting voltage of the secondary transfer voltage are repeated, the recording material S which is wasted increases, and it takes time in some instances.

In the case of this embodiment, the image forming apparatus 2 is operable in the adjustment mode in which the secondary transfer voltage set during the image formation is adjusted. In this operation in the adjustment mode, an adjusting chart (test chart) on which a plurality of representative color patches (test toner images) are formed every voltage (for each test voltage) is outputted on the recording material S which is actually used for image formation, while the secondary transfer voltage is switched. And, the set voltage of the secondary transfer voltage (specifically, (recording material part voltage) Vp+(adjusting amount) ΔV) set during the image formation is adjusted on the basis of an acquired result (information on image density) of the reading of patches on the outputted adjusting chart (recording material) by the sensing unit 3. In the case of this embodiment, on the basis of brightness information (density information) of a solid patch (solid image patch) on the adjusting chart, information on the adjusting amount ΔV for setting a secondary transfer voltage for optimizing a solid image density is capable of being presented. By this, necessity that the operator confirms the presence or absence of the image defect by eye observation is reduced, so that it becomes possible to adjust the set voltage to a set voltage of a more appropriate secondary transfer voltage while alleviating an operation load of the operator.

<Adjusting Chart>

Next, the adjusting chart used in the operation in the adjustment mode in this embodiment will be described. In this embodiment, in the operation in the adjustment mode, the outputted adjusting chart is read by the line sensors 91 and 92 of the sensing unit 3, and brightness information of patches is acquired, and then, a recommended adjusting amount for the set voltage of the secondary transfer voltage is presented.

Incidentally, herein, the direction in which the recording material S is fed in the secondary transfer portion 45n is referred to as the "process advance direction" and the direction substantially perpendicular to the process advance direction is referred to as a "longitudinal direction". First, parts (a) and (b) of FIG. 6 each shows an adjusting chart 100 in the case where a length with respect to the process advance direction of the recording material S is 420 mm (long side of A3-size sheet) or more and a length with respect to the longitudinal direction is 279.4 mm (long side of LTR-size sheet) or more.

The adjusting chart 100 is also referred to as a large chart. The large chart 100 corresponds to the maximum sheet passing size of the image forming apparatus 2 of this embodiment, and the image size is approx. (longitudinal direction) 13 inches (≈330 mm) at the short side)×(process advance direction) 19.2 inches (≈487 mm) at the long side. An adjusting chart corresponding to image data cut out from this large chart 100 is outputted according to the size of the recording material S. At this time, in this embodiment, the image data is cut out from the large chart 100 in accordance with the size of the recording material S based on the leading end center with respect to the process advance direction. For example, in the case where the adjusting chart is outputted to the recording material S of A3 size (short edge feeding) (short side 297 mm×long side 420 mm), the image data having a size of 292 mm (short side)×415 mm (long side) is cut out from the image data of the large chart 100. And, the image corresponding to the cut-out image data is outputted on an A3-size recording material S with a margin of 2.5 mm at each end portion on the basis of the leading end with respect to the reading direction and on the longitudinal center basis.

On the large chart 100, solid blue patches 101 and solid black patches 102 are arranged, and 11 sets of these patches in total are arranged in the process advance direction. Further, a large chart 100(1) shown in part (a) of FIG. 6 corresponds to the first side, and a large chart 100(2) shown in part (b) of FIG. 6 corresponds to the second side. The second side passes through the secondary transfer portion 45n and then passes through the sensing unit 3 with no change in direction, but the first side passes through the reverse feeding portion, and therefore is different in direction between when it passes through the secondary transfer portion 45n and when it passes through the sensing unit. Particularly, the patches at the leading end portion when passing through the sensing unit 3 are trigger patches 101T and 102T, and are used for accurately detecting positions of a patch line (array) when read by the line sensors 91 and 92. Of the solid blue patches 101 and the solid black patches 102, remaining 10 patches each thereof excluding the trigger patches 101T and 102T are adjusting patches (patches for adjustment), and are formed under application of different secondary transfer voltages Vtr. A size of each of the patches is 15 mm (process advance direction)×40 mm (longitudinal direction), and the solid blue patches 101 and the solid black patches 102 are arranged with an interval of 15 mm between adjacent two patches thereof in the process advance direction. Further, in this embodiment, the solid blue patches 101 and the solid black patches 102 are disposed so as not to overlap with each other between the first side and the second side. This is because when these patches are read by the line sensors 91 and 92, the influence of an offset on detected brightness is avoided. The influence of the offset on the detected brightness is particularly liable to occur in the case of thin paper small in basis weight (for example, basis weight: 40 $g/m^2$ or less).

Next, an adjusting chart 103 which has a length of 210 mm (short side of A4 size) or more and less than 420 mm (long side of A3 size) with respect to the process advance direction of the recording material S and which has a length of 279.4 mm (long side of LTR size) or more is shown in each of parts (a) to (d) of FIG. 7.

The adjusting chart 103 is also referred to as a small chart. The small chart 103 corresponds to a size of half of the maximum sheet passing size, and an image size is approximately 13 inches (≈330 mm) (long side in longitudinal direction)×9.6 inches (≈243 mm) (short side in process advance direction). In the case where the size of the recording material S is the A4 size or the LTR size, depending on the size of the recording material S, a chart corresponding to image data cut from this small chart 103 is outputted. At this time, on the leading end center basis with respect to the process advance direction, in accordance with the size of the recording material S, the image data is cut from the small chart 103. For example, in the case where the image data is outputted on the recording material S of the A4 size (long edge feeding) (short side: 210 mm×long side: 297 mm), image data of a size of 205 mm (short side)×292 mm (long side) is cut from the image data of the small chart 103.

Then, an image corresponding to this cut image data is outputted on the A4-size recording material S with a margin of 2.5 mm at each end portion on the basis of the leading end with respect to the reading direction and on the longitudinal center basis.

On the small chart 103, solid blue patches 101 and solid black patches 102 are arranged in the longitudinal direction, and 12 sets of the patches in total are formed with respect to the process advance direction over two sheets. In the case of the small charts 103, two recording materials S for use in adjustment are employed, so that the number of the patches similar to the number of the patches for the large chart 100 is ensured and thus similar adjustment can be made. A small chart 103(1-1) shown in part (a) of FIG. 7 corresponds to a first side of a first sheet, a small chart 103(1-2) shown in part (b) of FIG. 7 corresponds to a second side of the first sheet, a small chart 100(2-1) shown in part (c) of FIG. 7 corresponds to a first side of a second sheet, and part (d) of FIG. 7 corresponds to a second sheet of the second sheet.

The second side passes through the secondary transfer portion 45n and then passes through an inside of the sensing unit 3 with no change in direction, but the first side passes through the reverse feeding portion, and therefore is different in direction between when it passes through the secondary transfer portion 45n and when it passes through the inside of the sensing unit. Particularly, the patches at the leading end portion when passing through the sensing unit 3 are trigger patches 101T and 102T, and are used for accurately detecting positions of a patch line (array) when read by the line sensors 91 and 92. Of the solid blue patches 101 and the solid black patches 102, remaining 10 patches each thereof excluding the trigger patches 101T and 102T are adjusting patches (patches for adjustment), to which different secondary transfer voltages Vtr are applied, respectively. A size of each of the patches is 15 mm (process advance direction)×40 mm (longitudinal direction), and the solid blue patches 101 and the solid black patches 102 are arranged with an interval of 15 mm between adjacent two patches thereof in the process advance direction. Further, on the first sides of the small charts 103(1-1) and 103(1-2) and on the second sides of the small charts 103(2-1) and 103(2-2), the solid blue patches 101 and the solid black patches 102 are disposed so as not to overlap with each other between the front side and the back side. This is because similarly as in the case of the above-described large chart 101, when these patches are read by the line sensors 91 and 92, the influence of an offset on detected brightness is avoided.

When reading of the patches by the line sensors 91 and 92 are taken into consideration, the patch size may desirably be large in area to some extent. However, when the patch is made excessively large, the number of secondary transfer voltages Vtr changed in the adjusting chart becomes small. In this embodiment, in the large chart 101, a patch size is set so as to be changed at 10 levels. Further, a patch interval in the process advance direction may be set so that the secondary transfer voltage can be switched.

Here, it is preferable to prevent patches from being formed in the neighborhood of the leading and trailing ends of the recording material S in the process advance direction (for example, in the range of about 10 to 30 mm inward from the edge). This is because there may be an image defect that occurs only at the leading end or the trailing end, and it may be difficult to determine whether or not such an image defect has occurred due to the secondary transfer voltage. Incidentally, the solid image is an image with a maximum density level. In addition, in this embodiment, the half-tone image corresponds to an image with a toner application amount of 10% to 80% when the toner application amount of the solid image is 100%.

In this embodiment, the size of the recording material S usable as the adjusting chart is 210 mm (short side of A4 size) or more with respect to the process advance direction and is 279.4 mm (long side of LTR size) or more with respect to the longitudinal direction, but is not limited thereto. If the size is larger than this size, not only recording materials S of regular sizes but also recording materials S of arbitrary sizes can be used by designation thereof through input from the operating portion 70 or the external device 200 by the operation.

Incidentally, design of the adjusting chart is not limited to the above-described design. The patches are not required to be the solid blue patches and the solid black patches, and may also be patches of other single colors, secondary colors, colors of mixtures of three or more colors, or halftones. Further, a shape and the number of the patches may be changed depending on the image forming apparatus, a corresponding paper size, or the reading type. A shape of the trigger patch is also not limited to the above-described example and is not necessarily required depending on the image reading type.

<Adjustment Mode>

Next, the operation in the adjustment mode in this embodiment will be described. FIG. 8 is a flowchart showing the operation in the adjustment mode in this embodiment. In addition, FIG. 9 is a schematic illustration of a paper kind category selecting screen 700 displayed on the operating portion 70 (specifically, the display portion 70a). The controller 30 executes the operation in the adjustment mode in the case where the operator provides an instruction to execute the adjustment mode operation via the operating portion 70 of the image forming apparatus 2. Incidentally, a function of the operating portion 70 may also be performed by the external device such as a personal computer, for example. Further, in the following description, symbols shown below will be used.

N: adjusting value (=−20 to +20)
N0: present adjusting value (before execution of operation in adjustment mode)
NA: selected adjusting value
n: present number (n=1 to 10 from small adjusting value)
n0: patch number corresponding to present adjusting value (corresponding to adjusting value N0)
nA: selected patch number (corresponding to adjusting value NA)

First, in accordance with an instruction provided by the operator, the controller 30 determines the recording material S on which the operator desires to form the image and an adjusting condition (S1). On the paper kind category selecting screen 700 shown in FIG. 9, paper kind categories of the recording materials S settable in the image forming apparatus 2 are displayed. In the case of this embodiment, the operator presses an adjusting button 701 of the paper kind category selecting screen 700, so that the sequence can go to the operation in the adjustment mode.

Incidentally, in the paper kind category selecting screen 700, the operator may have access to changing screens not only for the secondary transfer voltage, but also for other image forming conditions such as a fixing condition. Further, in order to leave the default setting of the paper kind category as it is, the paper kind category is copied in the RAM 33 by a copy button 702, and then the operation in the adjustment mode may also be enabled. The copied paper kind category 703 is stored under another name in the RAM 33, and then the image is formed in the default setting except for a condition in which the setting is changed. In the following, the case where "Plain paper 1_copy (P.P.1 COPY) (64-75 g/m$^2$)" is selected is taken as an example, and the operation in the adjustment mode will be described.

When the paper kind category of the recording material S is selected, the display screen goes to a feeding portion selecting screen 704 shown in FIG. 10. On the feeding portion selecting screen 704 shown in FIG. 10, the paper kind categories of the recording materials S which have already accommodated in feeding portions 4 set in advance by the operator through the operating portion or the like and sizes of the recording materials S detected by size detecting sensors (not shown) provided in the respective feeding portions 4 are displayed.

In the example shown in FIG. 10, the same "P.P.1 COPY (64-75 g/m$^2$)" is stored in a plurality of feeding portions (feeding portion [1], feeding portion [2], and feeding portion [3] in FIG. 10).

Of these feeding portions, in the case of paper sizes (feeding portion [1] and feeding portion [2] in FIG. 10) capable of meeting the operation in the adjustment mode, display is made so that the operator is capable of pushing a selection button 705. In the case of the paper kind category and the paper size which do not meet the operation in the adjustment mode, the selection button 705 is displayed in a gray-out state, and does not respond even when the operator presses the selection button 705. Incidentally, in the case where the recording material S for executing the operation in the adjustment mode is not stored in any feeding portion 4, in order to once exit the feeding portion selecting screen 704, a "return(ing)" button (not shown) or the like may be displayed.

After selection of the paper kind category and the feeding portion 4 for which the operation in the adjustment mode is executed, a secondary transfer voltage adjusting screen 706 shown in FIG. 11 is displayed at the operating portion 70 (display portion 70a). On the secondary transfer voltage adjusting screen 706, an average value display portion 707 on which a present average value is displayed, a one-side/double-side (printing) selecting portion 708 for selecting whether an execution object of the operation in the adjustment mode is one side or double (both) sides, an adjustment execution button 709 for starting formation of the image on the adjusting chart, and the like are displayed. A value is inputted to the average value display portion 707, whereby the secondary transfer is enabled in a state in which the recording material part voltage Vp stored in the ROM 32 is offset. In the case of this embodiment, in the average value display portion 707, an integer value from "−20 to +20" is capable of being inputted as an adjusting value N, and a default thereof is "0". In the case where the adjusting value N is "0", the recording material part voltage Vp (the paper kind category stored in the ROM 32) is used as it is when the secondary transfer voltage Vtr is acquired (Vtr=Vb+Vp (+ΔV=0). As regards the value (adjusting value) at the adjusting value display portion 707, for example, ΔN=1 is caused to correspond to ΔV=150 V, so that in the case of "N=−5", the adjusting amount ΔV="−5 ×150=−750" and is used when the secondary transfer voltage Vtr is acquired (Vtr=Vb+Vp+ΔV (=−750 V)). In the case where the operator executes the operation in the adjustment mode, the operator selects the one side/double side selecting portion 708 and then presses the adjustment execution button 709.

When the adjustment execution button 709 is pressed, the controller 30 executes density correction control (S2).

The density correction control is carried out for forming a state in which before the secondary transfer voltage is adjusted, the toner in a proper toner amount is on the intermediary transfer belt 44b. The controller 30 forms toner patches while changing outputs of the charging bias power source 73, the developing bias power source 74, the exposure device 42, and the like, and the toner patches are primary-transferred onto the intermediary transfer belt 44b. Then, the controller 30 determines an image forming condition during output of the adjusting chart on the basis of a result of measurement of a toner amount of the toner patches, formed on the intermediary transfer belt 44b, by a patch detecting sensor (not shown). Incidentally, such density correction control is not required to be executed every execution of the operation in the adjustment mode. For example, on the basis of the number of times of image formation, a change in environment, an elapsed time from the last execution of the density correction control, the controller 30 may be constituted so as to be capable of discriminating whether or not the density correction control is newly executed.

The controller 30 executes ATVC (S3). The ATVC is as described above. The controller 30 outputs the adjusting chart subsequently to the ATVC (S4).

In each of parts (a) and (b) of FIG. 12, an output image of the secondary transfer power source 76 when the large chart 100 is outputted is shown. Part (a) of FIG. 12 shows the case of the first side, and part (b) of FIG. 12 shows the case of the second side. In the case of the first side, 10 solid blue patches 101 and 10 solid black patches 102 are continuously secondary-transferred and then the trigger patches 101T and 102T are secondary-transferred. The solid blue patches 101 and the solid black patches 102 are arranged so that the adjusting values N thereof increase from the lowest adjusting value N. Further, as regards the patch number, the number corresponding to the smallest adjusting value N is referred to as n=1 and the number corresponding to the largest adjusting value N is referred to as n=10 in an ascending order.

A bias switching timing is after passing of the solid blue patch 101 and the solid black patch 102. There is a somewhat time lag for switching the output of the secondary transfer power source 76, but the switching is made at the above-described timing, whereby the margin between the patches withstands the time lag. In the case of the second side, the arrangement between (the solid blue patches 101 and the solid black patches 102) and (the trigger patches 101T and 102T) is reversed and shifted from the arrangement in the case of the first side. Further, as regards the recording material part voltage Vp, a table stored for the second side in the ROM 32 is used. Switching of the high voltage and other operations are carried out similarly as in the case of the first side.

A change range ΔV801 of the voltage during preparation of the adjusting chart is switched depending on the secondary transfer portion part voltage Vb. For example, when the secondary transfer portion part voltage Vb is 2000 V or more which is large, the change range is 450 V corresponding to the adjusting value ΔN=3. When the secondary transfer portion part voltage Vb is 1500 V or more and less than 2000 V, the change range is 300 V corresponding to the adjusting value ΔN=2. When the secondary transfer portion part voltage Vb is less than 1500 V, the change range is 150 V corresponding to the adjusting value ΔN=1. This is because in order to check current sensitivity of a secondary transfer property, a manner in which a bias is largely changed with a larger secondary transfer portion part voltage Vb is efficient. In this embodiment, depending on a result of the ATVC, the adjusting value ΔN is automatically selected. However, the operator may also select the adjusting value ΔN directly. The adjusting value ΔN may be selected by the operator in an "automatic selection" manner or in a "direct designation" manner.

Here, in each of FIGS. 13 to 18, a list including present adjusting values N0 and adjusting values N applied for each of patch numbers was shown for each adjusting average value change range ΔN and each side (first side or second side). In FIGS. 13, 15 and 17, in the case where the present adjusting value N0 is "0", a patch number n=5 corresponds to the present adjusting value N0=0, n=1 to 4 correspond to a lower adjusting value side in ΔN interval, and n=6 to 10 correspond to a higher adjusting value side in ΔN interval. In the case where the present adjusting value N0 is other than 0, the adjusting values corresponding to the solid blue patches 101 and the solid black patches 102 are offset uniformly. However, in the case where the present adjusting value N0 is large on a "+ side" or a "− side" when the present adjusting value N0 is fixed to n=5, there is a case that all the patches of n=1 to 10 do not always fall within an adjusting range of "±20". In such a case, the patch corresponding to the present adjusting value N0 is deviated from n=5, so that all the solid blue patches 101 and the solid black patches 102 are caused to fall within the adjusting range of "±20" (see, FIGS. 14, 16 and 18). By doing so, all the patches formed on the adjusting chart are effectively utilized during the operation in the adjustment mode.

On a first-side trailing end side of the recording material and on a second-side leading end side of the recording material, the trigger patches 101T and 102T are formed (see part (a) of FIG. 6 to part (d) of FIG. 7). The trigger patches 101T and 102T are used for detecting the patch positions when the sensing unit 3 detects the patches, and therefore, there is a need that these trigger patches are at least transferred. However, when the trigger patches 101T and 102T are formed at an extremely high secondary transfer voltage or at a low secondary transfer voltage, there is a risk that these trigger patches cannot be read. For this reason, in this embodiment, the adjusting value (800 V indicated by a broken line in part (b) of FIG. 12) for the patch number "n=5" is employed, and the trigger patches 101T and 102T are formed. Incidentally, the secondary transfer voltage applied when the trigger patches 101T and 102T are formed is not limited to the method in this embodiment. For example, a method in which the secondary transfer voltage is set at a high value to at least avoid a lowering, a method in which the trigger patches are at least transferred by making the current a constant current, and the like method would be considered.

An output image of the secondary transfer power source 76 when the small chart 103 is outputted is shown in each of parts (a) and (b) of FIG. 19. Part (a) of FIG. 19 shows the case of the first side during double-side adjustment, and part (b) of FIG. 19 shows the case of the second side during the double-side adjustment. The small chart 103 is divided into small charts for a first side of a first sheet (1-1), a first side of a second sheet (1-2), a second side of the first sheet (2-1), and a second side of the second sheet (2-2), and the trigger patches 101T and 102T are disposed on each of the divided small charts. Also, in the case where the small chart 103 is outputted, a magnitude and a timing of the secondary transfer voltage applied by the secondary transfer power source 76 are basically similar to those in the case where the large chart is outputted.

Incidentally, in the case where the one-side printing is selected in the one-side/double-side (printing) selecting portion 708 (see FIG. 11) by the operator, the adjusting chart for the second side in the double-side printing is used in a manner such that the large chart 100(2) is used if the adjusting chart is the large chart and that the small charts 103(2-1) and 103(2-2) are used if the adjusting chart is the small chart. Further, reading of the patches on the adjusting chart is made using the line sensor 92 of the sensing unit 3. By this, the operation in the adjustment mode for the one-side printing can be executed with a minimum downtime since a direction of the reading image is unchanged from during the double-side adjustment and the adjusting chart does not pass through the reverse feeding portion 7.

Returning to FIG. 8, the controller 30 checks whether or not the high voltage is saturated after the adjusting chart is outputted (S5). "The high voltage is saturated" means that the secondary transfer voltage Vtr is in a state in which the secondary transfer voltage Vtr is fixed to an upper limit or a lower limit of an output voltage of the secondary transfer power source 76. That is, the upper limit of the output voltage of the secondary transfer power source 76 exists, and although the upper limit varies depending on a specification of the high voltage (power) source, the upper limit is "6.5 kV" in the case of this embodiment.

For example, in the case where the secondary transfer roller 45b is used for a long term or in the case where the image forming apparatus 2 is used in a low temperature/low humidity environment, the secondary transfer portion part voltage Vb becomes higher with a higher resistance of the secondary transfer portion 45n, so that the secondary transfer voltage Vtr becomes high. Or, in the case where the operation in the adjustment mode is capable of being executed as in this embodiment, when the present adjusting value N0 is extremely large, such as "+20", the adjustment is made in the neighborhood of the present adjusting value "N0=+20", and therefore, the secondary transfer voltage Vtr necessarily becomes large. In such a case, the secondary transfer voltage Vtr exceeds the output voltage upper limit of the secondary transfer power source 76, so that the bias cannot be changed during output of the adjusting chart. Therefore, in this embodiment, in the case where the secondary transfer voltages Vtr for all the solid blue patches 101 and the solid black patches 102 exceed the output voltage upper limit, discrimination that "the high voltage is saturated" is made (No of S5), the adjusting value is determined at a smallest adjusting value (minimum adjusting value N) of the adjusting values of the adjusting chart (S6). The reason why the smallest adjusting value is used is that when the adjustment is made again, a possibility that an adjusting value deviating from the output voltage upper limit of the secondary transfer power source 76 is increased. Incidentally, on the operating portion 70 (display portion

70a), a message such that "optimum adjustment cannot be made" or "check lifetime of outer secondary transfer roller" may also be displayed.

Further, in the case where a use (OP) environment of the image forming apparatus 2 is a high temperature/high humidity environment, a default value of the original recording material part voltage Vp is small, and therefore, as a result of offset of the adjusting value to the negative (−) side, there is a possibility that the secondary transfer voltage Vtr becomes a negative value. Further, in the case where the present adjusting value N0 is extremely small, such as "−20", the adjustment is made in the neighborhood of the present adjusting value "N0=−20", and therefore, the secondary transfer voltage Vtr necessarily becomes small. Theoretically, the case where the negative secondary transfer voltage Vtr is optimum is not readily considered, and therefore, in this embodiment, the secondary transfer voltage Vtr is limited to "0V" or more. In the case where all the solid blue patches 101 and the solid black patches 102 are formed at "0V", the controller 30 discriminates that "the high voltage is saturated" (No of S5), and then determines the adjusting value at a largest adjusting value (NA=maximum N) of the adjusting value of the adjusting chart (S6). In this case, the reason why the largest adjusting value is used is that when the adjustment is made again, a possibility that an adjusting value capable of providing the secondary transfer voltage Vtr of "0V" or more can be selected is increased. Incidentally, also in this case, a message such that "optimum adjustment could not made" or the like may also be displayed. Further, in this case, limitation such that the secondary transfer voltage Vtr is "0V" or more is put, but another limitation may also be put. For example, if a lower limit numerical value stably applied as the secondary transfer voltage exists, the lower limit may be other than "0V". The lower limit of the secondary transfer voltage Vtr may also be set at the secondary transfer portion part voltage Vb by limiting that the recording material part voltage Vp of the recording material S becomes a negative (−) value. After the above-described process S6, the controller 30 causes the sequence to go to a process S24.

In the case where a part or all of the solid blue patches 101 and the solid black patches 102 are not in a "high voltage saturation" state (Yes of S5), the controller 30 causes the sequence to go to a subsequent process (S7). At this time, an adjusting value N corresponding to the solid blue patches 101 and the solid black patches 102 which are in the "high voltage saturation" state is not put in candidates for the adjusting values in processes of S7 and later. This is because when the secondary transfer portion part voltage Vb fluctuates, the secondary transfer voltage is prevented from being adjusted by the recording material part voltage Vp different from the adjusting value N determined in the operation in the adjustment mode.

Then, the controller 30 checks whether or not the current is properly changed (S7). For this checking, the controller 30 acquires a current, from the current detecting sensor 76b during output of the adjusting chart, flowing through the secondary transfer portion 45n when the solid blue patches 101 and the solid black patches 102 are formed, and then stores the acquired current in the RAM 33. In this embodiment, a method of checking whether or not the current is properly changed is as follows. In the case where "I(n+1) ≥I(n)×α" where "I(n):current of n-th patch", "α: coefficient", and "n=1 to 9" are defined holds, discrimination that "current is properly changed" is made. The coefficient "α" is a numerical value which is roughly about 1, and the "I(n+1)≥I(n)×α" compares whether a secondary transfer current I(n+1) for an (n+1)-th adjusting value which is large in secondary transfer voltage Vtr is larger than a secondary transfer current I(n) for an n-th adjusting value by coefficient α or more.

In the case where the above-described "I(n+1)≥I(n)×α" does not hold, there is a high possibility that the secondary transfer current for the solid blue patches 101 and the solid black patches 102 of the adjusting chart is not properly changed. As such a case, the case where an in-plane resistance of the recording material S is non-uniform, the case where a resistance of the recording material S is extremely low and thus a current flows along the recording material S through members (unshown feeding rollers, guides, or the like) charting the recording material S in the neighborhood of the secondary transfer portion 45n, or the like case would be considered. In either case, when the "I(n+1)≥I(n)×α" does not hold (No of S7), the controller 30 discriminates that the adjustment itself is difficult and keeps the present adjusting value N0 as it is without changing the present adjusting value N0 (S8), and then the sequence goes to a process of S24.

Incidentally, in this embodiment, the efficiency α described above is "1", but is not necessarily required to be "1". For example, by making the coefficient α larger than "1", a flow for executing the processes of S9 and later described hereinafter only when the current is reliably changed may be employed. Further, different coefficients α may be used between the first side and the second side, and particularly, in the case where a water content non-uniformity is large depending on the influence of a storage state of the recording material S, the coefficient α for the first side may be below "1". Incidentally, if "I(n+1)≥I(n)×α" does not hold, the controller 30 may cause the operating portion (display portion 70a) to display messages such that "optimum adjustment could not be performed", "there is possibility that recording material S cannot be adjusted", and the like.

In the case where the current is changed as is intended (Yes of S7), the controller 30 causes the sensing unit 3 to read the adjusting chart, and calculates an average brightness value and a brightness dispersion value of the patches (S9). That is, the line sensors 91 and 92 of the sensing unit 3 read the patches formed on each of the first side and the second side of the adjusting chart at a resolution of, for example, "300 dpi". Then, on the basis of positions of the trigger patches 101T and 102T of the adjusting chart, the controller 30 calculates positions of the solid blue patches 101 and the solid black patches 102.

FIG. 20 shows an example in which the positions of the trigger patches 101T and 102T are identified from an image 110 read by the line sensors 91 and 92. First, with respect to the process advance direction, a line 112 positioned at a margin portion between an edge 111 of the adjusting chart and the trigger patches 101T and 102T is set from a roughly positional relationship, and the average brightness value of the line 112 is read. At this time, when the average brightness value is smaller than a preset threshold, the controller 30 discriminates that an edge line of the trigger patches 101T and 102T exists. When this edge (line) discrimination is not made, this discrimination is repeated every line toward a downstream side of the process advance direction, and the controller 30 finds out an edge line 113. Then, with respect to the longitudinal direction, a line 114 positioned at a margin portion between the edge 111 of the adjusting chart and the trigger patches 102T is set from a roughly positional relationship, and the average brightness value of the line 114 is read. At this time, when the average brightness value is smaller than a preset threshold, the controller 30 discriminates that an edge line of the trigger patches 102T exists. When this edge (line) discrimination is not made, this discrimination is repeated every line toward a right-hand side of the longitudinal direction, and the controller 30 finds out an edge line 115. Incidentally, the above edge detecting method is an example and is not limited to the above method, but a different method may also be employed depending on design of the adjusting chart.

When the positions of the solid blue patches 101 and the solid black patches 102 are identified, the controller 30 calculates the average brightness value in accordance with a formula (1) below and the brightness dispersion value in accordance with a formula (2) below, and then the average brightness value and the brightness dispersion value are stored in the RAM 33.

In this embodiment, in order to calculate the brightness dispersion value, a patch reading region P is divided into M pieces of regions from P(1) to P(M), and brightness data in the corresponding divided regions of the adjusting chart read in S7 are stored as B(1) to B(M), respectively, in the RAM 33. Each of sizes of the divided regions P(1) to P(M) may be minimum unit of readable resolution by the image reading portion 80 and may be about 300 dpi to 1200 dpi, for example.

$$B_{ave}(n) = \frac{1}{M} \times \sum_{m=1}^{M} B(m) \tag{1}$$

$$D(n) = \frac{1}{M} \times \sum_{m=1}^{M} (B(m) - B_{ave}(n))^2 \tag{2}$$

In the formula (2), "B(m)" represents brightness data of the divided region read "m-th" (m=1 to M) in the patches and M represents a total number of the divided regions. "$B_{ave}(n)$" represents the average brightness value of the patches, and "D(n)" represents the brightness dispersion value of the patches. The brightness dispersion value shown in the formula (2) reflects a transfer property in the case where the recording material S was provided with unevenness. The formula (2) shows that at a larger brightness dispersion value D(n) (dispersion), the transfer property of the toner image from the intermediary transfer belt 44b onto the recording material S varies in a larger degree depending on the region, i.e., that a variation in density is larger.

The average brightness value represented by the formula (1) is a parameter reflecting the density. A lower average brightness value represents that the density of the patches transferred on the recording material S is higher (denser). Further, the brightness dispersion value (dispersion) represented by the formula (2) reflects a transfer property in the case where the recording material S is uneven. A larger brightness dispersion value D(n) (dispersion) represents that the transfer property of the toner image from the intermediary transfer belt 44b onto the recording material S is largely different depending on the region, i.e., that "density variation" is larger.

Calculation of these average brightness value and brightness dispersion value is made for both the solid blue patches 101 and the solid black patches 102. In this embodiment, by using these two numerical values, subsequent processes are carried out. As the brightness to be read, B brightness is used for the solid blue patches and G brightness is used for the solid black patches. Incidentally, whether which of brightness values of RGB may be different from the above brightness values, an average of three brightness values or brightness of gray scale which is not decomposed into RGB may be used.

Further, in the calculation of the brightness dispersion value, there is a need that read brightness per pixel is temporarily stored, but this loads to a high load on the controller 30 and a long time of the operation in the adjustment mode in some instances. In such a case, the brightness values from "0 to 255" are divided into some sections and a frequency per pixel is counted, and then the dispersion may be calculated from a digital histogram. The number of division of the brightness values and whether to employ which interval may be changed depending on a characteristic of the line sensors 91 and 92 or throughput of the controller 30. Further, the brightness histogram is also different depending on the paper kind category, so that these factors may also be changed depending on the paper kind.

When the controller 30 is capable of calculating the average brightness value and the brightness dispersion value, the controller 30 subsequently checks whether or not the present adjusting value is unable to be properly transferred (S10). Examples of discrimination that the present adjusting value is properly transferred are shown in parts (a) and (b) of FIG. 21. Part (a) of FIG. 21 shows the average brightness value of the solid blue patches 101, and part (b) of FIG. 21 shows the average brightness value of the solid black patches 102. The present adjusting value N0 is "n=5" (patch number). In this embodiment, in the solid blue patches 101, in the case where there is no adjusting value for which the average brightness value is lower than a preset threshold δ1 (802) with respect to the average brightness value for "n=5" which is the present adjusting value, the controller 30 discriminates that the present adjusting value is "properly transferred". Also, in the solid black patches 102, similarly, in the case where there is no adjusting value for which the average brightness value is lower than a preset threshold δ2 (803) with respect to the average brightness value for "n=5" which is the present adjusting value, the controller 30 discriminates that the present adjusting value is "properly transferred".

In the case where the transfer is properly performed by the present adjusting value (No of S10), the controller 30 discriminates whether or not a secondary transfer current I(N0) for the present adjusting value is high (S11). This is because in the case where the secondary transfer current value is excessively high even when the transfer property is proper, there is a possibility of the adverse influence such as an increase in resistance of the outer secondary transfer roller 45b and there is a possibility that the transfer current becomes excessive in a halftone image low in density which cannot be checked by the adjusting chart. In this embodiment, in the case where "I(N0)≤Itarget×β (coefficient)" is satisfied by using a target current Itarget, the controller 30 discriminates that the transfer current is high. Incidentally, the coefficient β was set at about "1.2".

In the case where the secondary transfer current I is high (Yes of S11), the controller 30 restricts candidates to the present adjusting value N0 or less (S12), and the sequence goes to a process of S14 and the operation in the adjustment mode is continued. On the other hand, in the case where the secondary transfer current I is not high (No of S11), the controller 30 discriminates that both the solid blue patches 101 and the solid black patches 102 are properly transferred at the present adjusting value N0, and does not change the present adjusting value N0 (S13), and then the sequence goes to a process of S24.

Next, the controller 30 performs a process for selecting an adjusting value NA capable of forming patches with a good transfer property, from the average brightness values and the brightness dispersion values of the solid blue patches 101 and the solid black patches 102 (S14 to S17). However, the adjusting value at which the controller 30 discriminates the above-described "high voltage saturation" state is excluded from the candidates for the adjusting values (see S5). Further, in the case where the controller 30 discriminates that the secondary transfer current is high although the transfer property at the present adjusting value N0 is proper, the controller 30 restricts the candidates for the adjusting values to the present adjusting value N0 or less (see S12).

Part (a) of FIG. 22 shows the average brightness value of the solid blue patches 101, part (b) of FIG. 22 shows the average brightness value of the solid black patches 102, part (c) of FIG. 22 shows the average brightness value of grouped solid blue patches 101, and part (d) of FIG. 22 shows the brightness dispersion value of the solid blue patches 101.

First, the controller 30 seeks a lowest average brightness value from those for the solid black patches 102, and narrows down the adjusting values to those falling within a range of a preset threshold γ1 (804) therefrom (S14). In part (b) of FIG. 22, the case where the lowest brightness is "n=4, 5, 6" is shown, so that patch numbers narrowed down are "n=1, 2, 3, 4, 5, 6, 7". By this, the adjusting values are narrowed down to adjusting values at which the solid black patches can be transferred to some extent. Incidentally, the threshold γ1 (804) may be decreased if the solid black patch transfer property is regarded as important and may be increased if the solid blue patch transfer property is regarded as important.

Next, the controller 30 calculates, for example, an average brightness value of three solid blue patches consisting of a preceding solid blue patch, a present solid blue patch, and a subsequent solid blue patch (this average brightness value is referred to as group brightness) on the basis of the narrowed-down adjusting value, and then selects the adjusting value at which the group brightness is smallest (S15). Group brightness Bgr(n) for an n-th patch is represented by "Bgr(n)=(Bave(n−1)+Bave(n)+Bave(n+1))/3". Part (a) of FIG. 22 shows the average brightness value of the solid blue patches 101, and the average brightness value (group brightness) of the three solid blue patches calculated on the basis of the average brightness value shown in part (a) of FIG. 22 is shown in part (c) of FIG. 22. In the case of part (c) of FIG. 22, the average brightness value of a group "n=6, 7, 8" when the adjusting value is "n=7" is smallest.

However, in the above-described adjusting chart, the adjustment can only be made for patches with a certain density, and therefore, the selected group may be changed. For example, as shown in part (c) of FIG. 22, a threshold γ2(805) is set, and when group brightness in the threshold γ2(805) is present on a small adjusting value side, the group may also be changed by changing the adjusting value. By this change, it is possible to select an adjusting value close to the adjusting value during rising the secondary color transfer to the extent possible. As an effect, it is possible to avoid the case such that the secondary transfer voltage Vtr is excessively high when the image of a single color or halftone, for example, is principally formed. In this case, the adjusting value is changed to an adjusting value (n=6) on a small adjusting value side in the threshold γ2(805), so that the group of "n=6, 7, 8" is changed to the group of "n=5, 6, 7". When the controller 30 selects the group, the controller 30 selects the solid blue patch (adjusting value) lowest in brightness dispersion value in the group (S16). In the case of part (d) of FIG. 22, the brightness dispersion value of the solid blue patch for which the adjusting value is "n=6" is smallest.

Further, the controller 30 may also correct the selected adjusting value. For example, in the case where the image of the single color or halftone is principally formed, similarly as in the case of the above-described group selection, the controller 30 selects a threshold γ3(806) as shown in part (d) of FIG. 22, and then may change the adjusting value to an adjusting value smaller in the threshold γ3(806) to the extent possible. On the other hand, if importance is attached to transfer of the secondary color image with reliability, on the contrary, correction of increasing the adjusting value may also be made. As an example of a latter case, as shown in part (a) of FIG. 22, the controller 30 sets a threshold γ4(807) for the average brightness value of the selected patch (n=6), and the adjusting value can be changed depending on a difference between the average brightness value of the patch (n=6) and the average brightness value of the previous patch (n=5) in the threshold γ4(807). In the case where the difference in average brightness value is larger than the threshold γ4(807), a state in which the secondary color (image) transfer is barely maintained is formed. In such a case, depending on a toner charge amount fluctuation, a water content fluctuation of the recording material S, or the like, there is a risk of an insufficient transfer electric field for the secondary color image. In this embodiment, in order to transfer the secondary color image, the correction of increasing the adjusting value is made. For example, in the case where the difference between the average brightness value of the selected patch (n=6) and the average brightness value of the previous patch (n=5) is larger than the threshold γ4(807), the patch (n=6) is changed to a patch (n=7) larger by one level.

The controller 30 carries out the adjusting value selection flow (S14 to S16) as described above, and is capable of selecting an adjusting value NA of which transfer property is preferred (S17).

Incidentally, the above-described adjusting value selection flow is an example, and another example can be considered. Group brightness Bgr(n) is acquired using three patches, but the number of the patches may also be four or more or two or less. Further, the group brightness Bgr(n) is effective for stably selecting an adjusting range in which the transfer property is good, but the adjusting value may also be made selectable directly from the average brightness value and the brightness dispersion value of the solid blue patches and the solid black patches without using the group brightness Bgr(n). That is, depending on the setting of the threshold γ1 (see part (b) of FIG. 22) or the transfer property of the recording material S, there is a case that the group brightness cannot be selected, and in that case, the adjusting value may be selected without using the group brightness. Incidentally, the brightness dispersion value is effective for detecting the density non-uniformity in the patches, but is not necessarily required to be used. Further, the transfer property of the solid black patches may also be made adjustable by a method other than the narrowing-down by the threshold γ1.

Returning to FIG. 8, subsequently, the controller 30 discriminates whether or not the side (adjusting side) where the secondary transfer voltage is adjusted is the second side (S18). That is, in the conventional constitution, after an end of the operation in the adjustment mode, in the case where a job for forming the image on the recording material S is started actually, when a toner amount of the image formed on the first side is large (such as the case of a whole solid image), there was a liability that the secondary transfer electric field becomes insufficient during the transfer of the image onto the second side. On the other hand, by an experiment, the present inventors have found that a risk of the insufficient secondary transfer electric field can be predicted by a secondary transfer current I(nA) flowing through the secondary transfer portion N when the patches are transferred at the adjusting value NA selected by the operation in the adjustment mode. Specifically, a target current Itarget which is a target at which the current is caused to flow through the secondary transfer portion N during the secondary transfer is used. The target current Itarget is determined on the basis of a solid white portion current at which an entire solid secondary color image is capable of being secondary-transferred. By using this, the controller 30 is capable of discriminating that there is no risk of the insufficient secondary transfer electric field when the secondary transfer current I(nA) when the patches are transferred at the adjusting value NA is sufficiently larger than the target current Itarget and that the risk of the insufficient secondary transfer electric field exists when the secondary transfer current I(nA) is smaller than the target current Itarget.

Therefore, in the case of this embodiment, on the basis of the secondary transfer current I(nA) when the patches are transferred at the adjusting value NA, the controller 30 discriminates whether or not this case is a case that the above-described risk of the insufficient secondary transfer electric field is low (S19). In this embodiment, in the case where "I(nA)≥ε1 (coefficient)×Itarget" holds (Yes of S19), the controller 30 discriminates that this case is the case that the risk of the insufficient secondary transfer electric field is low, and does not change the adjusting value NA (S20). Incidentally, in this embodiment, as a result of study using the image forming apparatus 2 and the sensing unit 3, the coefficient ε1 was set at "1.2".

Next, on the basis of the secondary transfer current I(nA) when the patches are transferred at the adjusting value NA, the controller 30 discriminates whether or not this case is a case that the above-described risk of the insufficient secondary transfer electric field is low (S21). In this embodiment, in the case where "I(nA)≥ε2(coefficient)×Itarget" holds (Yes of S21), the controller 30 discriminates that this case is the case that the risk of the insufficient secondary transfer electric field is low, and offsets the adjusting value NA by "+1" (S22). By doing so, the risk of the insufficient secondary transfer electric field during the transfer of the image on the second side can be alleviated. Incidentally, in this embodiment, as a result of study using the image forming apparatus 2 and the sensing unit 3, the coefficient ε2 was set at "0.9".

In the case where "I(nA)<ε2×Itarget" other than the above case holds (No of both of S19 and S21), the controller 30 discriminates that the risk of the insufficient secondary transfer electric field is high, and offsets the adjusting value NA by "+2" (S23). In other words, the controller 30 changes the adjusting value NA to an adjusting value "NA+2" at which the secondary transfer voltage is a secondary transfer voltage higher than a voltage (first test voltage) at the time of the transfer of the patches at the adjusting value NA. Thus, the risk of the insufficient secondary transfer electric field during the transfer of the image onto the recording material S is alleviated.

As described above, in this embodiment, of the plurality of patches formed on the second side of the adjusting chart, the test voltage at which the secondary transfer current I when the patches are transferred is larger than the reference current obtained by multiplying the target current Itarget by the coefficient and when a patch for which the density is relatively large is formed is used as the secondary transfer voltage set during formation of the image on the second side of the recording material S.

Incidentally, in the operation in the adjustment mode, the example in which in order to alleviate the risk of the insufficient secondary transfer electric field, the adjusting value NA is offset by "+1" or "+2" was described, but the present invention is not limited thereto, and an offset such that the patch number n is shifted by the number corresponding to certain pieces may also be made. In that case, an offset range is required to be adjusted depending on a magnitude of a change range ΔN of the voltage value during output of the adjusting chart. For example, in the case there is no patch number corresponding to the adjusting value intended to be adjusted, fractions are omitted. For example, when the adjusting value NA is offset by "(adjusting value+1", "nA+1 (corresponding to (adjusting value)+1) at ΔN=1" (the case where the patches are present) and "nA is as it is at ΔN=2 or 3" (the case where the patches are absent) are employed. When the adjusting value NA is offset by "(adjusting value)+2", "nA+2 (corresponding to (adjusting value)+2) at ΔN=1" (the case where the patches are present), "nA+1 (corresponding to (adjusting value)+1) at ΔN=2", and "nA is at it is at ΔN=3" (the case where the patches are absent) are employed.

Further, as a manner of selecting the patch number for the adjusting value intended to be adjusted, for example, a closest adjusting value may be selected by rounding (round-off). Such an offset on the basis of a patch number n basis is preferred for eliminating a sense of discomfort such that the adjusting value which is not present for the patches is selected particularly in the case where the operator is capable of recognizing correspondence between the patch number n and the adjusting value N. As such a case, the case where a user is capable of designating an adjusting value change range ΔN of the adjusting chart, the case where the adjusting value N is printed on the adjusting chart, and the like case would be considered.

Returning to FIG. 8, the controller 30 causes the operating portion 70 (display portion 70a) to display the selected "adjusting value NA, the present adjusting value N0, and the like at the adjusting value display portion 707 of the secondary transfer voltage adjusting screen 706 shown in FIG. 11 (S24). The operator discriminates whether or not the adjusting value displayed on the secondary transfer voltage adjusting screen 706 is appropriate, and selects are confirmation portion 710 (OK button 710a, application button 710b) in the case where the displayed adjusting values (NA, N0) are not changed. On the other hand, the operator inputs a desired value to the adjusting value display portion 707 through (unshown) numeric keys in the case where the operator desires that the adjusting value is changed from the displayed adjusting value NA, and then selects the finalizing portion 710 (OK button 710a, application button 710b). In the case where the adjusting values are changed, the controller 30 (adjustment process portion 31d) causes the RAM 33 (or the secondary transfer voltage storage/operation portion 31f) to store the adjusting values inputted by the operator. In the case where the adjusting values are not changed and the confirmation portion 94 is selected, the controller 30 (adjustment process portion 31d) causes the RAM 33 (or the secondary transfer voltage storage/operation portion 31f) to store the determined adjusting value as it is. The operation in the adjustment mode is thus ended.

As described above, in this embodiment, the secondary transfer voltage set for during actual image formation is adjusted using the toner image chart on which the plurality of patches (test toner images) are formed in an appropriate state (in which the high voltage is not saturated and in which the secondary transfer current is properly changed). Then, on the basis of the densities of the patches formed on the second side of the test chart and the current flowing through the secondary transfer portion N when the patches are formed, adjustment of the secondary transfer voltage for transferring the image on the second side of the recording material S is made. By this, even in the case where a high-duty image compared with the image on the adjusting chart is transferred on the first side of the recording material S during the actual image formation, the transfer property of the image onto the second side of the recording material S can be improved, so that a "lowering in image density" does not readily occur in the image transferred on the second side of the recording material S.

<Second Embodiment>

Next, an image forming apparatus 2A of a second embodiment will be described using FIG. 23. The image forming apparatus 2A is different from the image forming apparatus 2 of the first embodiment described above, and is not provided with the sensing unit 3. For that reason, in the image forming apparatus 2, the recording material S passed through the fixing portion 46 is discharged onto the discharge tray 8 as it is. Other basis constitutions and operations of the image forming apparatus 2A are similar to those in the image forming apparatus 2 of the first embodiment, and therefore, in the image forming apparatus 2A, the constitutions which are the same as the constitutions of the image forming apparatus 2 will be omitted from detailed description by adding the same reference numerals or symbols.

In this embodiment, patches (test toner images) formed on the adjusting chart is read by the image reading portion 80 in place with the sensing unit 3 (see FIG. 1). That is, the operator places the adjusting chart, discharged on the discharge tray 8, on the image reading portion 80, and then an operation in which the adjusting chart is read by the image reading portion 80 is performed. The image reading portion 80 may be the same as the image reading portion 80 in the above-described first embodiment, and may only be required to have a resolution of, for example, about 300 dpi in order to read the adjusting chart. In general, the image reading portion 80 outputs, as brightness information on the read image, brightness values of "0 to 255" for each of RGB.

The adjusting chart used in this embodiment is shown in each of part (a) of FIG. 24 to part (d) of FIG. 25. Parts (a) and (b) of FIG. 24 each shows a large chart 104, in which 104(1) in part (a) corresponds to the first side and 104(2) in part (b) corresponds to the second side. Parts (a) to (d) of FIG. 25 each shows a small chart 108. In FIG. 24, a small chart 108(1-1) in part (a) corresponds to a first side of a first sheet, a small chart 108(1-2) in part (b) corresponds to a second side of the first sheet, a small chart 108(2-1) in part (c) corresponds to a first side of a second sheet, and a small chart 108(2-2) in part (d) corresponds to a second side of the second sheet. Arrangement and the like of solid blue patches 105, solid black patches 106, and trigger patches 105T and 106T are substantially the same as those on the adjusting charts used in the above-described first embodiment. A difference between the first embodiment and the second embodiment is that a positioning patch 107 is formed at an end portion of the recording material S.

The positioning patch 107 is formed for causing the image reading portion 80 to properly read the image and to properly detect the position of the patch by permitting the operator to designate a direction in which the adjusting chart is placed on the image reading portion 80. FIG. 26 shows a conceptual image in the case where the adjusting chart (the large chart 104 turned upside down in FIG. 26) is placed on the platen glass 82 of the image reading portion 80. The operator aligns the positioning patch 107 of the adjusting chart and a positioning mark 83 put at an edge of the image reading portion 80 with each other, whereby the operator is capable of properly placing the adjusting chart on the image reading portion 80. After the output of the adjusting chart, a schematic view corresponding to FIG. 26 is displayed at the operating portion 70 (display portion 70a), so that a manner of placing the adjusting chart may be enabled to be instructed to the operator.

In the case where the image reading portion 80 is caused to read the adjusting chart, it is preferable that the operator is capable of easily discriminating a page as to whether the side is the first side or the second side or whether the sheet is the first sheet or the second sheet. Therefore, in this embodiment, as shown in parts (a) of FIG. 24 to part (d) of FIG. 25, a page identification number 109 is indicated on each of the adjusting charts. Incidentally, the page identification is not limited to checking of the page identification number 109 by the operation through eye observation. For example, a constitution in which a patch dedicated to page identification, such as a bar code is formed and read by the image reading portion 80 and then is analyzed by the controller 30, and thus whether the read page is what page (what sheet) of the adjusting chart can be discriminated automatically may also be employed.

Next, the operation in the adjustment mode will be described using FIGS. 27 and 28. In the operation in the adjustment mode shown in FIG. 27, processes which are the same as those in the operation in the adjustment mode (see FIG. 8) in the above-described first embodiment are represented by the same step numbers or symbols and will be briefly described or omitted from description.

As shown in FIG. 27, the controller 30 executes the processes S1 to S7. Then, the controller 30 executes reading of the adjusting chart by the image reading portion 80 (S8). That is, the controller 30 discharges, to the discharge tray 8, the adjusting chart on which patches are formed on the first side and the second side (on the first sheet and the second sheet in the case of the small chart) (see S4). Thereafter, the controller 30 causes the operating portion 70 (display portion 70a) to display a reading instruction screen 712 of the adjusting chart shown in FIG. 28. The reading instruction screen 712 displays a message 713 indicating that what side of what sheet of the adjusting chart will be read, and the operator presses a reading start button 714 in accordance with the message 713 in a state in which the operator places the adjusting chart on the image reading portion 80. Then, the controller 30 notifies the operator about what adjusting chart will be placed on the image reading portion 80 so that all the images on the outputted adjusting charts by changing display contents of the message 713. When all the images on reading sides of the adjusting charts in a state of being placed on the image reading portion 80 are read, the controller 30 carries out edge detection, patch position detection, calculation of the average brightness value and the brightness dispersion value, and the like.

Then, the controller 30 checks the transfer property of the image at a present adjusting value (S10, S11) and thereafter discriminates whether or not the reading side is the second side (S201). In the second embodiment, different from the first embodiment, change (correction) of the adjusting value for the second side by the secondary transfer current is executed before execution of the processes (S14 to S16) for selecting the adjusting value NA by the average brightness value and the brightness dispersion value.

In the case where the reading side is the second side (Yes of S201), the controller 30 makes setting of a minimum adjusting value (S202). The minimum adjusting value is an adjusting value N at which the image can be sufficiently transferred onto the second side even when double-side solid secondary color images are formed, and is set on the basis of the secondary transfer current detected when the patches are formed on the adjusting chart. Specifically, the adjusting value corresponding to the smallest patch number n of the patch numbers satisfying "I(n)≥ε3 (coefficient)×Itarget" is the minimum adjusting value. In the case of this embodiment, the coefficient was "1.2", but is not limited thereto, and for example, the coefficient may be determined by an image duty which is assumed to be used by the user. Or, the coefficient may also be changed depending on an environment (temperature, humidity) in which the influence of the toner charge amount is taken into consideration and may also be changed depending on the paper kind category different in secondary transfer latitude.

Subsequent processes are similar to those in the first embodiment, but the controller 30 carries out ere adjustment in a range which is not less than the minimum adjusting value. In the case of such a second embodiment, the correction for the second side in the first embodiment (S18 to S23) is omitted on the assumption that a similar effect is obtained by the above-described processes S201 and S202. Incidentally, in the case where there is no adjusting value satisfying the above-described "I(n)≥ε3 (coefficient)×Itarget", a largest adjusting value of the adjusting values N corresponding to the patches may be selected as the adjusting value NA.

Thus, even in the case where the operator causes the image reading portion 80, provided in the image forming apparatus 2A, to read the adjusting chart, when the image is transferred on the second side of the recording material S, the secondary transfer voltage can be adjusted to the secondary transfer voltage at which the "image density lowering" is suppressed.

Incidentally, in this embodiment, the selection of the priority image is made on the setting screen 90a (S100), but the present invention is not limited thereto. For example, the operator may select the priority image on the basis of image information (image information from the image reading portion 80 or the external device 200 (see FIG. 2) of the image to be actually intended to be outputted by the operator. Then, in the case where halftone image information is contained in a large amount in the image information, the process for during the white void occurrence (see FIG. 12) may be performed.

Incidentally, in the above-described embodiments, the image forming apparatus of the intermediary transfer type in which the toner images are primary-transferred from the photosensitive drums 51y to 51k for the respective colors onto the intermediary transfer belt 44b and thereafter are secondary-transferred from the intermediary transfer belt 44b onto the recording material S was described as an example, but the present invention is not limited thereto. The above-described embodiments are also applicable to an image forming apparatus of a direct transfer type in which the toner images are directly transferred, onto the recording material S, from the photosensitive drums 51y to 51k, for the respective colors, which rotate while carrying the toner images.

According to the present invention, in the case of the constitution in which the operation in the adjustment mode in which the transfer voltage set for during the image formation is adjusted on the basis of the test chart, the transfer voltage is capable of being adjusted to the transfer voltage at which the "lowering in image density" is suppressed when the image is transferred onto the second side of the recording material S.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-059834 filed on Mar. 31, 2021, which is hereby incorporated by reference herein in its entirety.

What is claimed is:

1. An image forming apparatus comprising:
   an image bearing member configured to bear a toner image;
   an image forming portion configured to form the toner image on said image bearing member;
   a transfer member configured to transfer the toner image from said image bearing member onto a recording material having a first side and a second side;
   a power source configured to apply a transfer voltage, to said transfer member, for transferring the toner image from said image bearing member onto the recording material;
   a current detecting portion configured to detect a current outputted from said power source;
   an acquiring portion configured to acquire information on a density of the toner image transferred on the recording material; and
   a controller capable of executing an operation in an adjustment mode in which a test chart is outputted (i) by transferring a plurality of first test toner images onto the first side of the recording material under application of a plurality of different test voltages by said power source and then (ii) by transferring a plurality of second test toner images onto the second side of the recording material under application of a plurality of different test voltages by said power source, and then on the basis of information on densities of the first test toner images and the second test toner images transferred on the test chart, the transfer voltage set for transfer of the toner image from said image bearing member onto each of the first side and the second side of the recording material is adjusted,
   wherein in the operation in the adjustment mode, said controller (i) selects the test toner images for setting the transfer voltage for the second side of the recording material from the second test toner images, on the basis of the information on the densities of the second test toner images acquired by said acquiring portion, and then (ii) sets the transfer voltage for the second side of the recording material on the basis of the current detected by said current detecting portion when the selected test toner images are transferred onto the recording material.

2. The image forming apparatus according to claim 1, wherein in a case that the current detected by said current detecting portion when the selected test toner images are transferred onto the recording material is higher than a predetermined reference value, said controller sets a first test voltage at the transfer voltage set for the formation of the toner image on the second side of the recording material, and wherein in a case that the current detected by said current detecting portion is lower than the reference value, said controller sets a second test voltage higher than the first test voltage.

3. The image forming apparatus according to claim 1, wherein in the operation in the adjustment mode, said controller controls said image forming portion so that the first test toner images and the second test toner images do not overlap with each other between the first side and the second side.

4. The image forming apparatus according to claim 1, wherein in the operation in the adjustment mode, said controller (i) selects the test toner images for setting the transfer voltage for the first side of the recording material of the first test toner images on the basis of the information of the first test toner images acquired by said acquiring portion, and then (ii) sets the transfer voltage for the first side of the recording material on the basis of the transfer voltage when the selected test toner images are transferred to the recording material irrespective of the current detected by said current detecting portion when the test toner images are transferred onto the recording material.

5. The image forming apparatus according to claim 1, wherein when the predetermined reference value is a first reference value, and the detection current is lower than a second reference value that is lower than the first reference value, said controller sets the transfer voltage for the second side of the recording material to a third transfer voltage higher than the second transfer voltage.

\* \* \* \* \*